United States Patent
Mori

(10) Patent No.: US 7,791,755 B2
(45) Date of Patent: Sep. 7, 2010

(54) DOCUMENT CREATION METHOD AND DOCUMENT CREATION APPARATUS FOR REFLECTING A DOCUMENT STRUCTURE OF A PAPER DOCUMENT IN AN ELECTRONIC DOCUMENT

(75) Inventor: Yasuo Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1212 days.

(21) Appl. No.: 10/981,620

(22) Filed: Nov. 5, 2004

(65) Prior Publication Data
US 2005/0094208 A1 May 5, 2005

(30) Foreign Application Priority Data

Nov. 5, 2003 (JP) ............... 2003-376192
Nov. 5, 2003 (JP) ............... 2003-376193

(51) Int. Cl.
*G06F 3/12* (2006.01)
*G03G 15/00* (2006.01)
*G06K 15/00* (2006.01)
*H04N 1/46* (2006.01)
*H04N 1/04* (2006.01)

(52) U.S. Cl. ............... 358/1.18; 358/1.15; 358/505; 358/474; 399/362; 715/205; 715/206; 715/207; 715/208

(58) Field of Classification Search ............... 358/1.15, 358/1.18; 715/205–208; 399/362
See application file for complete search history.

(56) References Cited

U.S. PATENT DOCUMENTS

| | | | |
|---|---|---|---|
| 5,708,513 A | 1/1998 | Hasuo et al. | 358/450 |
| 6,120,197 A | 9/2000 | Kawamoto et al. | 400/61 |
| 6,169,873 B1* | 1/2001 | Connolly | 399/365 |
| 6,415,117 B1* | 7/2002 | Bates et al. | 399/84 |
| 6,501,562 B1 | 12/2002 | Nakagiri et al. | 358/1.2 |
| 6,594,033 B1 | 7/2003 | Kujirai et al. | 358/1.18 |
| 6,654,509 B2 | 11/2003 | Nishikawa et al. | 382/298 |
| 2003/0038988 A1* | 2/2003 | Anderson et al. | 358/474 |
| 2003/0056177 A1* | 3/2003 | Nara et al. | 715/525 |
| 2003/0056179 A1 | 3/2003 | Mori | 715/530 |
| 2003/0056180 A1* | 3/2003 | Mori | 715/530 |
| 2004/0111675 A1 | 7/2004 | Mori et al. | 715/513 |
| 2004/0125407 A1 | 7/2004 | Nishikawa et al. | 358/1.18 |
| 2004/0139389 A1 | 7/2004 | Sato et al. | 715/500.1 |

(Continued)

FOREIGN PATENT DOCUMENTS

JP  02-233059  9/1990

(Continued)

*Primary Examiner*—Twyler L. Haskins
*Assistant Examiner*—Fred Guillermety
(74) *Attorney, Agent, or Firm*—Fitzpatrick, Cella, Harper & Scinto

(57) ABSTRACT

A document creation method according to this invention includes an image capturing step of capturing image data of each page, a boundary image specifying step of specifying a boundary image serving as the boundary between sets of pages from image data captured in the image capturing step, and a document creation step of creating, on the basis of the image data captured in the image capturing step, an electronic document divided into different chapters at the position of the boundary image specified in the boundary image specifying step. The electronic document created in the document creation step is divided into a plurality of chapters, and boundary pages are set between the plurality of chapters.

3 Claims, 54 Drawing Sheets

U.S. PATENT DOCUMENTS

2005/0050452 A1 * 3/2005 Weitzel et al. .............. 715/513

FOREIGN PATENT DOCUMENTS

| | | |
|---|---|---|
| JP | 06-274593 | 9/1994 |
| JP | 7-283933 | 10/1995 |
| JP | 2000-165639 | 6/2000 |
| JP | 2002-132642 | 5/2002 |

* cited by examiner

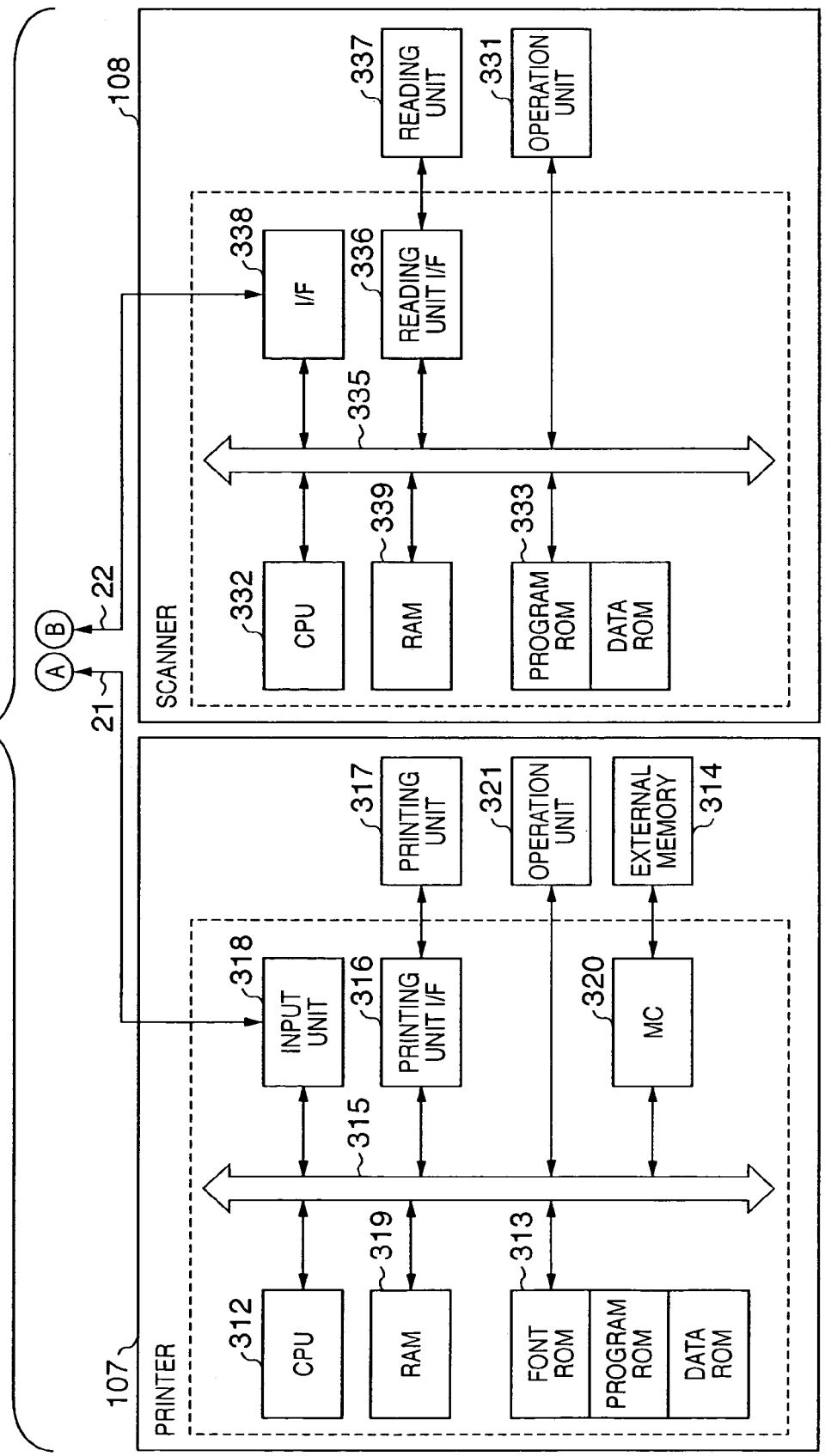

FIG. 4A

| NO | ATTRIBUTE INFORMATION | | REMARKS |
|---|---|---|---|
| 1 | PRINTING METHOD | SINGLE-SIDED/ DOUBLE-SIDED/ BOOKBINDING PRINTING | |
| 2 | PAPER SIZE | ORIGINAL SIZE/ FIXED SIZE | • Z-FOLD IS DESIGNATED WHEN "A4+A3", "B4+B3", OR "LETTER+LEDGER (11x17)" IS DESIGNATED.<br>• ORIGINAL SIZE OF FIRST CHAPTER/PAGE IS AUTOMATICALLY SELECTED WHEN BOOKBINDING PRINTING OR N-up PRINTING IS DESIGNATED. |
| 3 | PAPER DIRECTION | PORTRAIT/LANDSCAPE | • SELECTABLE ONLY FOR FIXED SIZE |
| 4 | BINDING MARGIN/ BINDING DIRECTION | | • SHIFT/ENLARGEMENT & REDUCTION CAN BE DESIGNATED |
| 5 | N-up PRINTING | NUMBER OF PAGES/ LAYOUT ORDER/BOUNDARY/ LAYOUT POSITION, ETC. | • LAYOUT POSITION: NINE PATTERNS<br>• X1 PRINTING CAN BE DESIGNATED. |
| 6 | ENLARGEMENT/ REDUCTION | ON/OFF | ON/OFF CAN BE AUTOMATICALLY DESIGNATED WHEN PAPER SIZE IS FIXED SIZE OR N-up PRINTING IS SELECTED. |
| 7 | WATERMARK | | • WATERMARK CAN BE DESIGNATED INDIVIDUALLY IN LOGICAL OR PHYSICAL PAGES.<br>• ALL CHAPTERS/PAGES ARE TARGETED. |

FIG. 4B

| | | |
|---|---|---|
| 8 | HEADER/FOOTER | • HEADER/FOOTER CAN BE DESIGNATED INDIVIDUALLY IN LOGICAL OR PHYSICAL PAGES.<br>• ALL CHAPTERS/PAGES ARE TARGETED. |
| 9 | DELIVERY METHOD | STAPLING/PUNCH HOLE<br>• STAPLING/PUNCHING ONLY IN SINGLE-/DOUBLE-SIDED PRINTING<br>• STAPLING AT ONE/TWO PORTIONS |
| 10 | DETAILS OF BOOKBINDING | OPENING DIRECTION/SADDLE STITCH/ ENLARGEMENT & REDUCTION DESIGNATION/BINDING MARGIN/ FASCICLE DESIGNATION, ETC.<br>• ONLY IN BOOKBINDING PRINTING |
| 11 | FRONT/BACK COVER | • PRINTING IS DESIGNATED FOR 1/2 FRONT COVER OR 1/2 BACK COVER.<br>• FEED PORT (INCLUDING INSERTER) IS DESIGNATED. |
| 12 | INDEX SHEET | • PRINTING OF CHARACTER STRING ON INDEX PORTION OR ANNOTATION ON INDEX SHEET CAN BE SET.<br>• BOOKBINDING PRINTING CANNOT BE DESIGNATED. |
| 13 | SLIP SHEET | • FEED PORT (INCLUDING INSERTER) IS DESIGNATED.<br>• ORIGINAL DATA CAN BE PRINTED ON INSERTED PAPER.<br>• BOOKBINDING PRINTING CANNOT BE DESIGNATED. |
| 14 | CHAPTERING | "NONE"/"PAGE BREAK"/ "PAPER CHANGE"<br>• "PAPER CHANGE" IS FIXED WHEN INDEX SHEET OR SLIP SHEET IS DESIGNATED.<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | ORIGINAL SIZE/ FIXED SIZE | • "PAPER CHANGE" IS AUTOMATICALLY DESIGNATED WHEN FIXED SIZE IS SELECTED.<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK. |
| 2 | PAPER DIRECTION | PORTRAIT/LANDSCAPE | • SELECTABLE ONLY FOR FIXED SIZE |
| 3 | N-up PRINTING DESIGNATION | NUMBER OF PAGES/ LAYOUT ORDER/BOUNDARY/ LAYOUT POSITION, ETC. | • LAYOUT POSITION: NINE PATTERNS<br>• X1 PRINTING CAN BE DESIGNATED. |
| 4 | ENLARGEMENT/ REDUCTION | ON / OFF | • ON/OFF CAN BE AUTOMATICALLY DESIGNATED WHEN PAPER SIZE IS FIXED SIZE OR N-up PRINTING IS SELECTED. |
| 5 | WATERMARK | DISPLAY/NON-DISPLAY | • WHETHER TO DISPLAY ALL WATERMARKS DESIGNATED BY BOOK IS DESIGNATED. |
| 6 | HEADER/FOOTER | DISPLAY/NON-DISPLAY | • WHETHER TO DISPLAY ALL HEADERS/FOOTERS DESIGNATED BY BOOK IS DESIGNATED. |
| 7 | DELIVERY METHOD | STAPLING | • STAPLING CAN BE SET OFF WHEN STAPLING IS DESIGNATED BY BOOK. DEFAULT VALUE IS "ON". |

FIG. 6

| NO | ATTRIBUTE INFORMATION | | REMARKS |
|---|---|---|---|
| 1 | PAGE ROTATION DESIGNATION | | • 0°/90°/180°/270° CAN BE DESIGNATED. |
| 2 | WATERMARK | DISPLAY/ NON-DISPLAY | • WHETHER TO DISPLAY ALL WATERMARKS DESIGNATED BY BOOK IS DESIGNATED. |
| 3 | HEADER/FOOTER | DISPLAY/ NON-DISPLAY | • WHETHER TO DISPLAY ALL HEADERS/FOOTERS DESIGNATED BY BOOK IS DESIGNATED. |
| 4 | ZOOM | 50% - 200% | • MAGNIFICATION RELATIVE TO SIZE WHICH IS FIT IN VIRTUAL LOGICAL PAGE REGION AND SET AS 100% IS DESIGNATED |
| 5 | LAYOUT POSITION | | • NINE FIXED PATTERNS, ARBITRARY POSITION IS DESIGNATED. |
| 6 | ANNOTATION | | |
| 7 | VARIABLE ITEM | | |
| 8 | PAGE SEPARATION | | |

FIG. 14

DETAILED SETTING FOR DOCUMENT

PAGE SETUP | FINISHING | EDIT | PAPER SOURCE | PRINTING QUALITY

PAPER SIZE: COMPLY WITH PAGE SIZE ▼

☑ ZOOM PAPER — 1401

PAPER DIRECTION: ● PORTRAIT ○ LANDSCAPE

PAGE LAYOUT: 1 PAGE/SHEET ▼

ORDER: NONE ▼

FRAME: NONE ▼

☐ ZOOM AREA — 1402

ZOOM ARRANGE: CANTER ▼

[OK] [CANCEL] [APPLY] [DEFAULT] [HELP]

DETAILED SETTING FOR CHAPTER — [?] [X]

| PAGE SETUP | FINISHING | EDIT | PAPER SOURCE |

☑ FOLLOW DOCUMENT ATTRIBUTE — 1501

PAPER SIZE : [A] COMPLY WITH PAGE SIZE ▼

☑ ZOOM PAPER

PAPER DIRECTION : [A] ● PORTRAIT  [A] ○ LANDSCAPE

☑ FOLLOW DOCUMENT ATTRIBUTE — 1502

PAGE LAYOUT : [ ] 1 PAGE/SHEET ▼

ORDER : NONE ▼

FRAME : NONE ▼

☑ FOLLOW DOCUMENT ATTRIBUTE — 1503

☐ ZOOM AREA

ZOOM ARRANGE : [ ] CANTER ▼

[ DEFAULT ]

[ OK ]  [ CANCEL ]  [ APPLY ]  [ HELP ]

FIG. 16

DETAILED SETTING FOR CHAPTER

| PAGE SETUP | FINISHING | EDIT | PAPER SOURCE |

☐ FOLLOW DOCUMENT ATTRIBUTE —1501

PAPER SIZE : [A] [A4 ▼]

☑ ZOOM PAPER

PAPER DIRECTION : [A] ● PORTRAIT  [A] ○ LANDSCAPE

☐ FOLLOW DOCUMENT ATTRIBUTE —1502

PAGE LAYOUT : [▦ 4 PAGES/SHEET ▼]

ORDER : [▦ FROM UPPER LEFT ▼]

FRAME : [NONE ▼]

☑ FOLLOW DOCUMENT ATTRIBUTE —1503

☐ ZOOM AREA

ZOOM ARRANGE : [☐ CANTER ▼]

[OK] [CANCEL] [APPLY] [HELP]  [DEFAULT]

1500

F I G. 32

SHEET INSERTION SETTING

COMBINATION (C): SLIP SHEET ▼ ~3101

FRONT COVER (F):
○ ADD FRONT COVER USING INSERTER
◉ DESIGNATE SHEET FEEDER AND FEED START SHEET

SHEET FEEDER (S): AUTO ▼

INDEX SHEET

TYPE (Y): A4, FIVE SETS ▼

SHEET FEEDER (F): CASSETTE 3 ▼

☐ PRINT CHAPTER NAME ON INDEX TAB (T)

DETAILED SETTING FOR TEXT (D)...

SHEET FEEDER FOR SLIP SHEET (I): AUTO ▼

☐ PRINT ORIGINAL DATA ON SLIP SHEET

☐ INSERT SLIP SHEET FROM SECOND CHAPTER (N) ~3102

SHEET FEEDER FOR BACK COVER (B): AUTO ▼

| OK | CANCEL | APPLY (A) | HELP (H) |

FIG. 34

| FOLDER | IMPORT METHOD | PROCESS IN IMPORT |

FILE FORMAT (B):
[TIFF ▶] ~3301

☑ DELETE BLANK SHEET ( ○ ) ~3301
　☐ SUCCESSIVE BLANK SHEETS ARE NOT DELETED. ( ○ ) ~3302

☑ CHAPTERING ( ○ ) ~3303

CHAPTERING METHOD : ● DIVIDE CHAPTER BY BLANK PAGE ( ○ )
　3304　3305~☑ CHANGE BLANK SHEET TO SLIP SHEET (CHANGE TO SHEET INSERTION SETTING)
　　　　3306~○ DIVIDE CHAPTER BETWEEN SINGLE-SIDED PAGE AND DOUBLE-SIDED PAGE

IMAGE PROCESS

☐ AUTOMATICALLY REMOVE BLACK POINT

☐ AUTOMATICALLY CORRECT SKEW

[OK]　[CANCEL]　[HELP (H)]

FIG. 36

AUTOMATIC CHAPTERING BY BLANK PAGE

CHAPTERING METHOD : ⦿ DIVIDE CHAPTER BY BLANK PAGE ( )
                           ☑ CHANGE BLANK SHEET TO SLIP SHEET

◯ DIVIDE CHAPTER BETWEEN SINGLE-SIDED PAGE AND DOUBLE-SIDED PAGE

☐ DELETE BLANK SHEET ( )

☐ SUCCESSIVE BLANK SHEETS ARE NOT DELETED. ( )

[ APPLY ( ) ]     [ CANCEL ]

FIG. 37

| NO | ATTRIBUTE INFORMATION | | REMARKS |
|---|---|---|---|
| 1 | PAPER SIZE | ORIGINAL SIZE/ FIXED SIZE | • "PAPER CHANGE" IS AUTOMATICALLY DESIGNATED WHEN FIXED SIZE IS SELECTED.<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK. |
| 2 | PAPER DIRECTION | PORTRAIT/LANDSCAPE | • SELECTABLE ONLY FOR FIXED SIZE |
| 3 | N-up PRINTING DESIGNATION | NUMBER OF PAGES/ LAYOUT ORDER/BOUNDARY/ LAYOUT POSITION, ETC. | • LAYOUT POSITION: NINE PATTERNS<br>• X1 PRINTING CAN BE DESIGNATED. |
| 4 | ENLARGEMENT/ REDUCTION | ON / OFF | • ON/OFF CAN BE AUTOMATICALLY DESIGNATED WHEN PAPER SIZE IS FIXED SIZE OR N-up PRINTING IS SELECTED. |
| 5 | WATERMARK | DISPLAY/NON-DISPLAY | • WHETHER TO DISPLAY ALL WATERMARKS DESIGNATED BY BOOK IS DESIGNATED. |
| 6 | HEADER/FOOTER | DISPLAY/NON-DISPLAY | • WHETHER TO DISPLAY ALL HEADERS/FOOTERS DESIGNATED BY BOOK IS DESIGNATED. |
| 7 | DELIVERY METHOD | STAPLING | • STAPLING CAN BE SET OFF WHEN STAPLING IS DESIGNATED BY BOOK. DEFAULT VALUE IS "ON". |
| 8 | INDEX SHEET | | • PRINTING OF CHARACTER STRING ON INDEX PORTION OR ANNOTATION ON INDEX SHEET CAN BE SET.<br>• BOOKBINDING PRINTING CANNOT BE DESIGNATED. |
| 9 | SLIP SHEET | | • FEED PORT (INCLUDING INSERTER) IS DESIGNATED.<br>• ORIGINAL DATA CAN BE PRINTED ON INSERTED PAPER.<br>• BOOKBINDING PRINTING CANNOT BE DESIGNATED.<br>• ANNOTATION CAN BE SET. |

FIG. 51

| FOLDER | IMPORT METHOD | PROCESS IN IMPORT |

FILE FORMAT (B):
TIFF ▼

☑ DELETE BLANK SHEET ( ○ ) ~5101
  ☐ SUCCESSIVE BLANK SHEETS ARE NOT DELETED. ( ○ ) ~5102

☑ CHAPTERING ( ○ ) ~5103

CHAPTERING METHOD : ● DIVIDE CHAPTER BY SINGLE-SIDED BLANK SHEET (CHAPTER SHEET)
5104   5105~☑ CHANGE CHAPTER SHEET TO SLIP SHEET (CHANGE TO SHEET INSERTION SETTING)
       ○ DIVIDE CHAPTER BY BLANK SHEET

IMAGE PROCESS
☐ AUTOMATICALLY REMOVE BLACK POINT
☐ AUTOMATICALLY CORRECT SKEW

OK   CANCEL   HELP (H)

FIG. 52

AUTOMATIC CHAPTERING BY BLANK PAGE

CHAPTERING METHOD: ⦿ DIVIDE CHAPTER BY CHAPTER SHEET ( ○ )
  ☑ CHANGE CHAPTER SHEET TO SLIP SHEET
  ○ DIVIDE CHAPTER BY BLANK SHEET

☐ DELETE BLANK SHEET ( ○ )
  ☐ SUCCESSIVE BLANK SHEETS ARE NOT DELETED. ( ○ )

APPLY ( ○ )  CANCEL

DOCUMENT CREATION METHOD AND DOCUMENT CREATION APPARATUS FOR REFLECTING A DOCUMENT STRUCTURE OF A PAPER DOCUMENT IN AN ELECTRONIC DOCUMENT

FIELD OF THE INVENTION

The present invention relates to a document processing method and apparatus having an information processing apparatus (e.g., personal computer) and a scanner and, more particularly, to a document processing method and document processing apparatus capable of reflecting even the document structure of a loaded paper medium in an electronic document when image data loaded from a scanner is saved as an electronic document.

BACKGROUND OF THE INVENTION

The most popular method of copying a paper original is to utilize a copying machine. Recent digital copying machines have a read image transmission function of transmitting, as a file, image data of an original loaded from a scanner to a host computer (external apparatus) connected via a network (see, e.g., Japanese Patent Laid-Open No. 2002-132642).

An original is set on the scanner of a copying machine, the number of copies is input, the copy button is pressed, and then the designated number of copies can be created. According to this method, however, if an original is skewed and read by the scanner, corresponding pages of all copies are skewed and printed. Copying by the copying machine adds noise or black points to an original, degrading the image quality. This method cannot remove an unnecessary page number, header, or footer attached to an original, and add a new page number, header, or footer. Also, this method cannot provide more advanced original editing such as adjustment of a position at which a specific original page is to be printed. To solve these problems, there have conventionally been proposed two methods.

The first method is executed by a single copying machine. An original read by the scanner of the copying machine is temporarily saved in the copying machine. The user confirms the state of the saved original, and performs print settings for improving the above-mentioned problems. The saved original is then copied in accordance with the print settings (see, e.g., Japanese Patent Laid-Open No. 7-283933). This method is adopted when skew correction and removal of noise and black points are automatically executed. However, advanced editing such as header/footer editing or print position adjustment for each page is rarely executed owing to the operability and performance of the copying machine, or is performed at poor operability.

The second method enables even advanced editing by temporarily transferring an original read by the scanner of a copying machine to an information processing apparatus connected to the copying machine, and using application software with high performance and advanced functions in the information processing apparatus and high-operability interfaces such as a display, mouse, and keyboard (see, e.g., Japanese Patent Laid-Open No. 2000-165639).

Conventionally, a high-quality copy of a paper original is created by these two methods.

When a document is converted into electronic data and captured as image data by a scanner to generate an electronic document, problems in image quality such as skew correction and density adjustment unique to a paper original occur. In some cases, a blank page called a slip sheet (or an inserting paper) is inserted in a paper input original in order to represent a logical break in the document.

In processing a paper original of a format which expresses a document structure by inserting a blank sheet (slip sheet) in a document, data captured by the scanner are arranged in a simple order of electronized image data. For this reason, blank image data of one page is merely contained in the electronized document, losing a logical structure in which the document is divided by a blank sheet. In this case, the user must search an electronic document for a slip sheet, and assign the document a document structure which is divided by the slip sheet.

When a printer or the like used for output charges the user for the number of printouts, he is charged even for a blank page though no data is printed on it To prevent this, there is provided a function of deleting a blank page in saving scanned image data as a document. In this case, a slip sheet representing the break of a document is lost from a printing result, and the electronic document cannot be logically divided by a blank page and restored as a structured document.

SUMMARY OF THE INVENTION

The present invention has been made in consideration of the above situation, and has as its object to provide a document processing method and document processing apparatus which detect a page representing the break of a document from a scanned original image, e.g., a blank page or a specific page representing the break of the document, reproduce the document structure of a paper medium in an electronic document, and form the electronic document so as to prevent unwanted charging even upon printing.

To achieve the above object, the present invention has the following configuration.

The present invention can reproduce the hierarchical structure of a paper original document in an electronic original file by, when a slip sheet (blank page) is detected in image data obtained by loading a paper original, dividing the hierarchical structure of a document at the position of the slip sheet and creating an electronized document.

Charging on a blank page or sheet in printing can be prevented by replacing a blank page original with a slip sheet insertion setting.

Further, a blank original which is unnecessary for the document structure can be removed by replacing a blank page original with the slip sheet insertion setting.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2A and 2B are block diagrams showing an example of a hardware configuration which implements the document processing system according to the embodiment;

FIGS. 4A and 4B are tables showing a list of book attributes;

FIG. 5 is a table showing a list of chapter attributes in the first embodiment;

FIG. 6 is a table showing a list of page attributes;

FIG. 14 is a view showing an example of a dialog window for setting a whole document serving as the uppermost layer of the data structure;

FIG. 15 is a view showing an example of a dialog window for setting a chapter serving as the intermediate layer of the data structure;

FIG. 16 is a view showing an example of setting a unique attribute in the dialog window of FIG. 15;

FIG. 32 is a view showing an example of an electronic document sheet insertion setting window after the first embodiment of the present invention is applied;

FIG. 34 is a view showing an example of a user interface window for selecting a process option in import according to the first embodiment;

FIG. 36 is a view showing an example of a user interface window for selecting an option in document chaptering according to the first embodiment;

FIG. 37 is a table showing a list of chapter attributes according to the second embodiment;

FIG. 51 is a view showing an example of a user interface window for selecting a process option in import according to the second embodiment; and FIG. 52 is a view showing an example of a user interface window for selecting an option in document chaptering according to the second embodiment.

DETAILED DESCRIPTION OF THE PREFERRED EMBODIMENTS

First Embodiment

Figure 1:
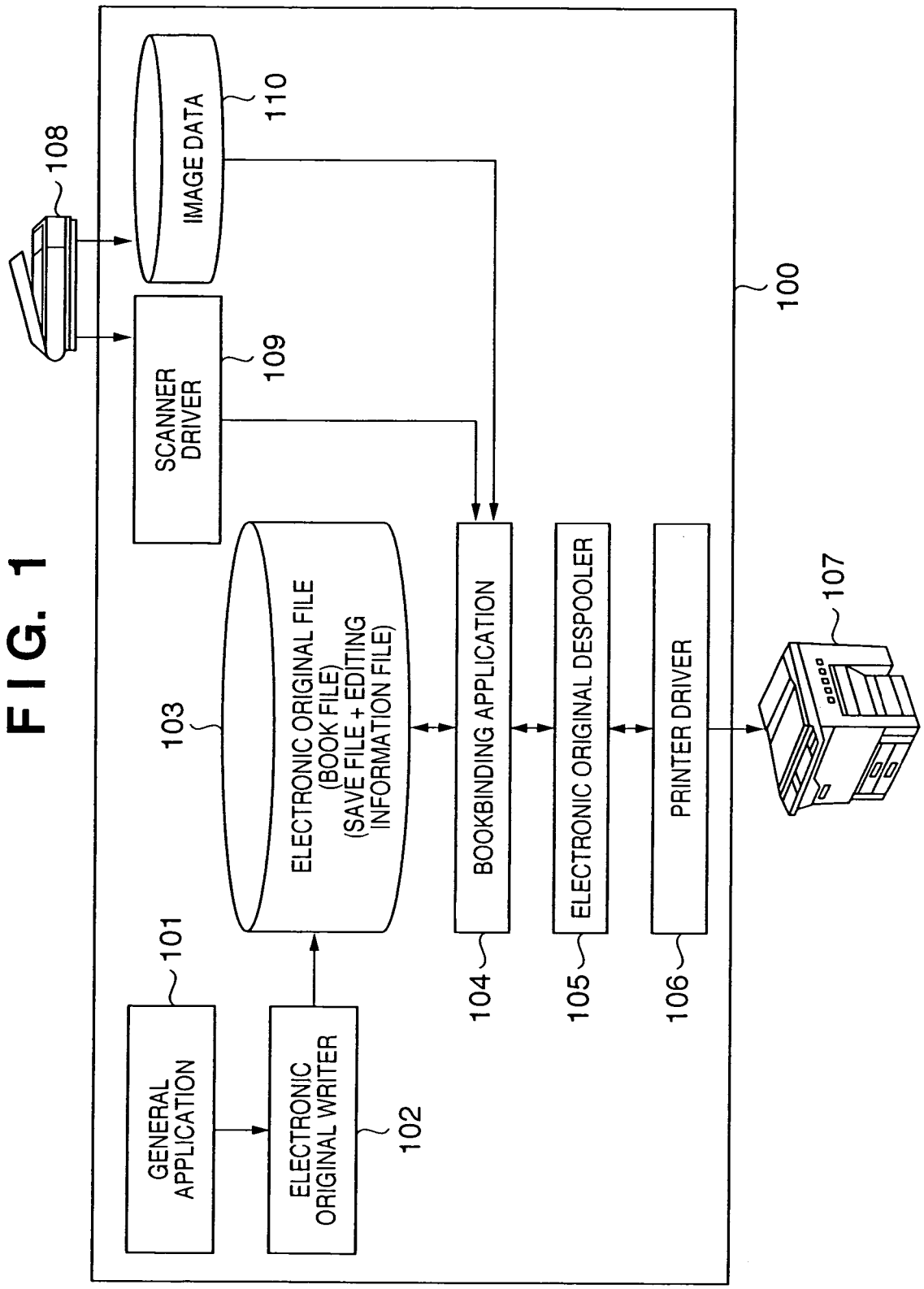
FIG. 1 is a block diagram showing an example of the software configuration of a stand-alone document processing system according to an embodiment.

The first embodiment of the present invention will be described in detail below with reference to the accompanying drawings.

Outline of Document Processing System According to First Embodiment

A document processing system according to the first embodiment can process not only image data read by a scanner but also electronic files created by various application programs. Prior to a description of the first embodiment, the background in which the document processing system of the first embodiment becomes necessary will be explained.

Various application programs are provided in accordance with the types of data because different data types such as a character, table, and image fetched by a digital camera or scanner require different structures for defining these data and different editing operations for these data. The user must use different applications for different data types: a character processing program for editing of characters, a spreadsheet program for editing of tables, and an image editing programs for editing of images.

The user generally uses an application program corresponding to each data type. However, a document to be created by the user is usually not a document made up of only one type of data such as only characters, tables, or images, but a document made up of a plurality of types of data such as characters and tables or characters and images. In order to create a target document containing a plurality of types of data, the user utilizes the print functions of various applications, prints data by using the applications, and combines printed materials in a desirable order.

A program called "Office Suite" which forms one integrated application from various applications provides a function of combining data generated by respective applications into one document. The use of the integrated application allows the user to combine data created by respective applications into one target document by using a specific application included in the integrated application.

However, to assign page numbers to pages when the user creates one target document by combining printed materials generated by various applications, the user must print out all necessary data, combine them into a document, and then determine page numbers to be assigned. Each application writes determined page numbers on respective pages (to be referred to as logical pages or original pages) of an original created by the application. Even if the application program has a function of assigning page numbers, the page numbers of discontinuous pages must be designated by the user. If the pages of the target document are rearranged, page numbers must be reassigned in accordance with the rearrangement. These pages must also be edited and printed again by an application when not data contents but merely the format is changed so that a plurality of original pages are combined into one page (to be referred to as a physical page or print page) as a print material, or single-sided printing is changed to double-sided printing.

Since an application which can manage data changes depending on the type of data, the user must manually provide an interface between applications. This means that much labor is demanded of the user, decreasing the productivity. Further, many manual operations readily generate errors.

The use of an integrated application for creating a target document enables arranging various data in the data state without printing them out. No heavy labor is required in comparison with creation of a target document by combining print materials. However, applications for editing and creating various data are restricted to ones included in the integrated application, so a user-desired application is not always exploited. A target document created by the integrated application is one document file, and management such as editing and output is done for each file. The application function poses many constraints on setting the format of part of a document file. For example, the user must change format settings at each portion where the format is changed, and print a target page again. This leads to much labor and low productivity, similar to the above-mentioned method.

In this background, the document processing system of the first embodiment solves the above problems and achieves the object of the present invention. The document processing system can therefore process not only image data read by a scanner, but also electronic files created by various application programs.

The outline of the document processing system according to the first embodiment of the present invention will be described with reference to FIGS. 1 to 13. In the document processing system, a data file created by a general application is converted into an electronic original file by an electronic original writer (to be also referred to as a print data save driver). An image read by a scanner is also converted into an electronic original file by a means such as a scanner driver or another application software. A bookbinding application (to be also referred to as a printing control application) provides a function of editing the electronic original file. In the first embodiment, a general application, scanner driver, electronic original writer, bookbinding application, and electronic original despooler (to be also referred to as a printing application) are separately described for distinction between these functions. However, a package provided to the user is not limited to them, and an application or graphic engine as a combination of them may be provided, details of which will be described below.

Example of Software Configuration of Document Processing System according to First Embodiment FIG. 1 is a block diagram showing the software configuration of the document processing system according to the first embodiment.

The document processing system is implemented by a digital computer 100 (to be also referred to as a host computer hereafter) as a suitable embodiment of a document processing apparatus (information processing apparatus) according to the present invention. A general application 101 is an application program which provides functions such as wordprocessing, spreadsheet, photo-retouch, draw, paint, presentation, and text editing. The general application 101 has a printing function for the OS (Operating System). Such applications utilize a predetermined interface (generally called GDI) provided by the OS in printing application data such as created document data or image data. To print created data, the application 101 transmits an output command (called a GDI function) which is determined in advance for the output module of the OS providing the interface and has an OS-dependent format. The output module receives the output command, converts the command into a format processible by an output device such as a printer, and outputs the converted command (called a DDI function). Since the format processible by the output device changes depending on the type of device, the manufacturer, and the model, a device driver is provided for each device. The OS converts a command by using the device driver to generate print data, and combines the print data by JL (Job Language) to generate a print job. When the OS is Microsoft Windows®, the output module is a GDI (Graphical Device Interface) module.

An electronic original writer 102 is an improvement of the above-mentioned device drivers, and is a software module provided to implement the document processing system. The electronic original writer 102 does not target a specific output device, and generates an output command of a format processible by a bookbinding application 104 or printer driver 106 (to be described later). The format (to be referred to as an "electronic original format" hereinafter) converted by the electronic original writer 102 is not particularly limited as far as each original page can be expressed by a detailed format. Of substantial standard formats, for example, the PDF format by Adobe Systems and the SVG format can be adopted as electronic original formats.

When the application 101 utilizes the electronic original writer 102, the electronic original writer 102 is designated as a device driver used for output, and then caused to execute printing. An electronic original file created by the electronic original writer 102 does not have a complete electronic original file format. For this reason, the electronic original writer 102 is designated as a device driver by the bookbinding application 104, and executes conversion of application data into an electronic original file under the management of the bookbinding application 104. The bookbinding application 104 completes a new incomplete electronic original file generated by the electronic original writer 102 as an electronic original file having the following format. In case of necessity to definitely discriminate these files, a file created by the electronic original writer 102 will be called an electronic original file, and an electronic original file given a structure by the bookbinding application will be called a book file. If these files need not be particularly discriminated, a document file generated by an application, an electronic original file, and a book file are called document files (or document data).

As described above, the electronic original writer 102 is designated as a device driver, and the general application 101 prints the data. Application data is converted into an electronic original format in pages (to be referred to as "logical pages" or "original pages" hereinafter) defined by the application 101. The converted data is stored as an electronic original file 103 in a storage medium such as a hard disk. The hard disk may be the local drive of the computer which implements the document processing system according to the first embodiment, or when the computer is connected to a network, may be a drive provided on the network.

The bookbinding application 104 provides the user with a function of loading and editing the electronic original file or book file 103. The bookbinding application 104 provides no function of editing the contents of each page, but a function of editing a chapter or book structure (to be described later) made up of pages as a minimum unit.

In the first embodiment, print data from the general application 101 is saved as the electronic original file 103 in the system via the electronic original writer 102. The electronic original file 103 contains an intermediate file and editing information file. The intermediate file contains content data of a print material, print setting data, and the like. Content data of a print material is data prepared by converting data created in an application by the user into an intermediate code. Print setting data is data which describes how to output content data (output form or the like). In addition, the electronic original file 103 contains application extension data called an editing information file for providing a user interface when the bookbinding application 104 prompts the user to edit the contents of the electronic original file 103 or issue an output instruction. The editing information file stores not only extension data for providing a user interface, but also print setting data which cannot be stored in an intermediate file. The editing information file can also save print settings which cannot be saved in a standard format when the intermediate file adopts the standard format.

The electronic original file 103 is loaded into the bookbinding application 104. The bookbinding application 104 maps the contents of the intermediate file into a table in the memory. If the editing information file contains unique settings which are not stored in the intermediate file, the bookbinding application 104 reflects the settings in the table mapped in the memory. The bookbinding application 104 can change, display, save, and print the output form of the contents of the loaded intermediate file. A printing process is actually executed by an electronic original despooler 105.

To print the book file 103 edited by the bookbinding application 104, the bookbinding application 104 activates the electronic original despooler 105. The electronic original despooler 105 is a program module which is installed in the computer together with the bookbinding application. The electronic original despooler 105 is used to output drawing data to a printer driver in printing a document (book file) used by the bookbinding application. The electronic original despooler 105 reads out a designated book file (electronic original file) from the hard disk. To print each page in a format described in the book file (electronic original file), i.e., a format defined by the intermediate file and editing information file, the electronic original despooler 105 generates an output command complying with the output module (graphic engine) of the OS described above, and outputs the command to the output module (not shown). At this time, the driver 106 of a printer 107 used as an output device is designated as a device driver. The output module converts the output command received using the designated printer driver 106 of the printer 107 into a device command interpretable by the printer 107. The device command is transmitted to the printer 107, which prints an image corresponding to the command.

The system in FIG. 1 comprises a scanner, and a scanner 108 can read an image and save it as the electronic original file 103. An image can be captured from the scanner 108 by roughly two methods. One method is called a pull scan method of issuing a scan instruction from an application which is to receive an image. More specifically, an application acquires image data via a scanner driver 109. The scanner driver is generally a TWAIN or ISIS driver. The resolution and the number of colors can be set by the scanner driver.

The other method is a push scan method of issuing a scan instruction from a scanner. More specifically, the scanner stores an image file in a hard disk shared by a network. In this case, the scanner must have a network function common to the digital computer 100, and have the authority to write in a shared folder.

In push scan, the image quality of an image file is set via the panel of the scanner main body or the like. General examples of the image format are TIFF, JPEG, BMP, and PDF. In pull scan, the bookbinding application 104 directly acquires and loads image data from the scanner driver. In push scan, the bookbinding application 104 loads an image file saved in, e.g., a predetermined folder of the digital computer 100. At this time, the bookbinding application 104 monitors the folder which stores a scanned image file, or receives a scan end notification from the scanner, and can automatically load an image file without waiting for any input from the user. Alternatively, the user may instruct the bookbinding application 104 to load an image file from the digital computer 100.

Figure 2A:
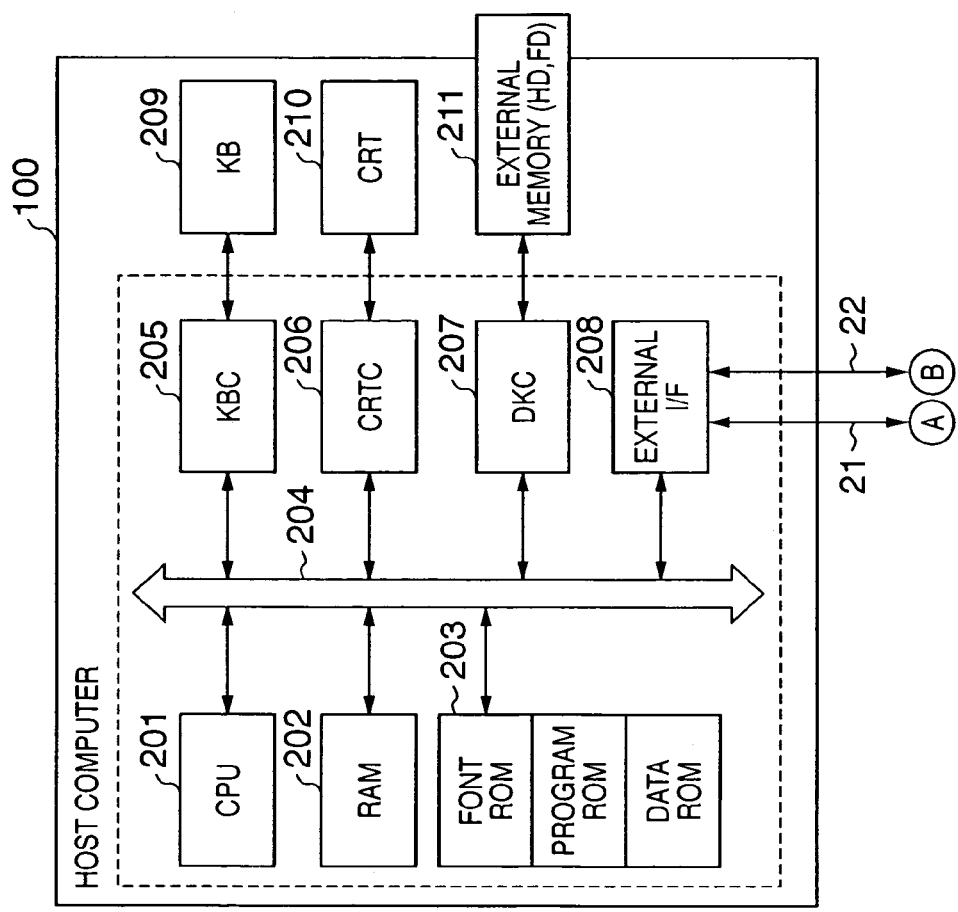

Example of Hardware Configuration of Document Processing System according to First Embodiment FIGS. 2A and 2B are block diagrams showing the hardware configuration of the document processing system according to the first embodiment. In FIGS. 2A and 2B, the host computer 100 comprises a CPU 201 which executes a process for a document containing figures, images, characters, tables (including spreadsheets and the like), and the like on the basis of a document processing program or the like stored in a program ROM within a ROM 203 or an external memory 211. The CPU 201 comprehensively controls devices connected to a system bus 204. The program ROM within the ROM 203 or the external memory 211 stores, e.g., an operating system program serving as the control program of the CPU 201. A font ROM within the ROM 203 or the external memory 211 stores, e.g., font data used in the document process. A data ROM within the ROM 203 or the external memory 211 stores various data used in the document process or the like. The RAM 202 functions as a main memory, work area, or the like for the CPU 201.

A keyboard controller (KBC) 205 controls a key input from a keyboard 209 or a pointing device (not shown). A CRT controller (CRTC) 206 controls the display of a CRT display (CRT) 210. A disk controller (DKC) 207 controls access to the external memory 211 such as a hard disk (HD) or floppy® disk (FD) which stores a boot program, various applications, font data, user files, edited files, a scanner control program (scanner driver), a printer control command generation program (to be referred to as a printer driver hereinafter), and the like. An external interface (external I/F) 208 is connected to a printer 107 via a bidirectional interface (interface) 21 and the scanner 108 via a bidirectional interface 22, and executes a communication control process with the printer 107 and scanner 108. An NC 212 is connected to a network, and executes a communication control process with another device connected to the network. The printer 107 and scanner 108 may be connected via the network.

The CPU 201 executes, e.g., an outline font rasterization process to a display information RAM set in the RAM 202, and enables WYSIWYG on the CRT 210. The CPU 201 opens various registered windows and executes various data processes on the basis of commands designated on the CRT 210 with a mouse cursor (not shown) or the like. When the user executes printing, he/she opens a print setting window, and can perform setting of a printer and setting of a printing process method to the printer driver that includes selection of a print mode.

The printer 107 is controlled by a CPU 312. The printer CPU 312 outputs an image signal as output information to a printing unit (printer engine) 317 connected to a system bus 315 on the basis of a control program stored in a program ROM within a ROM 313 or a control program stored in an external memory 314. The program ROM within the ROM 313 stores, e.g., the control program of the CPU 312. A font ROM within the ROM 313 stores, e.g., font data used to generate the output information. A data ROM within the ROM 313 stores, e.g., information used in the host computer for a printer having no external memory 314 such as a hard disk.

The CPU 312 can communicate with the host computer via an input unit 318, and notify the host computer 100 of internal printer information or the like. A RAM 319 functions as a main memory, work area, or the like for the CPU 312, and the memory capacity can be expanded by an optional RAM connected to an expansion port (not shown). The RAM 319 is used as an output information mapping area, environment data storage area, NVRAM, or the like. Access to the external memory 314 such as a hard disk (HD) or IC card is controlled by a memory controller (MC) 320. The external memory 314 is connected as an option, and stores font data, emulation programs, form data, and the like. Reference numeral 321 denotes an operation panel having operation switches, an LED display, and the like.

The number of external memories 314 is not limited to one, and a plurality of external memories 314 may be arranged. A plurality of external memories which store an option card and a program for interpreting the printer control languages of different language systems in addition to built-in fonts may be connected. Further, an NVRAM (not shown) may be adopted to store printer mode setting information from the operation unit 321.

The scanner 108 is controlled by a CPU 332. The scanner CPU 332 receives an image signal serving as input information from a reading unit (scanner engine) 337 connected to a system bus 335 on the basis of a control program stored in a program ROM within a ROM 333. The program ROM within the ROM 333 stores a control program and the like for the CPU 332. A data ROM within the ROM 333 stores information and the like utilized by the CPU 332.

The CPU 332 can communicate with the host computer 100 via an I/F 338, and can notify the host computer 100 of internal scanner information or the like. A RAM 339 functions as a main memory, work area, or the like for the CPU 332, and also functions as an image memory for temporarily storing image data read by the scanner engine. The read image data is temporarily stored in the RAM 339 for each page of a sheet, and transmitted to the host computer 100.

The reading unit 337 irradiates an original image with light from a light source, focuses reflected light on an image sensor such as a CCD or CMOS via an optical system, and electronizes light. The reading unit 337 converts the electronic data into a digital signal, and inputs the digital signal to the I/F 338. The reading unit 337 may adopt a CIS. The reading unit 337 is equipped with an ADF (Automatic Document Feeder), has a function of conveying an original set on the feeder to a read position sheet by sheet, and can automatically read an original of a plurality of sheets. The ADF has a sheet reversal function, and can successively read the upper and lower surfaces of one sheet. In this case, read image data is transmitted as image data of one page to the host computer after read of the upper surface. The sheet is then reversed to read the lower surface, and the image data is transmitted as image data of one page to the host computer 100. An operation panel 331 has switches for operations by the operator, e.g., push scan operation, an LED display, and the like.

Example of Format of Electronic Original Data

Before referring to details of the bookbinding application 104, the data format of a book file will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may contain a plurality of chapters, and one chapter may contain a plurality of pages.

Figure 3:
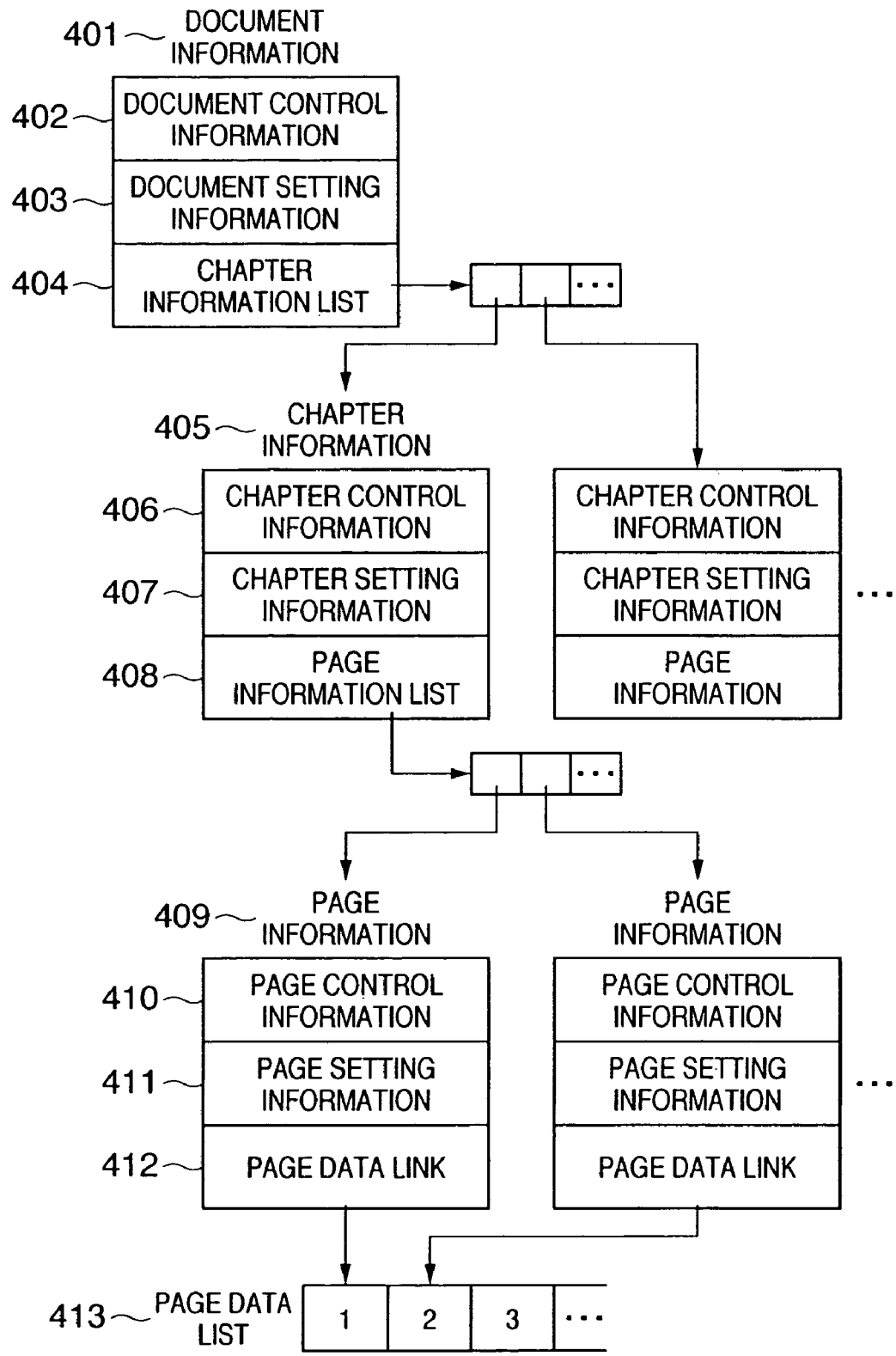
FIG. 3 is a block diagram showing an example of a book file structure.

FIG. 3 is a block diagram schematically showing an example of the book file format. The book file format is expressed by an editing information file. That is, FIG. 3 illustrates the structure of the editing information file of the electronic original file. A book, chapter, and page in the book file are represented by corresponding nodes. One book file contains one book. The book and chapter are a concept for defining a book structure, and contain, as entities, defined attribute values and links to lower layers. The page has, as entities, data of each page output from an application program. The page contains an original page entity (original page data) and a link to each original page data in addition to an attribute value. Note that a print page to be output to a paper medium may contain a plurality of original pages. This structure is displayed not by a link, but by attributes in book, chapter, and page layers.

In FIG. 3, a book file need not be one completed book, and "book" is generalized as "document".

Document information 401 is defined at the top. The document information 401 can be roughly divided into three parts 402 to 404. The document control information 402 holds information such as the path name in the file system of a document file. The document setting information 403 holds layout information such as the page layout, and function setting information of a printing apparatus such as stapling, and corresponds to book attributes. The chapter information list 404 holds as a list a set of chapters which form a document. The list holds chapter information 405.

The chapter information 405 can also be roughly divided into three parts 406 to 408. The chapter control information 406 holds information such as the chapter name. The chapter setting information 407 holds information on the page layout and stapling unique to the chapter, and corresponds to chapter attributes. By holding setting information for each chapter, a document having a complicated layout can be created so that the first chapter has a 2-up layout and the remaining chapters have a 4-up layout. The page information list 408 holds as a list a set of original pages which form each chapter. The page information list 408 designates page information data 409.

The page information data 409 can also be roughly divided into three parts 410 to 412. The page control information 410 holds information such as a page number displayed at the tree. The page setting information 411 holds information such as the page rotation angle and page layout position information, and corresponds to original page attributes. The page link information 412 is original data corresponding to a page. In this example, the page information 409 does not directly have original data, but has only the link information 412. Actual original data is held by a page data list 413.

FIGS. 4A and 4B show a list representing an example of the book attribute (document setting information 403). In general, as for an item which can be defined repetitively on a lower layer, the attribute value of the lower layer is preferentially adopted. As for an item contained in only the book attribute, a value defined in the book attribute is effective throughout the book. An item repetitively defined on a lower layer is a default value used when this item is not defined in the lower layer. In this example, however, whether to preferentially adopt the attribute value of a lower layer can be selected (to be described later). Each item shown in FIGS. 4A and 4B does not correspond to one concrete item, but may contain a plurality of relevant items.

Items unique to the book attribute are five items: details of bookbinding, front/back cover, index sheet, slip sheet, and chaptering. These items are defined throughout the book. As the printing method attribute, three values, i.e., single-sided printing, double-sided printing, and bookbinding printing can be designated. Bookbinding printing is a method of printing in a format which allows bookbinding by bundling a separately designated number of paper sheets, folding the bundle into two, and binding the bundle. As the detailed bookbinding attribute, the opening direction and the number of paper sheets to be bundled can be designated when bookbinding printing is designated.

The front/back cover attribute includes designation of adding paper sheets serving as front and back covers when an electronic original file combined as a book is printed, and designation of contents to be printed on the added paper sheets. The index sheet attribute includes designation of inserting a tabbed index sheet separately prepared in a printing apparatus for chaptering, and designation of contents to be printed on the index (tabbed) portion. This attribute becomes effective when a printing apparatus for use is equipped with an inserter having an inserting function of inserting a paper sheet prepared separately from a print sheet into a desired position, or when a plurality of sheet cassettes can be used. This also applies to the slip sheet attribute.

The slip sheet attribute includes designation of inserting a paper sheet fed from an inserter or sheet feed cassette for chaptering, and designation of a sheet feed source when a slip sheet is inserted.

The chaptering attribute includes designation of whether to use a new paper sheet, use a new print page, or do nothing particular at a chapter break. In single-sided printing, the use of a new paper sheet and the use of a new print page are the same. In double-sided printing, successive chapters are not printed on one paper sheet if "the use of a new paper sheet" is designated, but may be printed on the obverse and reverse of one paper sheet if "the use of a new print page" is designated.

FIG. 5 shows a list representing an example of the chapter attribute (chapter setting information 407), and FIG. 6 shows a list representing an example of the page attribute (page setting information 411). The relationship between the chapter attribute and the page attribute is the same as that between the book attribute and the lower layer attribute.

As for the chapter attribute, there is no item unique to the chapter, and all items overlap those of the book attribute. In general, if the definition of the chapter attribute is different from that of the book attribute, a value defined by the chapter attribute precedes. In this example, however, whether to preferentially adopt the attribute value of a lower layer can be selected (to be described later).

Items common to only the book and chapter attributes are six items: printing method, paper size, paper direction, N-up printing designation, enlargement/reduction, and delivery method. As for the printing method attribute, the book attribute can designate three values, i.e., single-sided printing, double-sided printing, and bookbinding printing. The chapter attribute can designate whether to perform single-sided printing, i.e., single-sided printing and double-sided printing only when the book attribute designates double-sided printing. Single-sided printing and double-sided printing can be switched within one book. The N-up printing designation attribute is an item for designating the number of original pages contained in one print page. Layouts which can be designated are 1×1, 1×2, 2×2, 3×3, 4×4, and the like. The delivery method attribute is an item for designating whether to staple discharged paper sheets. The effectiveness of this attribute depends on whether a printing apparatus for use has a stapling function.

Items unique to the page attribute are a page rotation attribute, zoom, layout designation, annotation, and page separation. The page rotation attribute is an item for designating the rotation angle when an original page is laid out on a print page. The zoom attribute is an item for designating the zoom ratio of an original page. The zoom ratio is designated based on a virtual logical page region size=100%. The virtual logical page region is a region occupied by one original page when original pages are laid out in accordance with N-up designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or character string printed over data created by an application. The header/footer is a watermark printed at the upper or lower margin of each page. For the header/footer, items such as a page number, and time and date which can be designated by variables are prepared. Contents which can be designated by the watermark attribute and header/footer attribute are common between the chapter and the page, but are different from those of the book. The book can set the watermark and header/footer contents, and designate how to print a watermark or header/footer throughout the book. To the contrary, the chapter and page can only designate whether to print a watermark or header/footer set by the book on the chapter or page.

Example of Operation Sequence of Document Processing System according to First Embodiment (Example of Book File Generation Sequence)

The book file has the above-described structure and contents. A sequence of creating a book file by the bookbinding application 104 and electronic original writer 102 will be explained. Creation of a book file is realized as part of book file editing operation by the bookbinding application 104.

Figure 7:
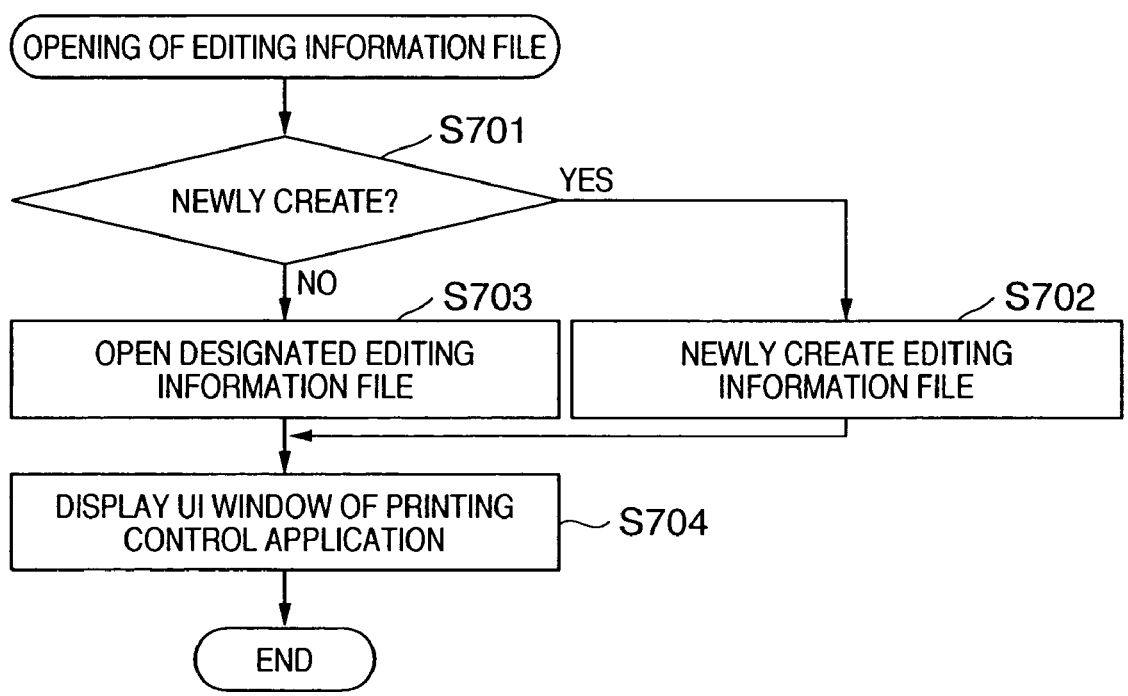
FIG. 7 is a flowchart showing an example of a sequence of opening a book file.

FIG. 7 is a flowchart showing a sequence when the bookbinding application 104 opens a book file.

Figure 8:
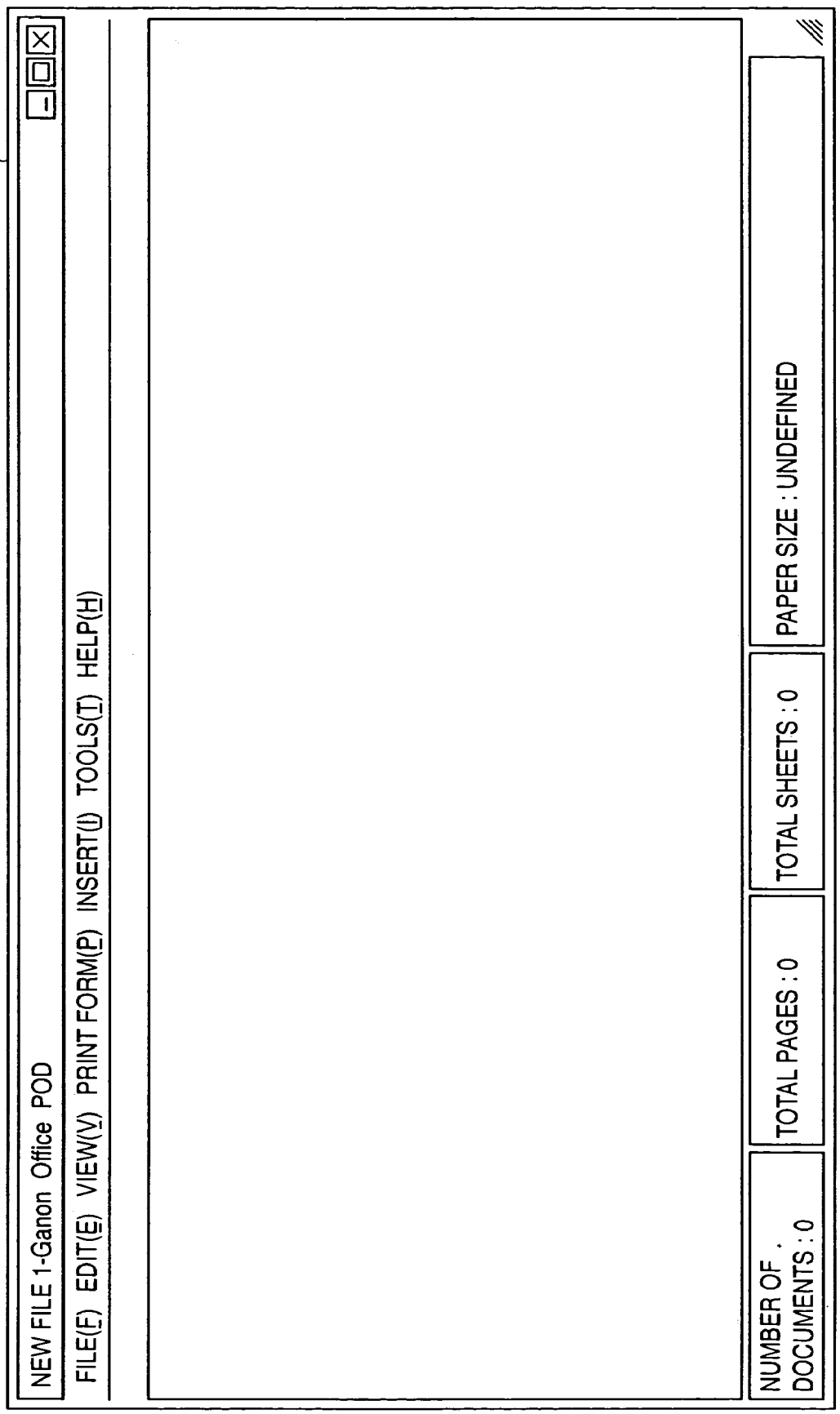
FIG. 8 is a view showing an example of a user interface window when a new book file is opened.

Whether a book file to be opened is one to be newly created or an existing one is determined (step S701). If the book file is one to be newly created, a book file containing no chapter is newly created (step S702). In the example shown in FIG. 3, the newly created book file has only a book node 301 which does not have any link to a chapter node. Applied book attributes are a set of attributes which are prepared in advance for creation of a new file. A UI (User Interface) window for editing the new book file is displayed (step S704). FIG. 8 shows an example of a UI window when a book file is newly created. In this case, the book file does not have any substantial content, and a UI window 800 does not display anything.

Figure 9:
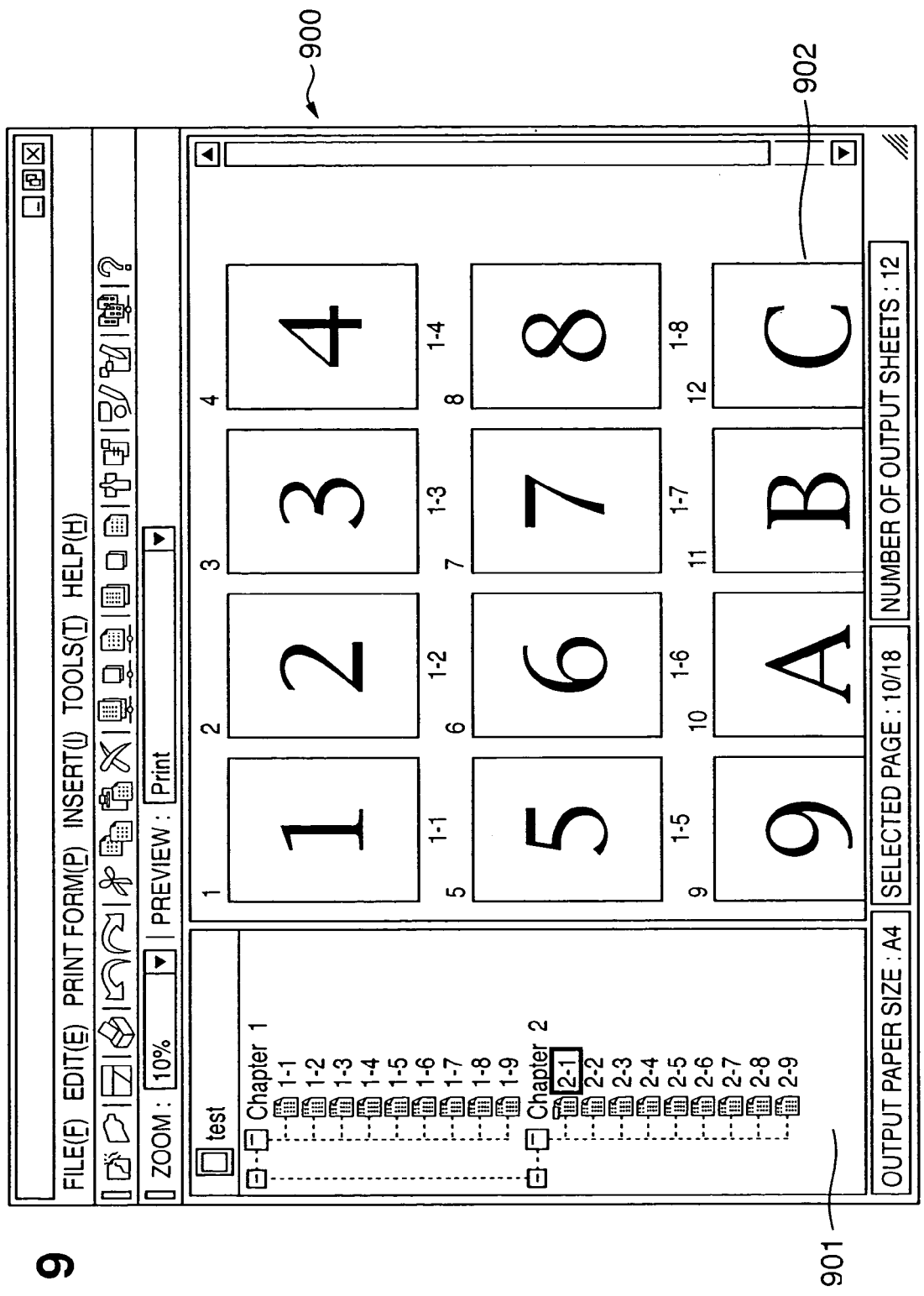
FIG. 9 is a view showing an example of a user interface window when an existing book file is opened.

If the book file is an existing one, a designated book file is opened (step S703), and a UI (User Interface) window is displayed in accordance with the structure, attributes, and contents of the book file. FIG. 9 is a view showing an example of the UI window. A UI window 900 has a tree portion 901 representing a book structure, and a preview portion 902 displaying a state to be printed. The tree portion 901 displays chapters contained in the book and pages contained in each chapter so as to present a tree structure as shown in FIG. 3. Pages displayed at the tree portion 901 are original pages. The preview portion 902 displays reduced print page contents. The display order reflects the book structure.

Application data converted into an electronic original file by the electronic original writer 102 can be added as a new chapter to the open book file. This function is called an electronic original import function. The electronic original is imported to the book file newly created by the sequence of FIG. 7, giving an entity to the book file. This function is activated by dragging and dropping application data in the window of FIG. 8 or 9.

Figure 10:
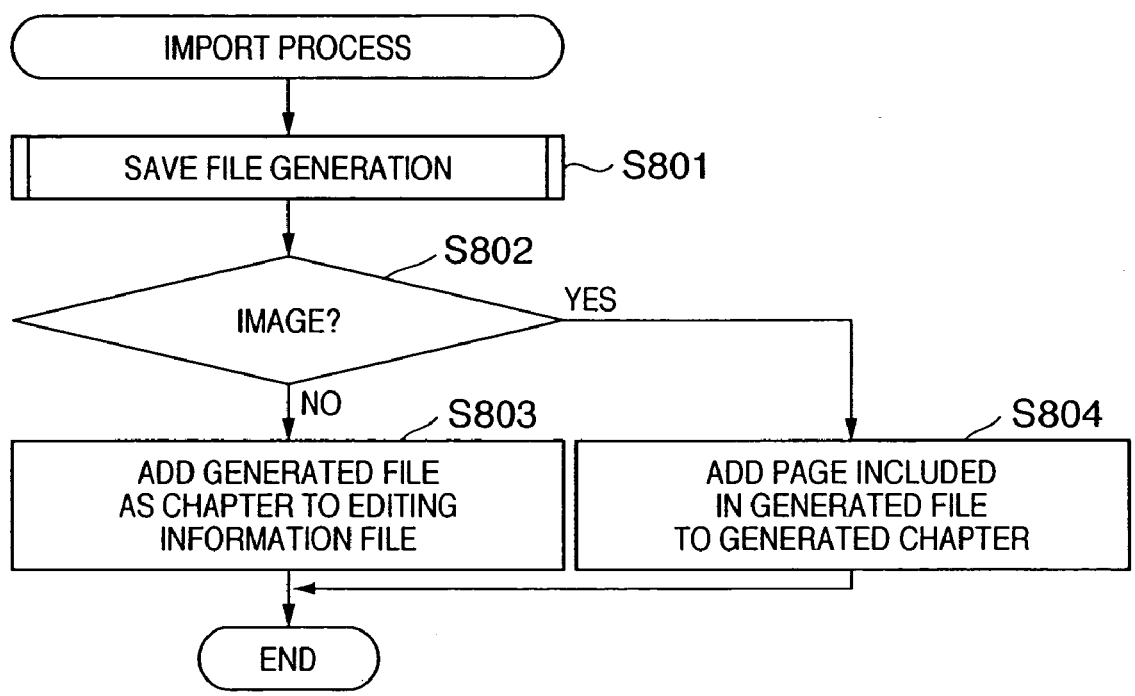
FIG. 10 is a flowchart showing an example of a sequence of importing an electronic original file to a book file.

FIG. 10 is a flowchart showing an example of an electronic original import sequence. A process of loading and importing a document as image data from the scanner 108 will be explained with reference to FIG. 21.

An application program which has generated designated application data is activated. The electronic original writer 102 is designated as a device driver, and application data is printed out to convert the data into electronic original data (step S801). After conversion, whether the converted data is image data is determined (step S802). This determination can be done on the basis of the file extension of application data under the Windows® OS. For example, an extension "bmp" represents Windows® bitmap data; "jpg", jpeg-compressed image data; and "tiff", tiff-format image data. Such image data can directly generate an electronic original file without activating any application, unlike S801, and thus the process in S801 can be omitted.

If the data is not image data, the electronic original file generated in step S801 is added as a new chapter to the book of a currently open book file (step S803). As for chapter attributes which are common to book attributes, the values of the book attributes are generally copied. As for unique chapter attributes, predetermined default values are set. In this example, whether to preferentially adopt the attribute value of a lower layer can be selected (to be described later).

If the data is image data, no new chapter is added in principle, and each original page contained in the electronic original file generated in step S801 is added to a designated chapter (step S804). If the book file is a newly created one, a new chapter is created, and each page of the electronic original file is added as a page belonging to the chapter. As for page attributes, attributes common to the attributes of an upper layer are generally given the attribute values of the upper layer, and attributes which are defined in application data and inherited to an electronic original file are given values defined in the application data. For example, when N-up designation is defined in application data, the page inherits this attribute value. In this way, a new book file is created, or a new chapter is added. In this example, however, whether to preferentially adopt the attribute value of a lower layer can be selected (to be described later).

Figure 11:
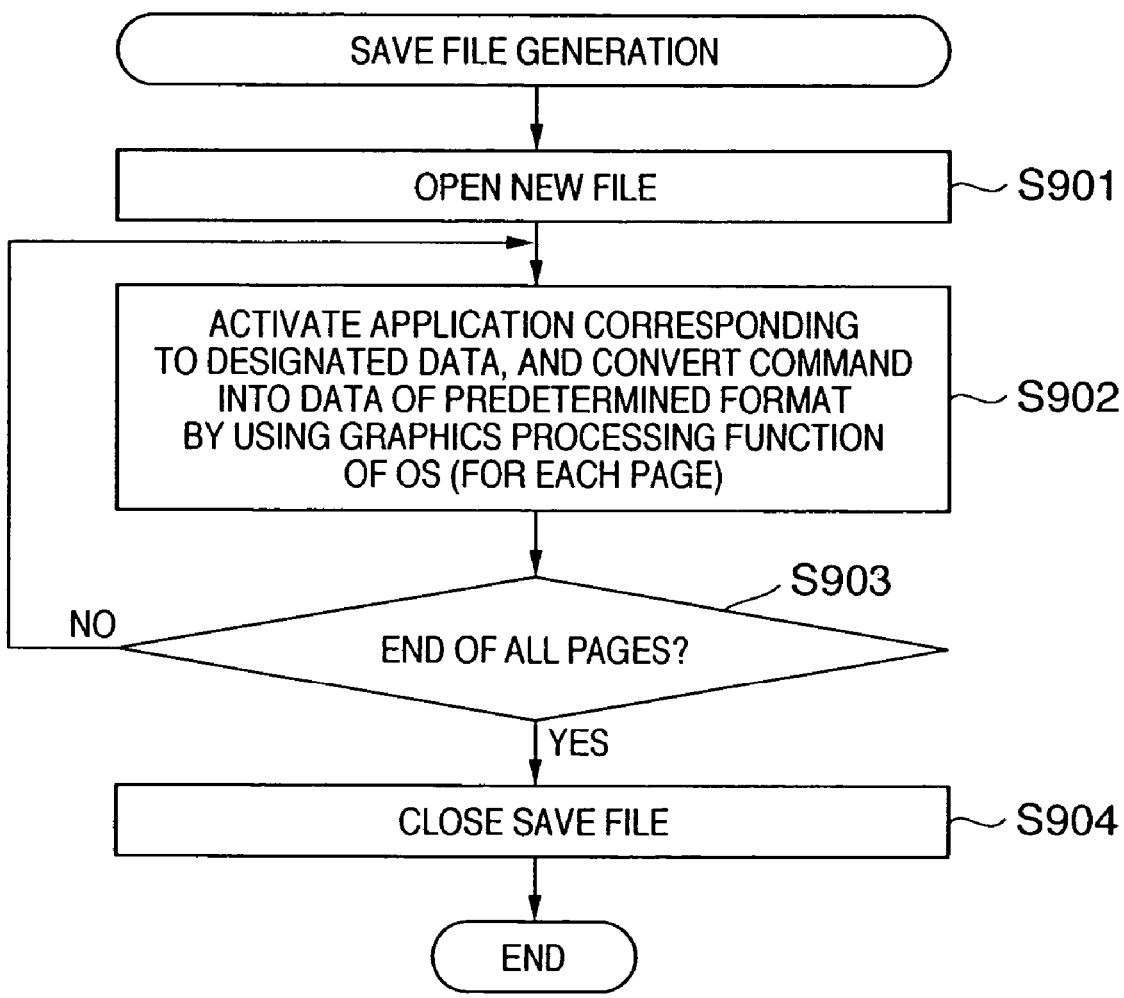
FIG. 11 is a flowchart showing an example of a sequence of converting application data into an electronic original file in step S801 of FIG. 10.

FIG. 11 is a flowchart showing a sequence of generating an electronic original file by the electronic original writer 102 in step S801 of FIG. 10.

A new electronic original file is created and opened (step S901). An application corresponding to designated application data is activated. The electronic original writer 102 is set as a device driver to transmit an output command to an OS output module. The output module converts the received output command into data of an electronic original format by the electronic original writer, and outputs the converted data (step S902). The output destination is the electronic original file opened in step S901. Whether all designated data have been converted is determined (step S903), and if YES in step S903, the electronic original file is closed (step S904). The electronic original file generated by the electronic original writer 102 is a file containing original page data entities shown in FIG. 3.

(Example of Editing Book File)

As described above, a book file can be created from application data. Chapters and pages in the generated book file can be edited as follows.

(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each original page In addition, an operation of canceling executed editing operation, and an operation of restoring canceled operation can be performed. These editing functions enable editing operations such as consolidation of a plurality of editing information files, rearrangement of chapters and pages within a book file, delete of chapters and pages within a book file, layout change of an original page, and insertion of a slip sheet and index sheet. By these operations, operation results are reflected in attributes shown in FIGS. 4 to 6 or in the structures of the book file. For example, a blank page is inserted to a designated portion by an operation of newly adding a blank page. The blank page is processed as an original page. If the layout of an original page is changed, the change contents are reflected in attributes such as the printing method, N-up printing, front/back cover, index sheet, slip sheet, and chaptering. A display and operation example in editing will be described in detail below.

(Example of Output of Book File)

The ultimate goal of a book file created and edited in the above manner is to print out the file. If the user selects a file menu from the UI window 900 of the bookbinding application shown in FIG. 9 and selects printing from this menu, the book file is then printed out by a designated output device. At this time, the bookbinding application 104 creates a despool table from a currently open book file (editing information file and intermediate), and transfers the despool table to the electronic original despooler 105. The electronic original despooler 105 converts the intermediate file, i.e., job ticket in the first embodiment into a despool table, converts the despool table into an OS output command, e.g., a Windows® GDI command, and transmits the command to an output module, e.g., GDI. The output module generates a command complying with a device by the designated printer driver 106, and transmits the command to the device.

The graphic engine of the output module (not shown) loads the printer driver 106 prepared for each printing apparatus from the external memory 211 to the RAM 202, and sets the output to the printer driver 106. The output module converts the received GDI (Graphic Device Interface) function into a DDI (Device Driver Interface) function, and outputs the DDI function to the printer driver 106. The printer driver 106 converts the received output into a control command such as a PDL (Page Description Language) command recognizable by the printer on the basis of the DDI function received from the output module. The converted printer control command passes through a system spooler loaded by the OS to the RAM 202, and is output as print data to the printer 107 via the interface 21.

A job ticket is a format employed in the first embodiment as an intermediate file which forms the electronic original file 103. The job ticket is data having a structure whose minimum unit is an original page. The structure of the job ticket defines the layout of an original page on a paper sheet. One job ticket is issued for one print job. The document node is set at the top of the structure, and defines the attribute of the whole document such as double-sided printing/single-sided printing. This node is accompanied with a paper node containing attributes such as the identifier of paper for use and designation of a feed port in the printer. Each paper node is accompanied with a sheet node which is printed on the paper. One sheet corresponds to one paper sheet. A print page (physical page) belongs to each sheet. One physical page belongs to one sheet in single-sided printing, and two physical pages belong to one sheet in double-sided printing. An original page to be laid out on a physical page belongs to the physical page. The physical page attribute contains an original page layout.

Figure 12:
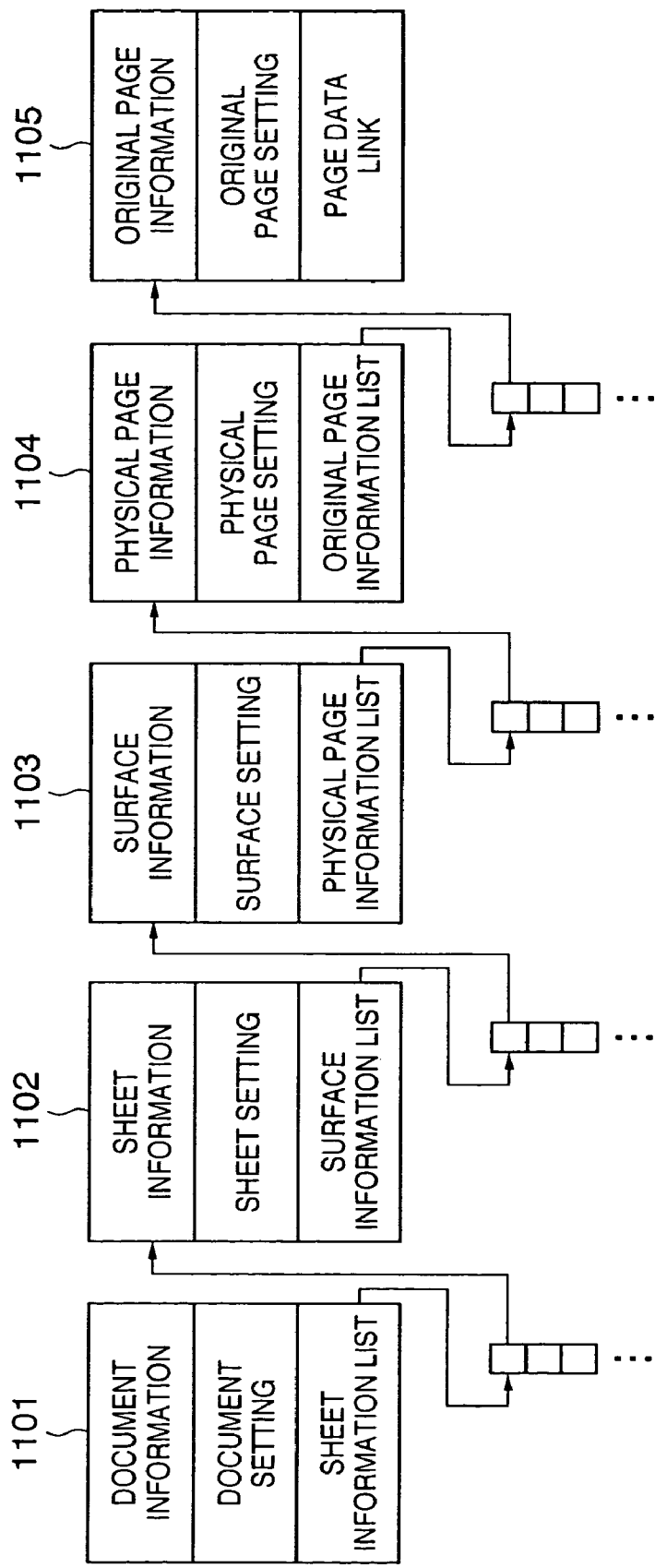
FIG. 12 is a view showing an example of a data structure used for printing and display.

FIG. 12 shows an example of the data structure of a job ticket. In print data, a document is formed from a set of sheets, and each sheet is formed from two, upper and lower surfaces. Each surface has a region (physical page) for laying out an original, and each physical page is formed from a set of original pages serving as minimum units. Reference numeral 1101 denotes data corresponding to a document. The data 1101 is made up of data on a whole document and a list of sheet information forming the document. Sheet information 1102 is formed from information on a sheet such as the sheet size, and a list of surface information laid out on the sheet. Surface information 1103 is formed from data unique to a surface, and a list of physical pages laid out on the surface. Physical page information 1104 is formed from information such as the size and header/footer of a physical page, and a list of original pages which form the physical page.

The electronic original despooler 105 creates a table (corresponding to a job ticket in FIG. 12 expressed as a table) called a despool table from the job ticket of an electronic original file. The electronic original despooler 105 converts the despool table into an output command to an output module in accordance with attributes and print settings defined in an editing information file.

(Example of Preview Display Contents)

As described above, when a book file is opened by the bookbinding application, the user interface window 900 shown in FIG. 9 is displayed. The tree portion 901 displays a tree representing the structure of the open book (to be referred to as a "book of interest" hereinafter). At the preview portion, three display methods are prepared in accordance with designation by the user. The first method is a mode called an original view which directly displays original pages. In the original view mode, the contents of original pages belonging to the book of interest are reduced and displayed. The display of the preview portion does not reflect any layout. The second method is a printing view mode. In the printing view mode, the preview portion 902 displays original pages in a format which reflects the layout of them. The third method is a simple printing view mode. In the simple printing view mode, the contents of original pages are not reflected in the display of the preview portion, but only the layout is reflected.

Another Example of Configuration of Document Processing System

The document processing system according to the first embodiment is of a stand-alone type. A server-client system as an extension of the stand-alone system also creates and edits a book file by almost the same configuration and sequence. A book file and printing process are managed by the server.

Figure 13:
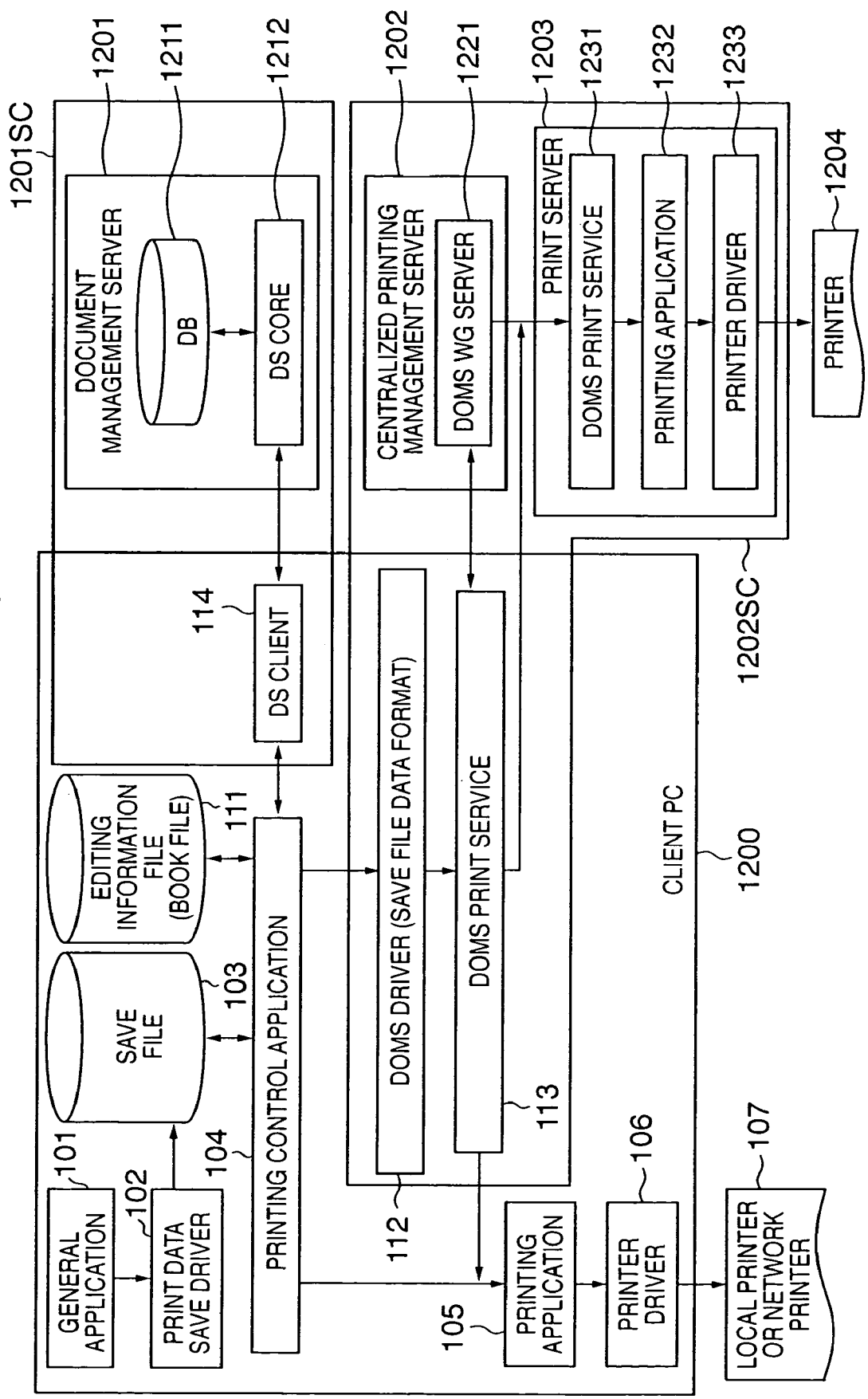
FIG. 13 is a block diagram showing an example of the software configuration of a client-server document processing system.

FIG. 13 is a block diagram showing the configuration of a server-client document processing system. The client document processing system is constituted by adding to the stand-alone system a DOMS (Document Output Management Service) driver 112 serving as a client module, a DOMS print service module 113, and a DS (Document Service) client module 114. A client document processing system 1200 is connected to a document management server 1201, centralized printing management server 1202, and print server 1203. These servers are generally connected to the client document processing system via a network. When the servers also function as clients, they are connected by interprocess communication which simulates communication between networks. The document management server 1201 and centralized printing management server 1202 are connected to the client in FIG. 13, but only either one may exist on the network. If the connected server is the document management server, a document management server-client system 1201SC including a client module is added to the stand-alone document management system. If the connected server is the centralized printing management server 1202, a printing management server-client system 1202SC including a client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client 114 and a DS core 1212.

The centralized printing management server 1202 manages printing of a book file stored in the client document processing system 1200 or document management server 1201. A print request from the client is transmitted to a DOMS WG server module 1221 of the centralized printing management server 1202 via the DOMS driver 112 and DOMS print service module 113. To print by the printer of the client, the centralized printing management server 1202 transfers electronic original data to the electronic original despooler 105 via the DOMS print service module 113 of the client. To print by the print server 1203, the centralized printing management server 1202 transmits electronic original data to a DOMS print service module 1231 of the print server 1203. For example, the centralized printing management server executes security check on the qualification of a user who has issued a print request for a saved book file, or saves the printing process log. In this fashion, the document processing system can be implemented as both a stand-alone system and client-server system.

Example of Editing Operation of Document Processing System according to First Embodiment FIG. 9 shows the operation window of the bookbinding application 104. The bookbinding application can set the function of a printing apparatus such as stapling, in addition to editing such as a change of the page order of a document, copying, and delete. The bookbinding application can cause a designated printing apparatus to print. A tree view representing a document structure is displayed in the left region of FIG. 9. A document is formed from a set of chapters, and each chapter is formed from a set of original pages. The print preview of each page is displayed in the right region of FIG. 9.

Example of Attribute Setting of Document Processing System according to First Embodiment FIG. 14 shows a "Detailed Setting for Document" window 1400 of the bookbinding application 104. This window allows displaying/setting the "document setting information 403". This window is activated from the "Detailed Setting for Document" menu of a Print Form menu in the application operation window of FIG. 9 or a "Detailed Setting for Document" button on the tool bar. The "Detailed Setting for Document" window is a window for setting attributes which influence a whole document. This window is formed from four sheets Page Setup, Finishing, Edit, and Paper Source. FIG. 14 shows a state in which the Page Setup sheet is displayed. In the Page Setup sheet, settings mainly concerning the layout can be done. Settings such as the paper size, direction, and N-page printing can be designated. This window has check box controls 1401 and 1402 for the zoom.

FIG. 15 shows a "Detailed Setting for Chapter" window 1500 of the bookbinding application 104. This window allows displaying/setting the "chapter setting information 407". This window is activated from the "Detailed Setting for Chapter" menu of a Print Form menu in the application operation window of FIG. 9 or a "Detailed Setting for Chapter" button on the tool bar. The "Detailed Setting for Chapter" window is a window for setting attributes unique to a chapter. This window is formed from four sheets Page Setup, Finishing, Edit, and Paper Source. FIG. 15 shows a state in which the Page Setup sheet is displayed. In the Page Setup sheet, settings mainly concerning a layout unique to each chapter can be done. Settings such as the paper size, direction, and N-page printing can be designated. "Follow Book Attribute" check box controls 1501, 1502, and 1503 are arranged for repetitive setting items between "Detailed Setting for Document" and "Detailed Setting for Chapter". For an item group whose check box is checked, the setting values of the document are applied to the chapter. FIG. 16 shows a case wherein the check box is not checked. Settings unique to a chapter can be classified into two types: setting items held by only a chapter, and setting items whose setting values different from those of the document in the upper layer are held in the chapter layer.

FIG. 16 shows a state in which the check box controls 1501 and 1502 of "Detailed Setting for Chapter" in FIG. 15 are not checked. In this case, even if the whole document uses A3 paper, pages which constitute this chapter use A4 paper. As for the layout, even if the document designates 1 page per sheet, the chapter designates a layout of 4 pages per sheet. "Zoom Arrange" is checked, and the setting values of the document in the upper layer are employed as those of the chapter.

Figure 17:
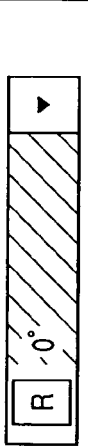
FIG. 17 is a view showing an example of a dialog window for setting a page serving as the lowermost layer of the data structure.
Figure 18:
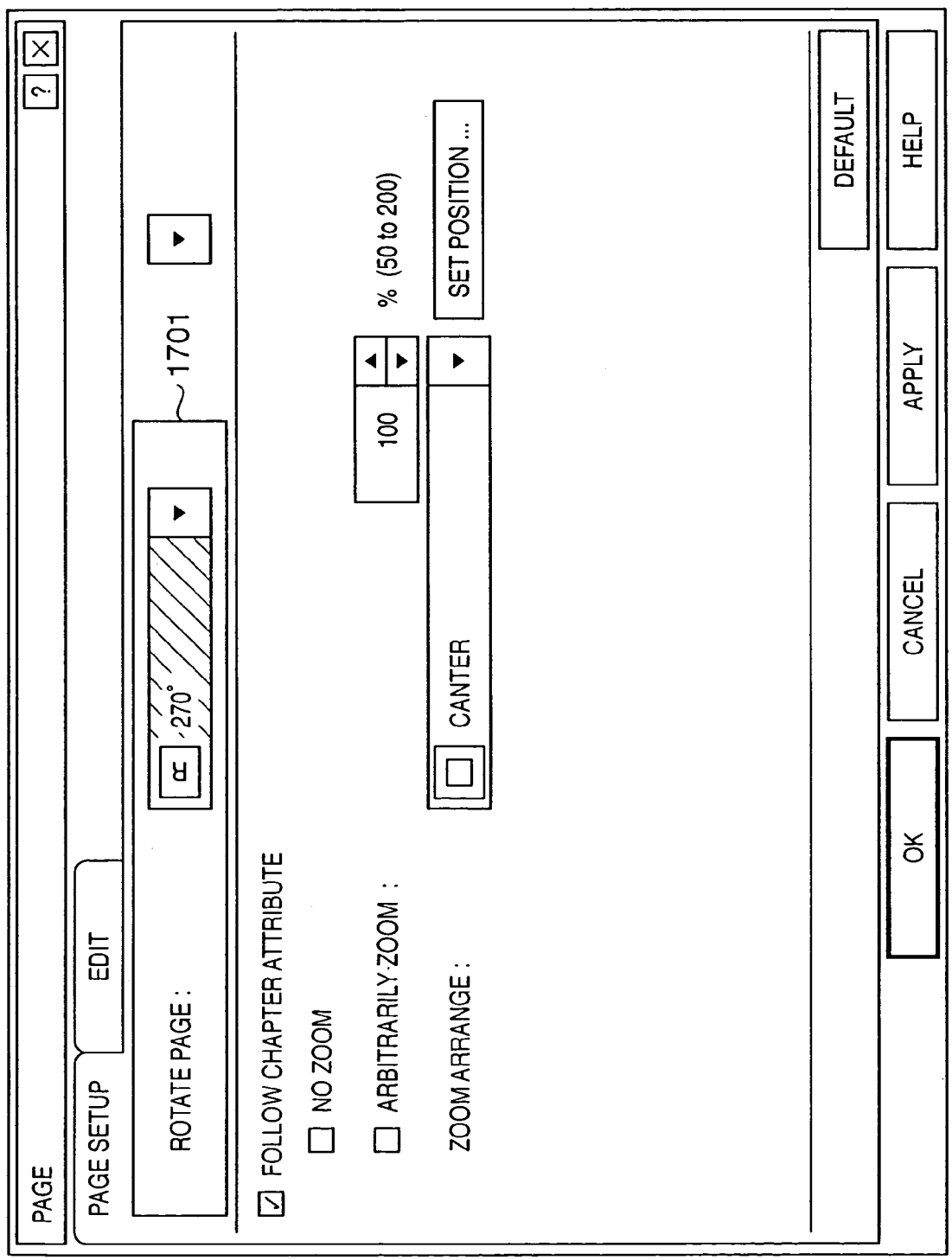
FIG. 18 is a view showing an example of changing a setting value in the dialog window of FIG. 17.

FIG. 17 shows a "Detailed Setting for Page" window 1700 of the bookbinding application 104. This window allows displaying/setting the "page setting information 411". This window is activated from the "Detailed Setting for Page" menu of the Print Form menu in the application operation window of FIG. 9 or a "Detailed Setting for Page" button on the tool bar. The "Detailed Setting for Page" window is a window for setting attributes unique to each page. This window is formed from two sheets Page Setup and Edit. FIG. 17 shows a state in which the Page Setup sheet is displayed. In the page setup sheet, settings mainly concerning a layout unique to each page can be done, and settings such as the rotation angle and enlargement/reduction ratio in laying out an original page can be designated. A "Follow Chapter Attribute" check box control 1701 is arranged for repetitive setting items between "Detailed Setting for Chapter" and "Detailed Setting for Page". For an item whose check box is checked, the setting value of the chapter is applied to the page. FIG. 18 shows a case wherein the check box is not checked.

FIG. 18 shows a state in which Page Rotation setting is changed in "Detailed Setting for Page" of FIG. 17. The control 1701 exhibits a setting of rotating and arranging an original page with the upper portion of the page oriented left in laying out the original page. Since this item is not provided with any "Follow Chapter Attribute" check box and is not a repetitive setting item in the chapter and document, the setting displayed in this window is always adopted as the setting value of the page. When the control 1701 is set, the "Zoom Arrange" item is a repetitive setting item in the chapter, and the setting value of the chapter is used as that of the page. When "Follow Document Attribute" is checked in the "Zoom Arrange" item of the chapter, the setting value of the document in the upper layer is used as that of the chapter, and thus the setting value of the document is used as that of the page.

When the "Zoom Arrange" item is not checked in the chapter, the chapter has a unique setting value, and the setting value unique to the chapter is used as the setting value of the page.

Check box control information set in the setting window may be held in a dedicated region, but is desirably held as one attribute in the setting information shown in FIG. 3. In this case, regions for holding check box control information are added to the lists of FIGS. 5 and 6.

Figure 19:
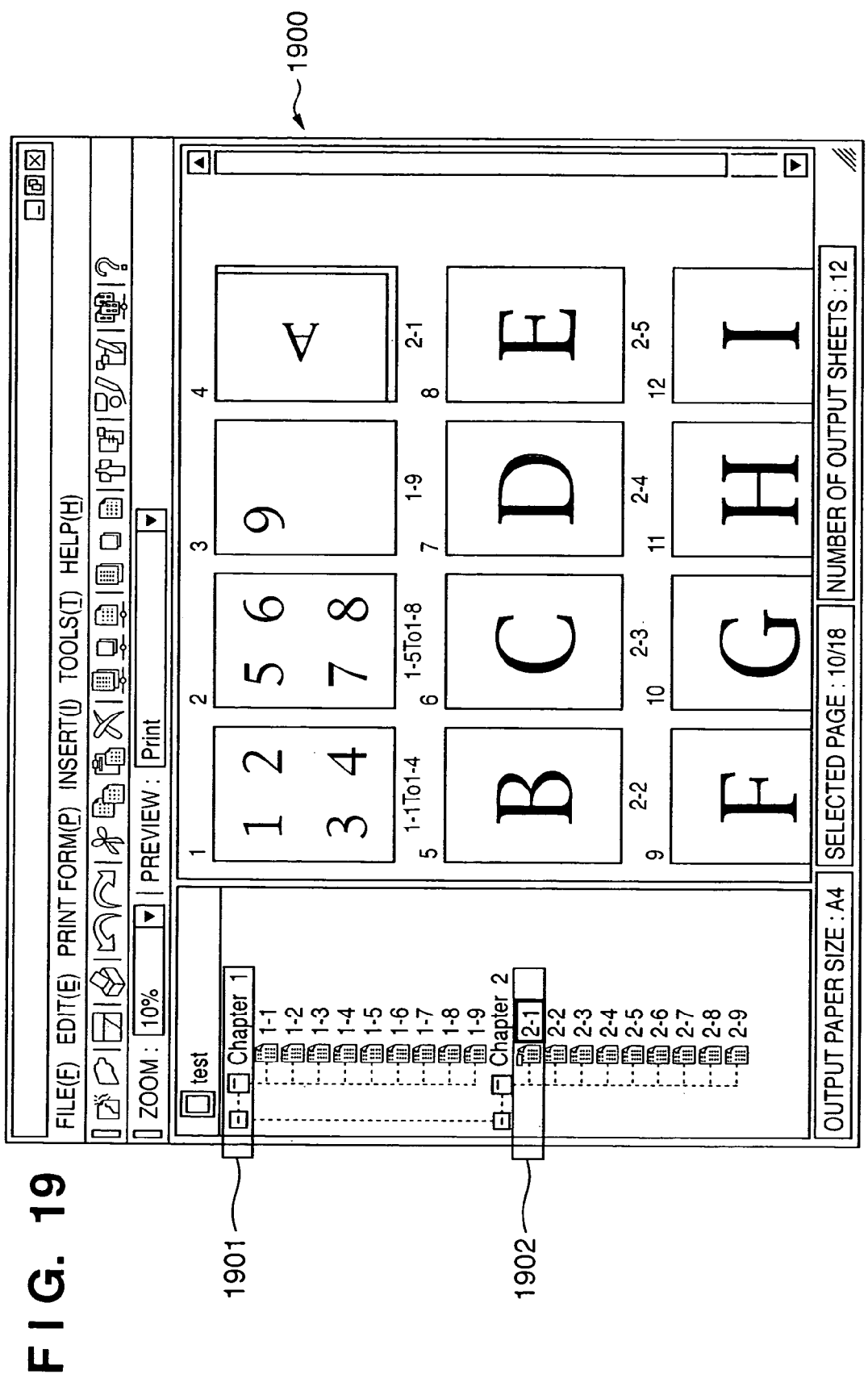
FIG. 19 is a view showing an example of display when settings unique to a chapter and page are done.

Example of Document Editing Display of Document Processing System according to First Embodiment FIG. 19 shows an example of the display format of the application when a setting item which is repeated in an upper layer does not use a setting value in the upper layer, i.e., when the check box control 1501 or 1701 is not checked.

In the example of FIG. 19, a document is formed from two chapters, and each chapter has original data of nine pages. FIG. 19 shows a display example when the layout of the first chapter is 4UP (to be also referred to as 4in1 hereinafter) and rotation is designated for the first page (10th page in the whole document) of the second chapter. In the right preview, four original pages are laid out on each of the first to third pages. On the fourth page, a character "A" is rotated. A display format for settings unique to a chapter and page at a tree view will be explained. An icon 1901 corresponding to the first chapter changes to exhibit that this chapter has a unique setting. An icon 1902 corresponding to the first page of the second chapter also changes to exhibit that this page has a special setting.

Loading Method of Document Processing Apparatus according to First Embodiment

As a method of loading a document as an electronic original to the bookbinding application 104 serving as the document processing apparatus, there has already been proposed a method of converting a document (also including an image file) generated by an arbitrary application in a host computer into an electronic original format by using an electronic original writer, as described above. The present invention provides a function of loading, as an electronic original (book file) to be processed by the bookbinding application 104, an image file read by an image reading apparatus (single scanner or a multifunction apparatus having an input/output function) which is connected to a host computer via a bidirectional interface and comprises a scanner. A loading method of converting an image file read from a paper original into a book file will be explained.

As described above, the method of receiving by a host computer an image file read by a scanner includes pull scan and push scan. In pull scan, the bookbinding application 104 transmits a scan instruction to the image reading apparatus via the scanner driver, and acquires an image file as a response. Pull scan is a well-known technique, and a detailed description thereof will be omitted. The acquired image file is generated as a book file by using the electronic original writer, and loaded as a new chapter by using a chaptering function (to be described later). In push scan, the operator designates the address (path to a predetermined folder in the HD of a host computer on a network) of the transmission destination of a read image via the operation panel of an image reading apparatus serving as a multifunction apparatus having an input/output function. The read image file is then transmitted to the designated address of the transmission destination. Push scan is also a well-known technique, and a detailed description thereof will be omitted. In loading an electronic original by push scan, a predetermined folder serving as the transmission destination of an image file by push scan is periodically monitored by the host computer. When the host computer detects that an image file has been transmitted to the predetermined folder, the image file is transferred to the electronic original writer, generated as a book file, and loaded as a new chapter by using the chaptering function (to be described later).

In this manner, an image file read by the image reading apparatus can be loaded as a book file into the bookbinding application 104. A chaptering method used to load an image file read by the image reading apparatus as a book file into the bookbinding application 104 will be described as a feature of the present invention. In particular, a method of converting the original of a document divided by a slip sheet into a book file will be explained.

Method of Electronizing Paper Medium Document according to First Embodiment (Options in Import)

A paper medium document electronization process will be explained with reference to FIG. 20. Prior to this description, options settable by the user in the paper original electronization process will be explained. In the first embodiment, the operator can set process conditions in import via user interfaces shown in FIGS. 33 and 34. As for designated items, values corresponding to the designation are stored in a predetermined storage area and referred to in an import process.

Figure 33:
FIG. 33 is a view showing an example of a user interface window for selecting an import method according to the first embodiment.

FIG. 33 is a UI view showing an example of a dialog box for setting an import method for an image file to be loaded into the transmission destination folder of scanned image files in the use of push scan. This dialog can be displayed and set by selecting, e.g., an "import" item on the "Print (print setting)" column of the menu in FIG. 19. In FIG. 33, an import method 3201 allows the user to select whether to import scanned image data to a book file by the bookbinding application (represented by PM in FIG. 33) or store it in the folder. Although not shown in FIG. 33, when scanned image data is to be stored in the folder, the folder can also be designated. When import to the book file is designated, the bookbinding application 104 captures image data from the scanner and processes it. When storage in the folder is designated, the bookbinding application 104 captures image data to be processed from a predetermined folder.

An import method 3202 allows the user to select whether to add scanned image data to an existing document (i.e., book file) or create a new book file. When scanned image data is to be added to an existing document, the document to which the scanned image data is to be added can be designated. When addition of image data to be imported to an existing document is designated, an existing book file is designated and opened, and then the process of FIG. 20 is executed for the book file to add the imported image data as a new page. When setting of image data to be imported as a new document is designated, a new book file is created prior to the sequence of FIG. 20, and then the process of FIG. 20 is executed for the new book file.

FIG. 34 is a UI view showing an example of a menu bar for setting automatic chaptering for a book file loaded to the bookbinding application in the use of pull scan. FIG. 34 illustrates the same window as that in FIG. 33, and allows input by selecting a "process in import" tab. In FIG. 34, when a "delete blank sheet" check box 3301 is checked, a blank sheet delete flag ensured in a predetermined storage area is set. In the first embodiment, when the blank sheet delete flag is set in the import process, a blank page is deleted. The blank page means one blank page in single-sided loading, and two successive pages when both two, odd- and even-numbered successive pages are blank in double-sided loading. If a "successive blank sheets are not deleted" check box 3302 is designated, a corresponding flag is set. As far as this flag is set, even if a plurality of blank sheets are successive, they are directly imported into a book file. If the blank sheet delete flag is set and the check box 3302 is not checked, for example, only one blank sheet is imported.

If a "chaptering" check box 3303 is checked, a chaptering flag is set. If the chaptering flag is not set, all imported original images are inserted as one chapter without performing the chaptering process.

If the chaptering flag is set, a chaptering method button 3304 can be selected. As the chaptering method, a setting (blank sheet division setting) of dividing a chapter by a blank page and a method of dividing an original in accordance with switching between single-sided printing and double-sided printing can be selected. When chaptering by a blank page is selected, a "change blank sheet to slip sheet" (slip sheet setting) check box 3305 can be selected. These settings are stored as values representing a message to that effect in areas which are ensured in the RAM for the respective settings. These settings may also be saved as one setting file in the hard disk.

When the "change blank sheet to slip sheet" check box 3305 is checked and a chapter is divided, a blank sheet inserted between chapters is deleted, and a slip sheet setting (setting number 13 in FIG. 4B) in the book attributes of the document is set instead. Contents to be set include a slip sheet flag representing that a slip sheet is inserted, and a sign representing a portion which supplies a slip sheet. The sign representing a portion which supplies a slip sheet can designate the "same as paper feed cassette", a specific paper feed cassette, or if the printer comprises an optional inserter, the inserter. When a blank sheet is to be replaced with a slip sheet, the blank page is deleted regardless of the setting of the "delete blank sheet" check box 3301.

Figure 35:
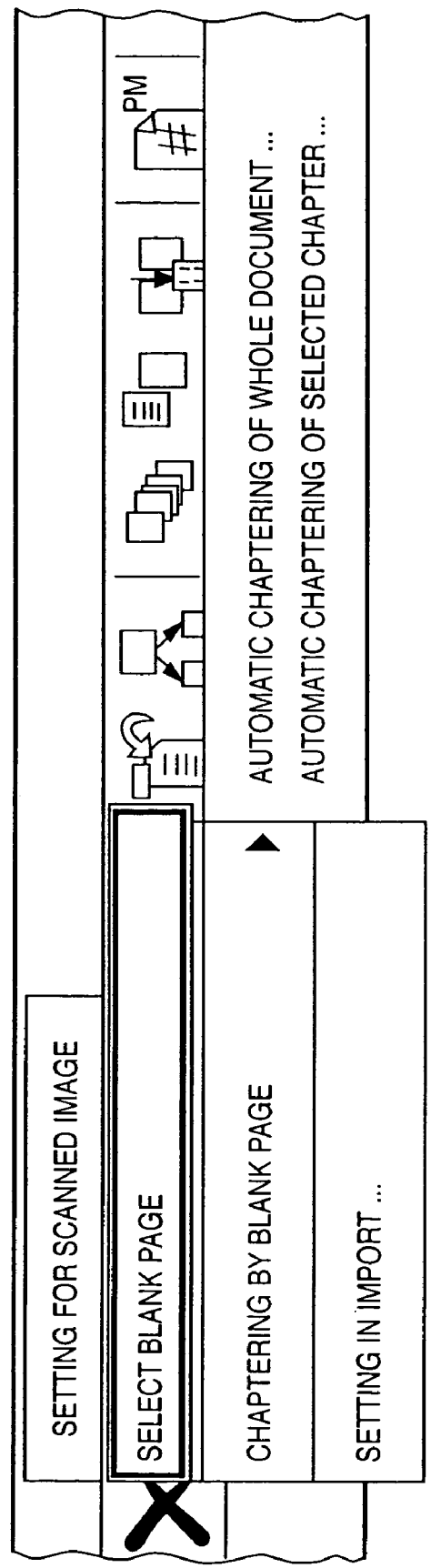
FIG. 35 is a view showing an example of a user interface window for designating chaptering of a document.

FIG. 36 is a UI view showing an example of a dialog box for detailed setting for automatic chaptering. Automatic chaptering is performed for a book file by selecting an existing book file and designating application of automatic chaptering by the operator. The meanings of check boxes are the same as those shown in FIG. 34 except that settings in FIG. 34 are referred to in import, unlike settings in FIG. 36. FIG. 35 shows a menu window for displaying the user interface window of FIG. 36. This menu window enables the user to designate which of an entire document or selected chapter undergoes chaptering. If the "chaptering" check box 3303 in FIG. 34 is not checked in import but chaptering is done after the completion of import, a chapter can be divided at a blank sheet insertion portion or the like.

(Import Process)

Figure 20:
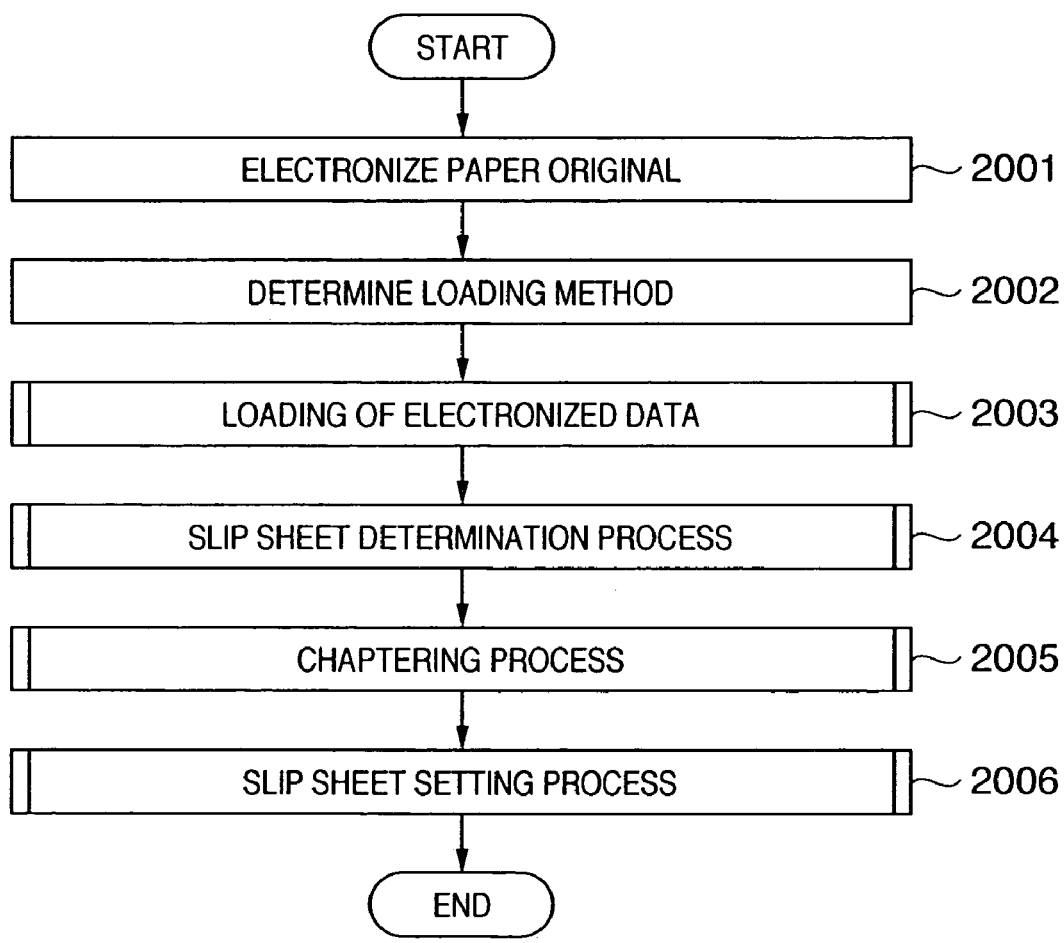
FIG. 20 is a flowchart showing the flow of an overall process according to the first embodiment of the present invention.

FIG. 20 is a flowchart showing the sequence of an import process. The sequence of FIG. 10 is executed when a document generated by another application is imported. FIG. 20 is a flowchart showing an overall process when a paper original is loaded, the document structure is analyzed, and a slip sheet is set, in order to import the paper original. In the first embodiment, an original loaded from the scanner is called a paper original, but the paper original also includes an original printed on a sheet-like medium other than paper. The sequence of FIG. 20 is executed by a whole system including the scanner 108 and computer 100. In particular, step 2001 is executed by the scanner, and steps 2002 to 2006 are executed by the bookbinding application 104.

In step 2001, a paper original is electronized. Considering automation, a scanner with an automatic document feeder is desirable, but the process can be achieved by any type of scanner. As the format of electronized data, a plurality of formats such as TIFF, JPEG, BMP, and PDF are available, but the present invention can be applied to any format. As described above, original scan processing methods can be roughly classified into two. One method is called a push scan method of setting a shared folder in a PC and copying an image data file captured by a scanner to the shared folder. The other method is a pull scan method of directly receiving image data from a scanner via a scanner driver such as TWAIN or ISIS. In push scan, steps 2001 and 2002 can be executed without synchronizing with each other. In pull scan, electronization of an original in step 2001 and loading of the original in step 2002 are executed as a series of processes in synchronism with each other under the control of the computer.

The flow advances to step 2002, and the bookbinding application 104 acquires information representing the loading method. In this case, whether the loading method is single- or double-sided loading is sufficient as reference information for determining a slip sheet. In pull scan, this information can be acquired by defining an I/F together with the driver. For example, in order to perform pull scan by issuing an instruction representing single-/double-sided loading from the computer 100 to the scanner 108, the bookbinding application 104 can determine the loading method by reading information on the single-/double-sided loading designation.

In push scan, a file name created in scan is so defined as to discriminate single-/double-sided loading. When the bookbinding application 104 reads out an image data file, it can automatically determine on the basis of the file name whether the data is obtained by double- or single-sided loading. For example, the loading method can be determined from the file name by adding "S_" to the start of the file name for single-sided loading and "D_" for double-sided loading. The loading method can also be determined from a blank page in data obtained by scanning all pages. For example, a double-sided job is determined under a condition such as "blank pages appear every other page" or "two, odd- and even-numbered successive pages are blank", and a single-sided job is determined under another condition. Instead of automatic determination, a dialog window for acquiring information may be displayed to prompt the user to designate single-/double-sided loading. By any method, the determination result is saved as the value of a referable flag or the like (e.g., the value of a double-/single-sided loading flag ensured in the RAM) in order to refer to the determination result in subsequent steps.

In step 2003, electronized data (image data) is loaded into the system, particularly the bookbinding application 104. In push scan, a shared folder which stores image data created by scanning an original is monitored, and when an image data file is created, the system can automatically load the file. In pull scan, data can be directly acquired from the scanner driver. An electronic original file 103 in which image data corresponding to one page of an original is defined as one page is created on the basis of the loaded image data. Details of this sequence will be explained with reference to FIG. 21.

The flow advances to step 2004, and the bookbinding application 104 performs a slip sheet determination process. Details of this process will be explained with reference to FIGS. 22, 23, and 24. After a slip sheet page is determined, the flow advances to step 2005, and the bookbinding application 104 divides the chapter of a book file at the determined slip sheet page, and reflects the logical structure of the original in the data structure of the document. Details of this process will be explained with reference to FIG. 25. The flow advances to step 2006, and the bookbinding application 104 changes a blank page to "sheet insertion setting" of the document. Details of this process will be explained with reference to FIG. 26.

By the above sequence, image data loaded from a paper original is converted into an electronic file which reflects the document structure of the paper original. The contents of this file can be displayed or printed by the bookbinding application 104. In printing, when a slip sheet between chapters is set and the electronic original file 103 does not contain any blank page as a slip sheet, a slip sheet is output as a blank sheet in a printed or displayed document as far as "insert slip sheet" is set as the setting of the slip sheet (setting number 13 in FIG. 4B contained in the document setting information 403 of FIG. 3) in book attributes. In an electronic original file data display process, a blank page is inserted and displayed between chapters if the slip sheet setting is done. In a printing process, an instruction to feed a slip sheet from a cassette or inserter corresponding to the setting is generated and inserted at a slip sheet insertion position, and transmitted to the printer.

In this way, an electronic original file which reproduces the read paper original including its format can be generated. A document which directly reproduces the paper original can also be output.

(Electronized Data Loading Process)

Figure 21:
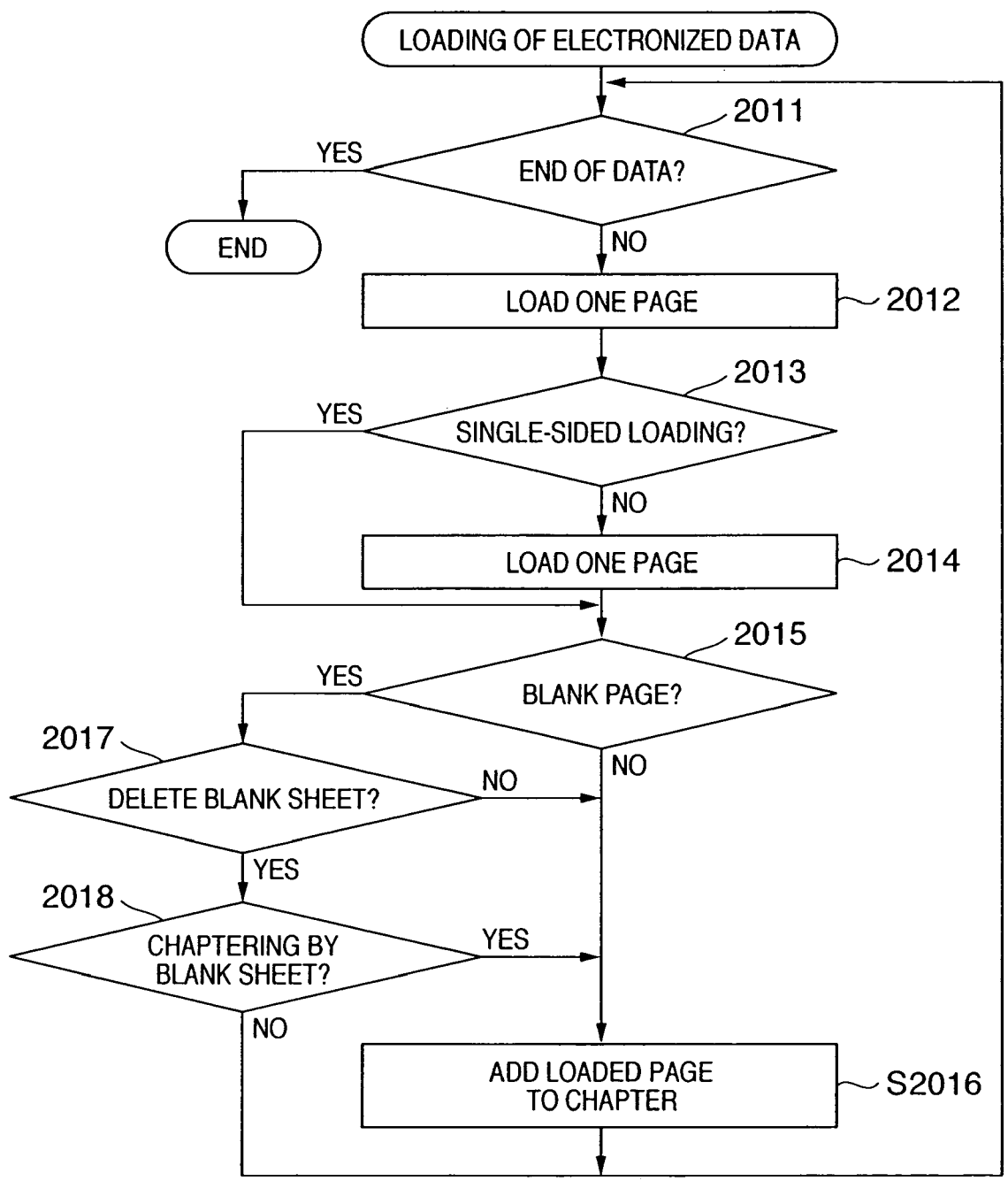
FIG. 21 is a flowchart showing the flow of an original electronization process according to the first embodiment.

FIG. 21 is a flowchart showing the sequence of the electronized data loading process in step 2003 of FIG. 20. In step 2011, the bookbinding application 104 determines whether entire electronized data (image data) of a paper original has been loaded. In image data, one page of a paper original forms one file. In push scan, therefore, the bookbinding application 104 determines whether all image files in a predetermined folder have been loaded. In pull scan, the bookbinding application 104 determines whether a read end signal has been input from the scanner. Also, image data is so formed as to be able to determine the order of original pages. For example, file names may be assigned in time series. Alternatively, the creation order of files can be determined from the creation times of file attributes and regarded as a page order. Loading in steps 2012 and 2014 is done in this order.

In step 2012, the bookbinding application 104 loads image data of one page (i.e., one file). The loading order is a time series generated from a file corresponding to the start page. If a file is given a name representing a page number, loading complies with this number. In step 2013, the bookbinding application 104 determines on the basis of the determination result in step 2002 of FIG. 20 whether the image data is obtained by single- or double-sided loading. For double-sided loading, the bookbinding application 104 loads image data of one more page in step 2014.

In step 2015, the bookbinding application 104 determines whether the loaded image data corresponds to a blank sheet. The bookbinding application 104 determines for double-sided loading whether both the two pages loaded in steps 2012 and 2014 are blank, and for single-sided lading whether only one page is blank.

If the page is blank, the bookbinding application 104 tests the blank sheet delete flag in step 2107. The blank sheet delete flag is set in accordance with a check on the "delete blank sheet" check box 3301 in FIG. 34. If the blank sheet delete flag has been set, the bookbinding application 104 determines in step 2018 whether the chaptering flag has been set and the chaptering method is a "blank sheet chaptering" setting. The chaptering flag is set when the "chaptering" check box 3303 in FIG. 34 is checked. The "blank sheet chaptering" setting is set when "divide chapter by blank page" is selected in the chaptering method selection column 3304.

If it is determined in step 2018 that the chaptering flag has not been set or that the chaptering flag has been set but "divide chapter by blank sheet" has not been selected, the blank page is discarded to delete a blank sheet. The loaded page is left, and the flow advances to step 2011 to load the next page.

To the contrary, if the blank sheet delete flag has been set, but the chaptering flag has been set and "divide chapter by blank sheet" has been selected, the page loaded in step 2016 is not deleted but is added to the current chapter of interest in order to use a blank sheet for chaptering in a subsequent step. Immediately after loading the start page, no chapter of interest exists. In this case, a chapter is newly generated and set as a chapter of interest. Also when the loaded page is not a blank page or the blank sheet delete flag is not set, the page loaded in step 2016 is similarly added to the current chapter of interest.

An operation of adding a page to a chapter in an editing information file contained in the electronic original file 103 will be explained with reference to the example of FIG. 3. In the current chapter 405, an imported image is added as new page data to the page data list 413, and a link to the new page data is added to the page data link of the page information list 408 of the current chapter information 405. This page data link links the page data of the imported image to the current chapter information 405.

To the contrary, a job ticket (see FIG. 12) as an intermediate file contained in the electronic original file has a hierarchical structure, but no chapter structure, unlike an editing information file. The job ticket has a structure in which a bundle of common paper sheets (also called sheets) is grouped by the sheet information 1102, and a bundle of partial paper sheets having a common surface setting (e.g., double-sided printing or single-sided printing) in the bundle of common paper sheets is grouped by the surface information 1103. For example, when one document contains different paper sizes, sheet information for each size is contained. For one paper size or paper quality, one sheet information suffices even with different printing methods. In the first embodiment, since original images loaded at once by using the ADF function of the scanner have a constant size, only one sheet information corresponding to the first page suffices to be created for the sheet information 1102. In the first embodiment, therefore, a job ticket layer corresponding to the "chapter" of the editing information file is "surface information" because the paper setting is kept unchanged in the first embodiment. If the paper setting such as the paper size changes between chapters, the job ticket layer corresponding to the chapter is sheet information. In this manner, the layer corresponding to the chapter in the job ticket is determined in accordance with the type of attribute which changes between chapters in the editing information file. In the first embodiment, a new page is added to the job ticket, as shown in FIG. 12. That is, new physical page information 1104 to be linked to the surface information 1103 corresponding to the current chapter is added, and new original page information 1105 to be linked to the physical page information 1104 is added. Imported image data is linked as new page data to the page data link of the original page information 1105.

By the above sequence, an electronic original file is created in step 2003, and a blank page which is not used in subsequent steps and is so designated as to be deleted is deleted. In this sequence, an electronic original file may be newly created or added to an existing electronic original file. In adding an electronic original file, a new chapter may be created from loaded image data, or loaded image data may be added to an existing chapter. In FIG. 20, a new chapter is added.

(Slip Sheet Determination Process)

Figure 22:
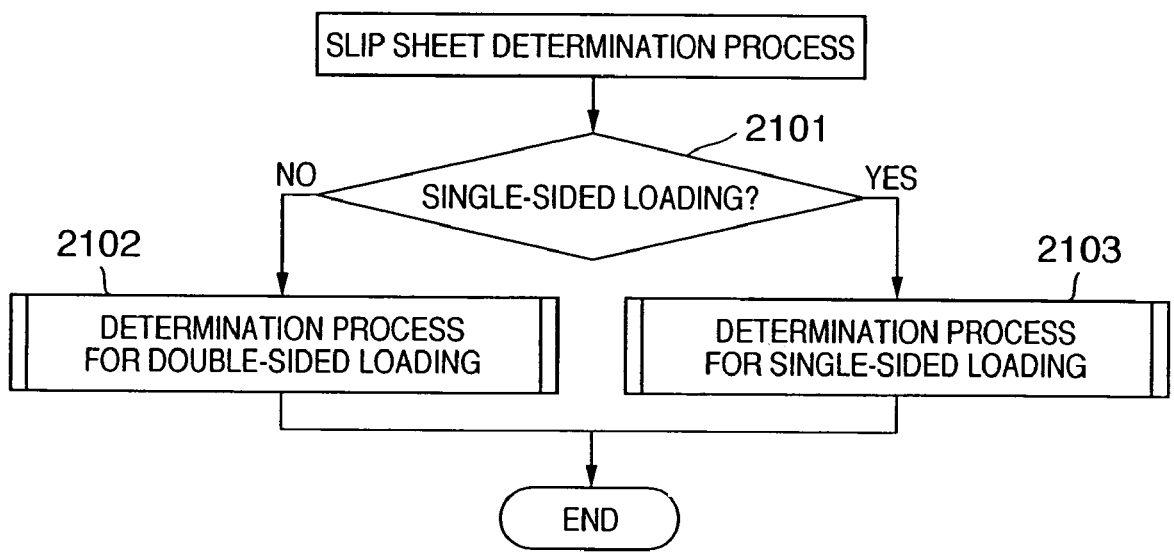
FIG. 22 is a flowchart showing the flow of a slip sheet determination process according to the first embodiment.

FIG. 22 is a flowchart showing the schematic flow of the slip sheet determination process in step 2004. In step 2101, whether single- or double-sided loading is determined. This determination can be achieved at a high speed by holding the process result in step 2002 as a flag and referring to the flag. The flow advances to step 2103 for single-sided loading, and step 2102 for double-sided loading. Step 2102 executes a determination process for double-sided data, details of which will be described with reference to FIG. 24. Step 2103 executes a determination process for single-sided loading, details of which will be described with reference to FIG. 23. The sequence in FIG. 22 divides a chapter by a slip sheet, and when the chaptering flag is not set, is desirably skipped for reduction in processing load.

Figure 23:
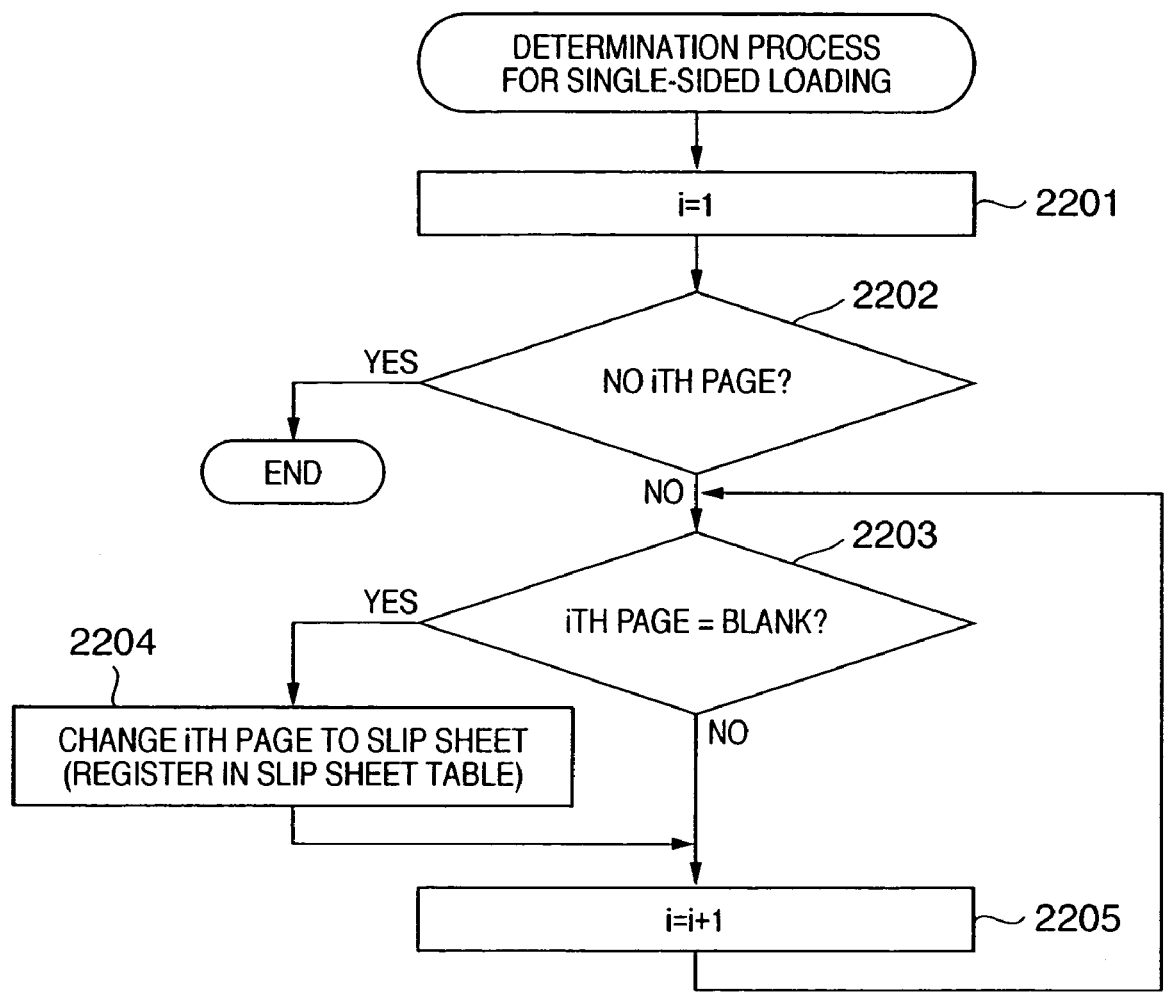
FIG. 23 is a flowchart for explaining details of the process in FIG. 21.

FIG. 23 is a flowchart for explaining in detail the slip sheet determination process in single-sided loading. In step 2201, a counter i is initialized. Assume that the first page is the start page. In step 2202, end determination is done. If the ith page exists, the flow advances to the next step; if no ith page exists (the page exceeds the final page), the flow ends. In step 2203, whether the ith page is blank is determined. A method of determining whether a scanned image is blank is not particularly limited in the present invention. If the ith page is blank, the flow advances to step 2204; if NO, to step 2205. In step 2204, slip sheet determination is performed. In single-sided printing, if a blank sheet is detected, the blank page is unconditionally determined as a slip sheet, and the counter i is recorded in a slip sheet table. The flow advances to step 2205 to increment the counter by one, and returns to step 2203 again to perform end determination. The slip sheet table is set in a rewritable storage area such as a RAM.

Figure 24:
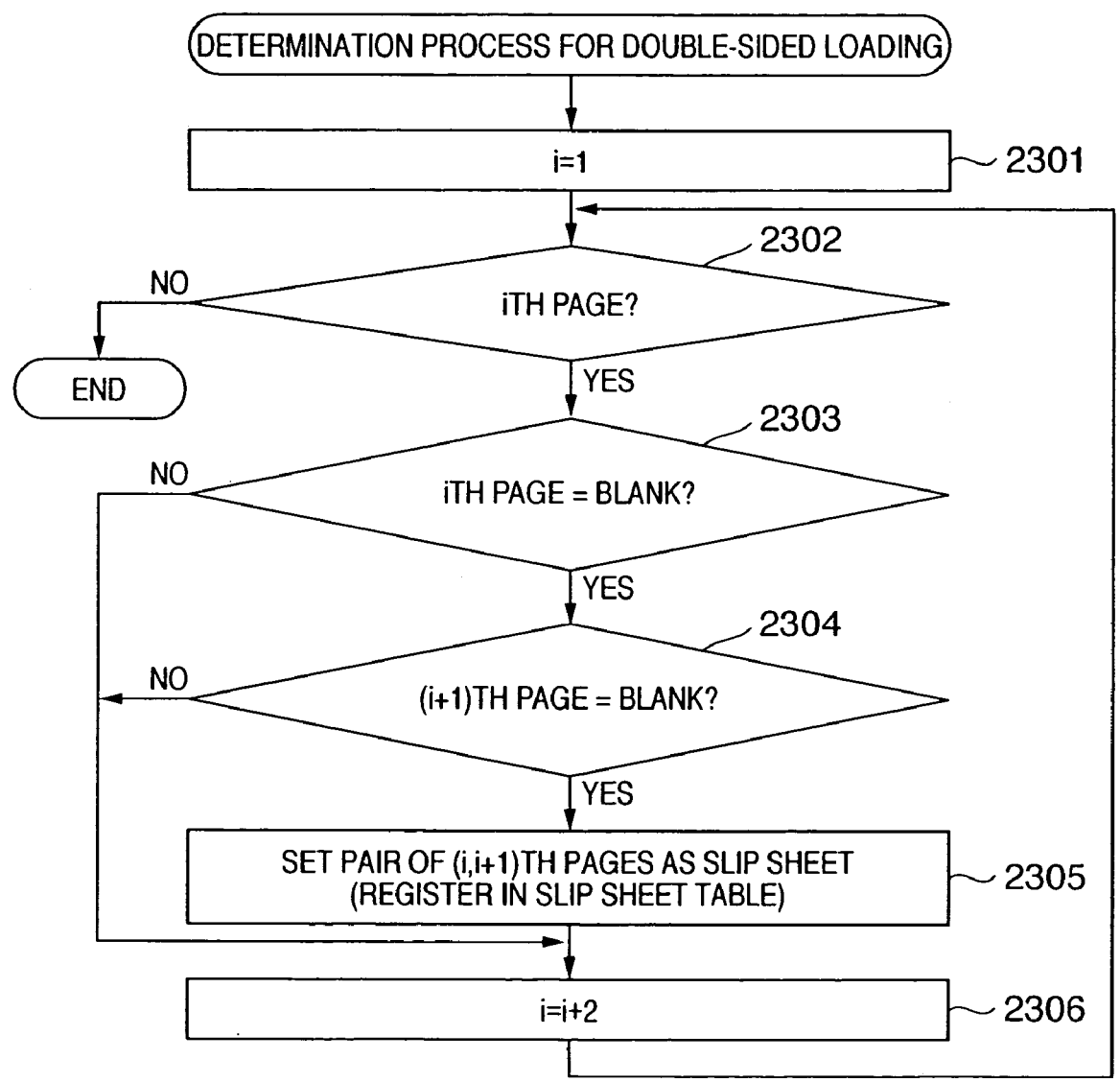
FIG. 24 is a flowchart for explaining details of the process in FIG. 21.

FIG. 24 is a flowchart for explaining in detail the slip sheet determination process in double-sided loading. In step 2301, the counter i is initialized. Assume that the first page is the start page, similar to FIG. 23. In step 2302, end determination is done. If the ith page exists, the flow advances to step 2303; if no ith page exists, the flow ends. In step 2303, whether the ith page is blank is determined. If the ith page is blank, the flow advances to step 2304; if NO, to step 2306. In step 2304, whether the (i+1)th page is blank is determined. If both the ith and (i+1)th pages are blank, both the upper and lower surfaces are blank, and the current sheet is determined to be a slip sheet. The flow advances to step 2305 to record the (i,i+1) pair in the slip sheet table. The flow then advances to step 2306 to increment the counter by two. With this process, the counter can always exhibit an odd number and indicate an upper surface. The flow returns to step 2302 to process the next data.

Note that variations may be provided such that when the counter is incremented one by one in step 2306 and odd- and even-numbered successive pages are blank in step 2305, the user is notified of the possibility of a scan error.

In this manner, an electronic original file created in step 2003 is scanned from the start, and when a blank page is detected, the page number is registered in the slip sheet table.

(Chaptering Process)

Figure 25:
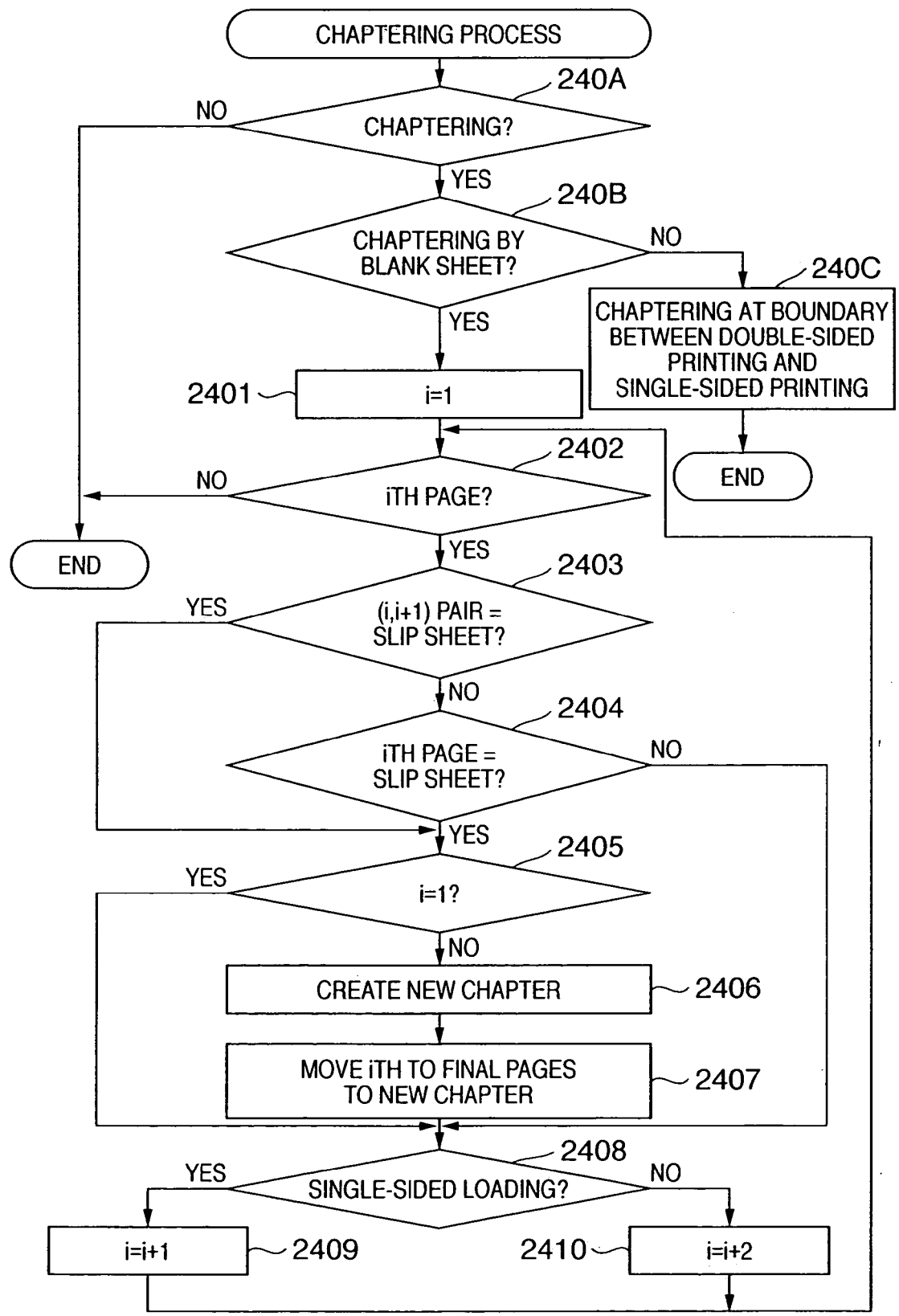
FIG. 25 is a flowchart for explaining the flow of a process of editing the hierarchical structure of a chapter according to the first embodiment.

FIG. 25 is a flowchart for explaining details of the chaptering process in step 2005. In step 240A, the chaptering flag is tested. If the chaptering flag is not set, no chaptering is performed; if the chaptering flag has been set, whether "blank sheet chaptering" has been set as a chaptering method is determined in step 240B. If "blank sheet chaptering" has not been set, a chapter is divided at the boundary between double-sided printing and single-sided printing in step 240C. A further description of this process will be omitted because the present invention is related to blank sheet chaptering.

If blank sheet chaptering is set, the counter i is initialized in step 2401, and "i" represents the number of a chapter of interest. The flow advances to step 2402, and if whether the ith page exists has not been determined, the process ends. If the flow does not end, it advances to step 2403 to check whether the (i,i+1) pair has been recorded in the slip sheet table. If YES in step 2403, the flow advances to step 2405; if NO, to step 2404 to check whether i has been recorded in the slip sheet table. If YES in step 2404, the flow advances to step 2405; if NO, to step 2408.

Step 2405 performs determination for exceptionally processing the start page. If a process of dividing a chapter is executed at the start page, a chapter containing no page is created. To prevent this, the process of dividing a chapter is not executed at the start page, and the flow jumps to step 2408.

Steps 2406 and 2407 show a process of dividing a chapter. In step 2406, a new chapter is created. Chapter information 405 is generated and added to the end of the chapter information list 404. The flow advances to step 2407, the page information list 408 is divided at the ith page, and the divided list is set as the page information list of the new chapter created in step 2406.

The flow advances to step 2408 to determine whether the current process is a process for single-sided loading. If the process is for single-sided loading in step 2408, the flow advances to step 2409 to increment the counter by one; if it is for double-sided loading, to step 2410 to increment the counter by two. If the counter need not be incremented by two in double-sided loading, steps 2408 to 2410 can be replaced with one step 2409. Steps 2403 and 2404 are not successive steps, and only step 2404 for single-sided loading or only step 2403 for double-sided loading may be done.

An operation to the electronic original file 103 in dividing a chapter in steps 2406 and 2407 will be explained with reference to FIGS. 3 and 12.

In step 2406, new chapter information is created for the editing information file shown in FIG. 3, and linked to the document information list 404 of document information to which the chapter of interest belongs. The intermediate file shown in FIG. 12 does not have a chapter structure corresponding to the editing information file in the job ticket, as described above. In this example, however, the layer of the surface information 1103 can be made to correspond to a chapter as far as the paper attribute is kept unchanged between different chapters. As for the job ticket, new surface information 1103 is created in step 2406, and linked to sheet information 1102 to which the current surface information belongs.

Step 2407 is executed as follows. As for the editing information file, data of the ith to final pages in page information linked to the current chapter information are so moved as to be linked to newly created chapter information.

As for the job ticket, data of physical page information linked to surface information corresponding to the current chapter and information subsequent to the physical page information are so moved as to be linked to newly created surface information.

In this manner, when chaptering by a blank sheet is selected, an electronized document is also chaptered by each blank sheet inserted into a paper original.

(Slip Sheet Setting Process)

Figure 26:
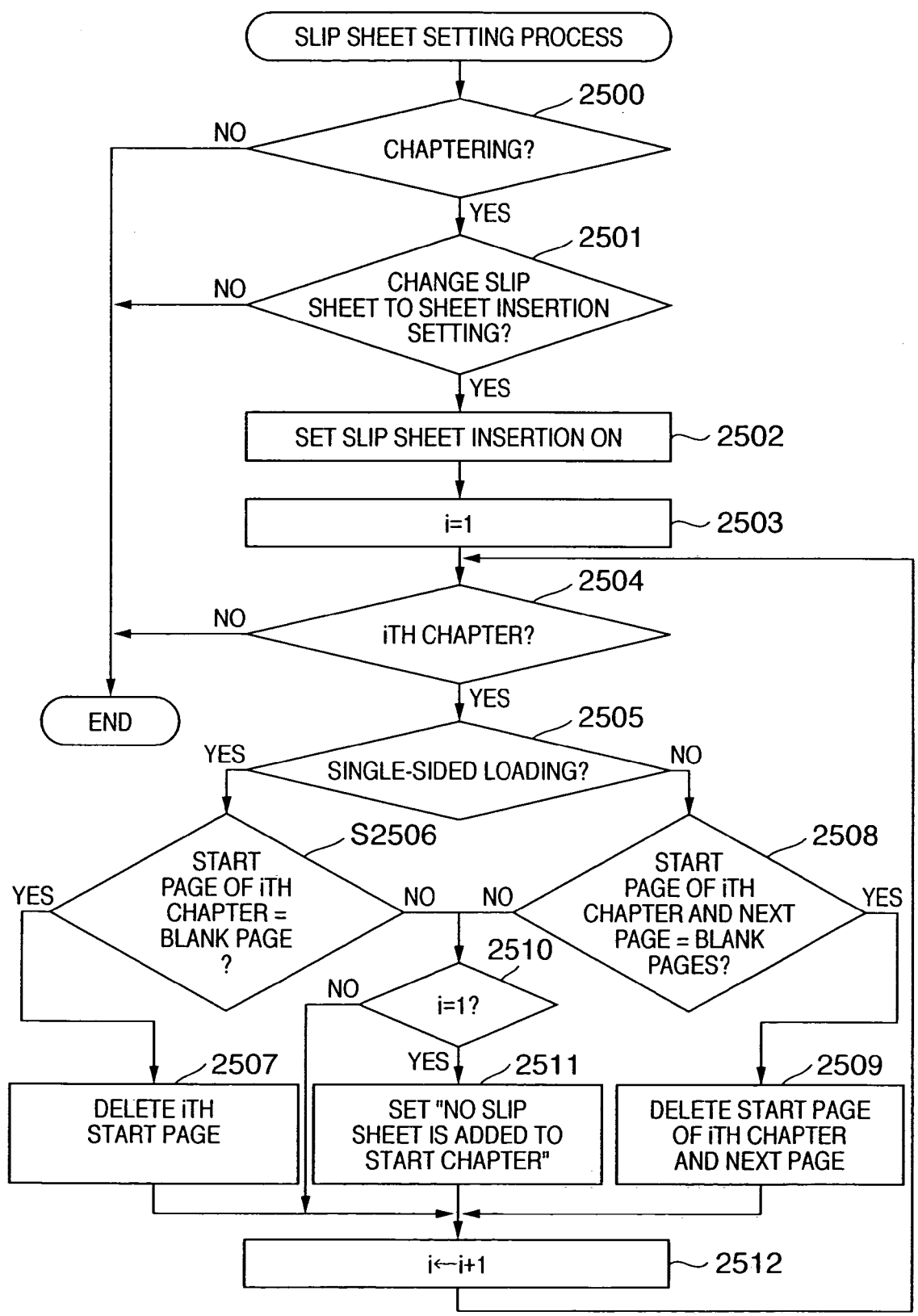
FIG. 26 is a flowchart for explaining the flow of a process of replacing a blank original with a document setting according to the first embodiment.

FIG. 26 is a flowchart for explaining details of the slip sheet setting process in step 2006. In step 2500, the chaptering flag is tested, and if the chaptering flag has not been set, the process ends. If the chaptering flag has been set, whether the slip sheet setting is done, i.e., whether to change the slip sheet from a blank page to the sheet insertion setting is determined in step 2501. If no slip sheet setting is done, i.e., the user sets a blank page so as to leave it as an original page, the flow ends. This is because the logical break of an original may coincide with the break of a chapter, the print result may have a blank sheet, and the user may select not to change the setting.

If the slip sheet setting is done, i.e., the user sets change of a blank page to the slip sheet insertion setting, the flow advances to step 2502. In step 2502, a setting of inserting a blank sheet at the break of a chapter is set ON. This setting is included in the document setting information 403 of FIG. 3 and in the "slip sheet" attribute in the attribute information number 13 of FIGS. 4A and 4B. This attribute sets the slip sheet setting. The feed source of a slip sheet can also be designated. In the first embodiment, the feed port is so set as to feed a slip sheet from a print sheet feed cassette.

The flow advances to step 2503 to initialize the counter i for sequentially processing chapters. The counter i represents a chapter of interest. In step 2504, whether the ith chapter exists is determined. If all chapters have been processed, the process ends.

If an unprocessed chapter remains, the flow advances to step 2505 to determine whether the loading method is single-sided loading. If YES in step 2505, the flow advances to step 2506 to determine whether the start page of the chapter is blank. This branch is a process for coping with a case in which no slip sheet is inserted at the start of a chapter. No page is deleted unless the start page of the chapter is blank. If the start page is blank in step 2506, the flow advances to step 2507 to perform a process of deleting a blank page at the start of the chapter. In step 2507, corresponding original data is deleted from the start page information 409 and page data list 413 of the page information list 406 for the chapter of the editing information file. Also, physical page information and subsequent information including the blank original page are deleted from the job ticket. If the start page is determined in step 2506 not to be blank, the flow jumps to step 2510.

If the loading method is double-sided loading in step 2505, the flow advances to step 2508 to determine whether a page corresponding to the start sheet of the chapter is blank, similar to step 2506. If NO in step 2508, the flow jumps to step 2510; if YES, data of two pages from the start of the chapter are deleted. Similar to step 2507, start page information 409 of two pages is deleted from the page information list of the chapter, and a corresponding page data list is deleted from the document. The job ticket is also processed similarly to step 2507.

In step 2510, whether the chapter of interest is the start chapter of the document is determined. If YES in step 2510, the flow advances to step 2511 to record a setting of not inserting any slip sheet in the start chapter. That is, the "slip sheet" setting of attribute number 13 among the book attributes in FIGS. 4A and 4B contains setting information representing that no slip sheet is inserted into the start chapter of a document. In step 2510, this setting is set ON. In FIG. 26, no special process is done for a chapter except the start chapter. However, if the setting of not inserting any slip sheet is possible at an arbitrary position, the counter i may be recorded as the number of a chapter to which no slip sheet is inserted.

The flow advances to step 2512 to increment the counter i by one, and returns to step 2504 again to perform end determination.

In this fashion, a blank page at the start of a chapter can be deleted, and "slip sheet insertion" between chapters can be set as a document setting (book attribute) instead.

Figure 27:
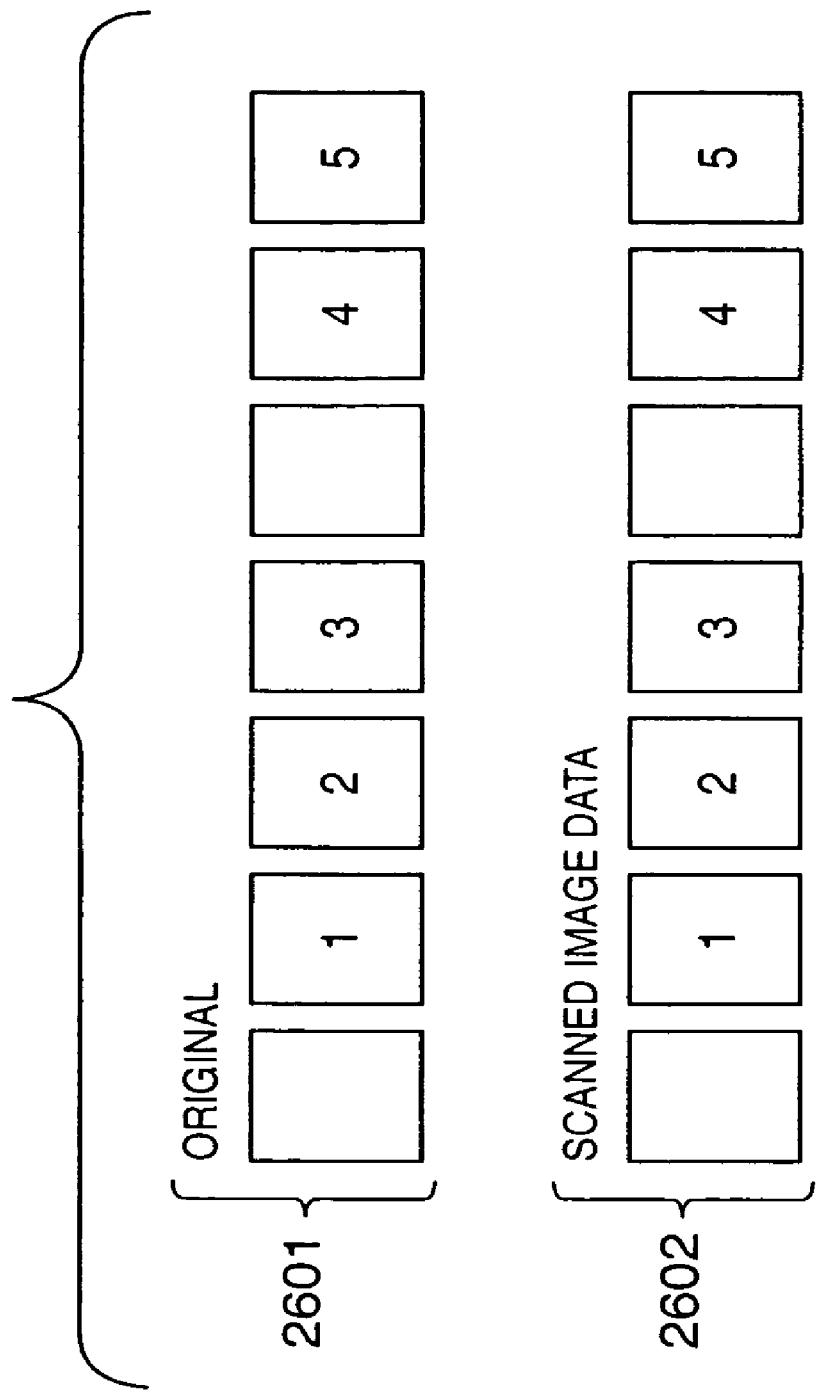
FIG. 27 is a view showing an example of an original containing a blank sheet and an image captured by a scanner.

Reference numeral 2601 in FIG. 27 denotes an example of a single-sided original to which blank pages are inserted. In this example, blank pages exist at the start and between the third and fourth pages. Reference numeral 2602 in FIG. 27 denotes an example of electronic data created when the original 2601 undergoes single-sided scanning.

Figure 28:
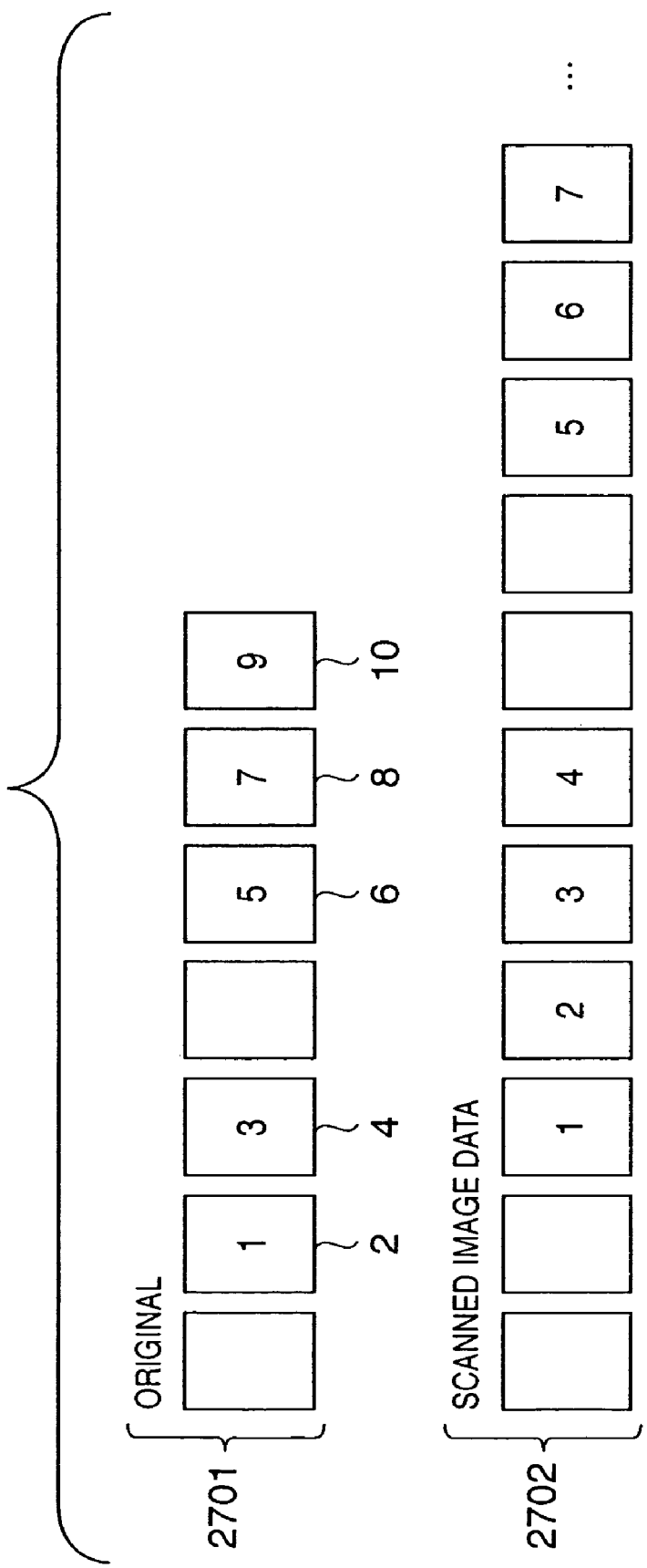
FIG. 28 is a view showing another example of an original containing a blank sheet and an image captured by the scanner.

Reference numeral 2701 in FIG. 28 denotes an example of a double-sided original in which blank pages are inserted. In this example, blank pages exist at the start and between the second and third sheets. Reference numeral 2702 in FIG. 28 denotes an example of electronic data created when the original 2701 undergoes double-sided scanning. In the following example, chaptering by a blank page and the slip sheet setting are done.

Figure 29:
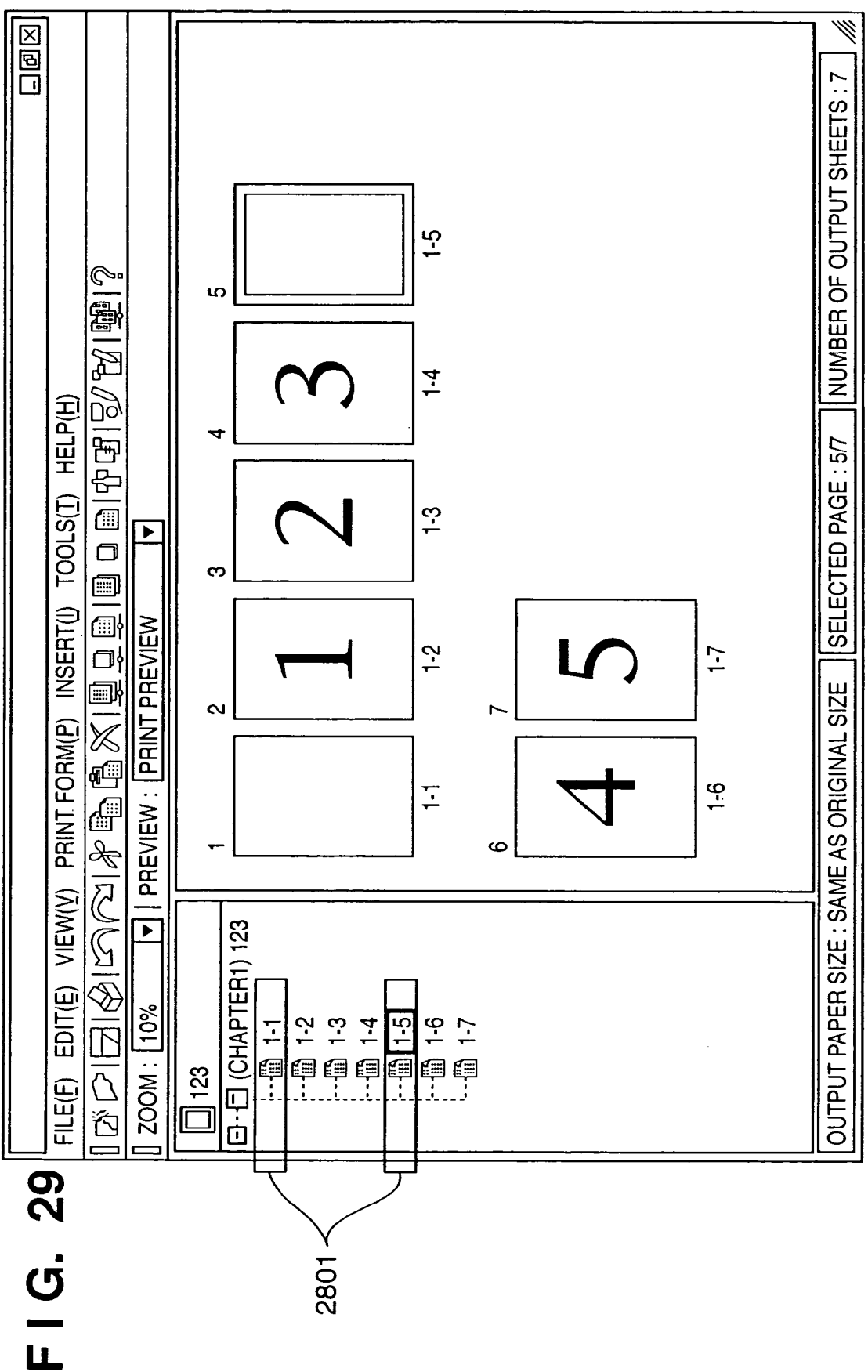
FIG. 29 is a view showing a display example of an electronic document to which the present invention is not applied.

FIG. 29 shows an example of window display when the original in FIG. 27 is loaded. All pages belong to one chapter. Reference numerals 2801 denote electronic original pages (page number 1-1 and 1-5) corresponding to blank pages.

Figure 30:
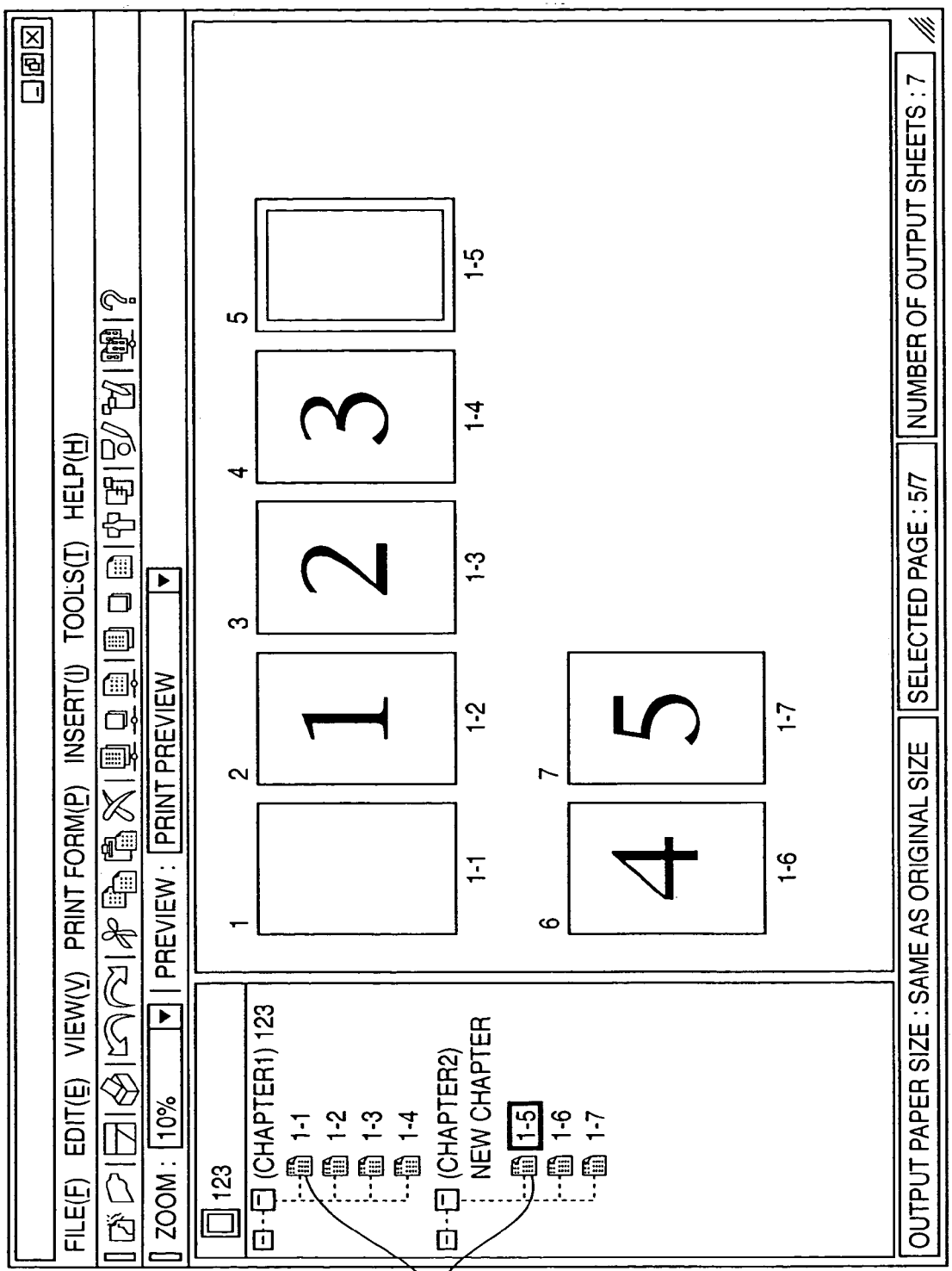
FIG. 30 is a view showing a display example of the electronic document after some of steps according to the first embodiment of the present invention are applied.

FIG. 30 shows an example of window display after the end of step 2005 in FIG. 20. The chapter is divided at blank page 1-5 between the third and fourth pages, creating two chapters. At this time, a blank page 2901 remains.

Figure 31:
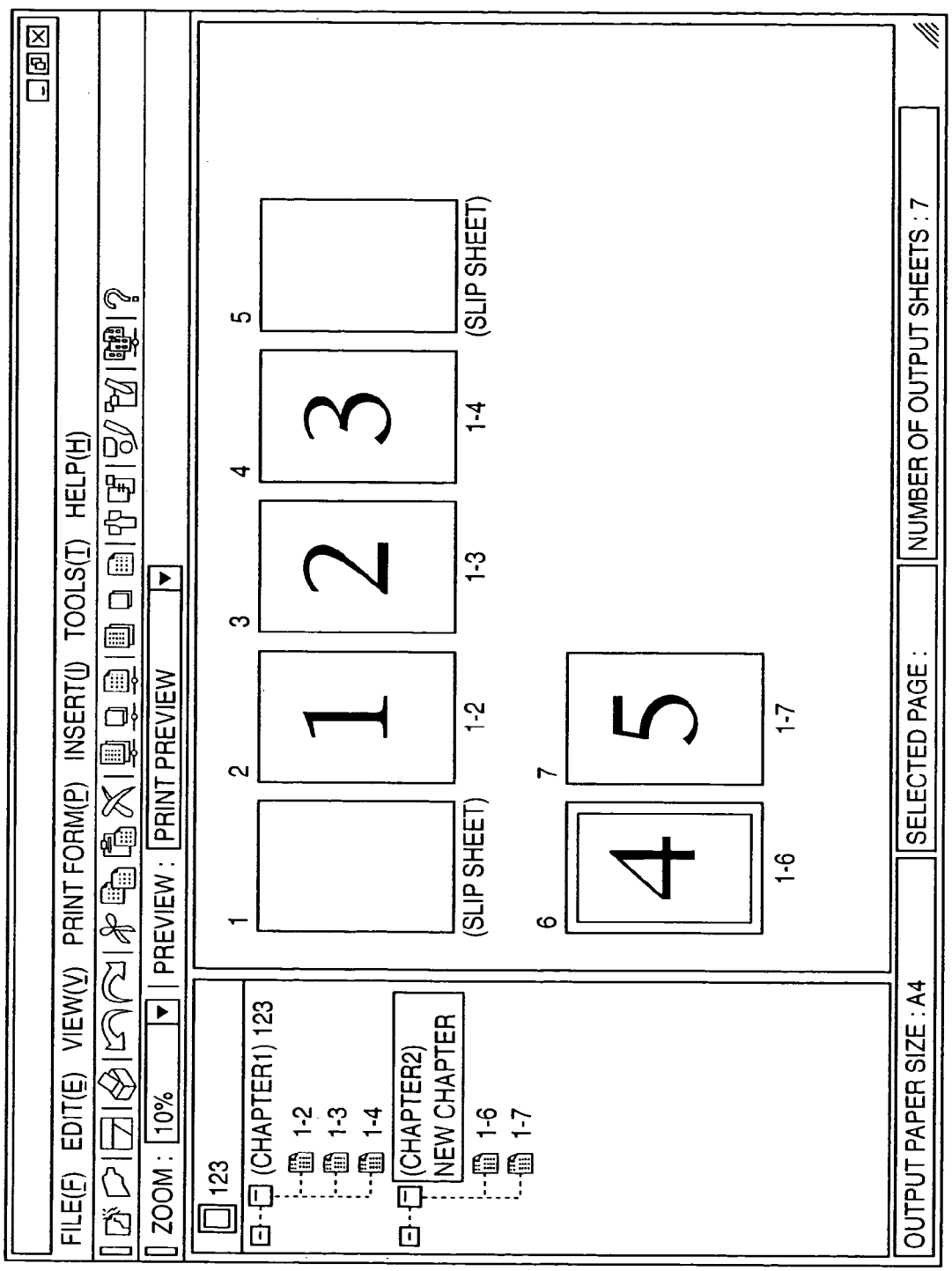
FIG. 31 is a view showing a display example of the electronic document after part of the first embodiment of the present invention is applied.

FIG. 31 shows an example of window display after the end of step 2006 in FIG. 20. A blank page corresponding to 2701 is deleted from the original, and replaced with the slip sheet setting.

FIG. 32 shows an example of a sheet insertion setting window in FIG. 31. A combo box 3101 exhibits that the setting of inserting a slip sheet instead of a blank original sheet is valid. This setting is displayed on the basis of the "slip sheet" attribute in the document setting information (book attributes). When it is recorded in step 2511 of FIG. 26 that no blank sheet exists at the start chapter, no slip sheet is inserted into the start chapter, and this setting value is displayed in a check box 3102. For this reason, the check box 3102 is checked.

Printing Control Method for Document having
Undergone Slip Sheet Setting Process according to
First Embodiment Details of a printing process in the electronic original despooler 105 will be explained. A printing apparatus such as a printer to which the present invention can be applied has a hierarchical structure of a job, binder, and page, similar to a hierarchical structure of a book, chapter, and page in a book file. Control of a printing apparatus complying with the print setting of a document having a hierarchical structure can be implemented by applying book settings to a job in the printing apparatus and chapter settings to a binder in the printing apparatus.

The electronic original despooler 105 issues a job start instruction. The electronic original despooler 105 sets a book printing method (single- or double-sided printing) as the printing method attribute of the job. Although the book printing method also includes bookbinding printing as a choice, the first embodiment will explain single-/double-sided printing control and a description of bookbinding printing will be omitted. In practice, the printing method is also set as a binder attribute, and the book printing method setting is not significant in this case. In some cases, double-sided printing must be designated as the book printing method, similar to the above example in which only when the book printing method attribute is double-sided printing, single-/double-sided printing (similar to a book) can be set as a chapter printing method. The first embodiment can control the printing method in either case by directly setting the book printing method attribute as the job printing method attribute.

The electronic original despooler 105 issues job attributes containing the printing method, and initializes a chapter number in process. The electronic original despooler 105 determines whether all chapters have been processed, and if so, issues a job end instruction to end the book printing process. If an unprocessed chapter remains, the electronic original despooler 105 advances the chapter to be processed by one, and sequentially executes the above process for all chapters.

The electronic original despooler 105 issues a binder start instruction, and sets the printing method of the current chapter in process as the binder printing method attribute. The electronic original despooler 105 issues binder attributes including the printing method. The electronic original despooler 105 executes a printing process for each page of the chapter in process. After the end of the printing process within the chapter, the electronic original despooler 105 issues a binder end instruction, and repeats the binder issuing process until all chapters are processed. The electronic original despooler 105 can notify the printer of the single-/double-sided printing settings of all the chapters.

How to control the printing process between the electronic original despooler 105, the printer driver 106, and the printer 107 will be described.

The electronic original despooler 105 executes a process of generating a print job, such as CreateDC( ) or StartDoc( ) for, e.g., Windows® OS in accordance with the printing process sequence of the OS. The printer driver 106 is notified of this process via the GDI, and performs a job generation process and job attribute setting process. More specifically, the printer driver 106 generates commands which instruct the printer on the start of the job and job attributes including the printing method setting, and transmits the commands to the printer 107 via an OS procedure for transmitting data to the printer.

The electronic original despooler 105 executes ExtEscape (BINDER_START) by the binder start issuing process, and notifies the printer driver 106 of the start of a binder which allows designating an independent finishing attribute. This process means notification of the start of printing a chapter. The electronic original despooler 105 executes ResetDC( ) by the binder attribute issuing process, and notifies the printer driver 106 of binder attributes. More specifically, the electronic original despooler 105 notifies the printer driver 106 of binder attributes including insertion of a slip sheet in a chapter and the stapling setting. The printer driver 106 receives these processes, and performs a binder generation process and binder attribute setting process which notify the printer 107 of the start of a binder. More specifically, the printer driver 106 generates commands which instruct the printer on binder attributes including the printing method setting, and transmits the commands to the printer 107 via an OS procedure for transmitting data to the printer.

The electronic original despooler 105 notifies the printer driver 106 via the GDI of the drawing contents of each page contained in the binder, i.e., the drawing contents of each original page contained in the current chapter. As described above, the printer driver 106 receives the drawing contents which are converted from GDI to DDI, converts them into a drawing instruction such as PDL interpretable by the printer, and transmits the instruction to the printer 107.

The electronic original despooler 105 notifies the printer driver 106 by ExtEscape(BINDER_END) and ExtEscape (BINDER_START) that the current binder ends and the next binder starts. The purpose of these two notifications is to notify the printer driver 106 of the boundary between binders, and they can be combined into one notification which notifies the printer driver 106 of the boundary between binders.

The electronic original despooler 105 repeats the above process by the number of chapters. Finally, the electronic original despooler 105 executes a process of ending the print job, such as EndDoc( ) for, e.g., Windows® OS in accordance with the printing process sequence of the OS. The printer driver 106 is notified of this process via the GDI, and performs a job end process. More specifically, the printer driver 106 generates a command which instructs the printer to end the job, and transmits the command to the printer 107 via an OS procedure for transmitting data to the printer.

Note that a concrete API such as ExtEscape( ) or ResetDC( ) has been exemplified as a means for transmitting a notification from the electronic original despooler 105 to the printer driver 106 via the GDI. However, the same process can also be implemented by using a means other than the API as far as the printing process can be executed by the electronic original despooler 105 and printer driver 106 in synchronism with each other.

By the above process, the printing method (single-/double-sided printing) set for each chapter of a book file can be issued as a binder attribute to the printer, and implemented while single-sided printing and double-sided printing are switched. Slip sheet insertion set for each document in a book file can be implemented as a binder attribute or by reproducing a blank page and issuing it to the printer while a slip sheet is inserted in each chapter.

The document processing system according to the first embodiment can directly electronize the document of a paper original by scanning the paper original including a slip sheet. At the same time, the document processing system can reduce the data amount by deleting a blank sheet.

In each flowchart according to the first embodiment, preceding and succeeding steps can be exchanged as far as the process can be completed.

In the first embodiment, a chapter is divided by using a blank sheet as a slip sheet. Also, a page representing a boundary, such as a paper sheet bearing a predetermined image or for a scanner which can successively load originals of different sizes, a paper sheet of a size different from that of other paper sheets can be inserted at the boundary between chapters.

The first embodiment expresses an original structure by creating an individual chapter because an electronic document has a chapter structure. When, however, a document represents a chapter structure by setting a predetermined flag in information of the final page of a part such as a chapter, the document structure of a paper original can be expressed by an electronic document by setting the flag by a slip sheet.

In this manner, the hierarchical structure of a document can be reproduced in an electronic original file by dividing the hierarchical structure of the document at the position of a slip sheet and thereby creating a chapter. Charging on a blank page or sheet in printing can be prevented by replacing a blank page original with the slip sheet insertion setting. Further, a blank original which is unnecessary for the document structure can be removed by replacing a blank page original with the slip sheet insertion setting.

Second Embodiment

A document processing system according to the second embodiment of the present invention will be explained. In the second embodiment, a description of parts (process block, process sequence, data structure, and the like) common to those in the first embodiment will be omitted. Contents to be described in the second embodiment are mainly parts different from those in the first embodiment.

<Chapter Attribute Information>

The second embodiment is different from the first embodiment in chapter attribute information shown in FIG. 5, and the difference will be explained first.

FIG. 37 shows a list as an example of chapter attributes (chapter setting information 407). The chapter attributes can describe the paper size, paper direction, N-up print setting, enlargement/reduction, watermark, header/footer, delivery information, index sheet, and slip sheet. Index sheet attribute 8 and slip sheet attribute 9 include insertion designation of a paper sheet supplied from an inserter or sheet feed cassette for chaptering, and when a slip sheet is to be inserted, designation of a sheet feed source. When an annotation is added to an index sheet or slip sheet, the index sheet attribute and slip sheet attribute describe identification information of the annotation to be added.

When a chapter is automatically divided by a process (to be described later) and a chapter sheet is set, the present invention can set an annotation on a chapter sheet having no original page data entity by setting the index sheet attribute ON and describing identification information of the annotation.

Both the annotation of an index sheet in FIG. 37 and annotation information in the page attributes of FIG. 6 represent the presence of an annotation to be printed on a paper sheet. However, the annotation in FIG. 37 is set for an index sheet (or slip sheet) having no original page data entity, and thus cannot be described in page attributes, unlike FIG. 6. From this, an annotation is described as part of the index sheet attribute in the chapter attributes of FIG. 5, thereby implementing addition of an annotation to an index sheet serving as a chapter sheet. The relationship between the chapter attribute and the page attribute is the same as that between the book attribute and the lower layer attribute.

Method of Electronizing Paper Medium Document according to Second Embodiment (Options in Import)

A paper medium document electronization process will be explained with reference to FIG. 38. Prior to this description, options settable by the user in the paper original electronization process will be explained. In the second embodiment, the operator can set process conditions in import via a user interface shown in FIG. 51. As for designated items, values corresponding to the designation are stored in a predetermined storage area and referred to in an import process.

The user interface in FIG. 51 is displayed when, for example, one of pull-down menus in an "Edit" column in FIG. 19 is selected. In FIG. 51, when a "delete blank sheet" check box 5101 is checked, a blank sheet delete flag in a predetermined storage area is set. When the blank sheet delete flag is set in the import process, a double-sided blank sheet is deleted. In the second embodiment, the two surfaces of a paper original are successively read. The double-sided blank sheet means two successive pages when both two successive pages of odd and even page numbers are blank. If a "successive blank sheets are not deleted" check box 5102 is designated, a corresponding flag is set.

If a "chaptering" check box 5103 is checked, a chaptering flag is set. If the chaptering flag is not set, all imported original images are inserted as one chapter without performing the chaptering process.

If the chaptering flag is set, a chaptering method button 5104 can be selected. As the chaptering method, a setting (chapter sheet division setting) of dividing a chapter by a single-sided blank sheet (chapter sheet) and a method of dividing a chapter by a blank sheet can be selected. When the chapter sheet division setting is done, a "change chapter sheet to slip sheet" (slip sheet setting) check box 5105 can be selected. These settings are stored as values representing a message to that effect in areas which are ensured in the RAM for the respective settings. These settings may also be saved as one setting file in the hard disk. These settings are referred to in the processes of FIGS. 38 to 41, but settings not directly related to the present invention are not referred to in these flowcharts.

When the "change chapter sheet to slip sheet" check box 5105 is checked and a chapter is divided, a chapter sheet inserted at the start of a chapter is deleted, and a slip sheet setting (item 13 in FIG. 4B) in the book attributes of the document is set instead. Contents to be set include a slip sheet flag representing that a slip sheet is inserted, and a sign representing a portion (e.g., cassette) which supplies a slip sheet. The sign representing a portion which supplies a slip sheet can designate the "same as paper feed cassette", a specific paper feed cassette, or if the printer comprises an optional inserter, the inserter.

Contents (character, figure, image, and the like) described on the surface of a chapter sheet are registered in the slip sheet attribute among book attributes, as an annotation which is to be printed as a set of images on a slip sheet. In the book attributes of FIG. 4B, these contents are registered in No. 13 "slip sheet" setting item, and saved as part of an electronic original file. The annotation of a chapter sheet is loaded image data, and can also be registered for each chapter. The registered annotation data is output for each chapter as an image to be printed on a chapter sheet (slip sheet) in outputting an electronic original file. By changing a chapter sheet to a slip sheet and processing characters and the like on the sheet as an annotation, the chapter sheet is not influenced by even change of the chapter layout to N-up or change of the printing method from double-sided printing to single-sided printing or vice versa because the chapter sheet is not part of a chapter. Thus, the operator can change the layout and printing method of a chapter or whole document at once without considering the layout or printing method of a chapter sheet.

FIG. 52 is a UI view showing an example of a dialog box for detailed setting for automatic chaptering. Automatic chaptering is performed for a book file by selecting an existing book file and designating application of automatic chaptering by the operator. The meanings of check boxes are the same as those shown in FIG. 51 except that settings in FIG. 51 are referred to in import, unlike settings in FIG. 52. A menu window for displaying the user interface window in FIG. 52 is identical to the window shown in FIG. 35, similar to the first embodiment. This menu window enables the user to designate which of an entire document or selected chapter undergoes chaptering. If the "chaptering" check box 5103 in FIG. 51 is not checked in import but chaptering is done after the completion of import, a chapter can be divided at a blank sheet insertion portion or the like.

(Import Process)

Figure 38:
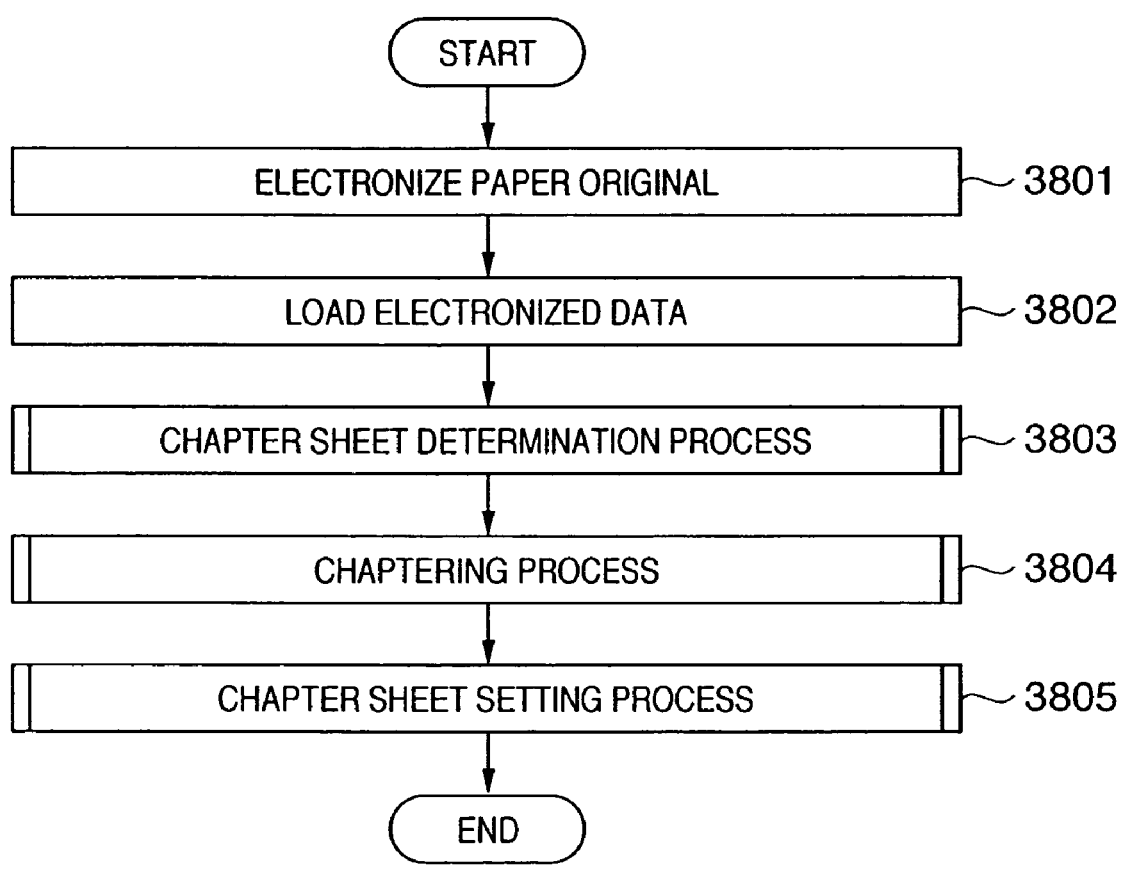
FIG. 38 is a flowchart showing the flow of an overall process according to the second embodiment of the present invention.

FIG. 38 is a flowchart showing the sequence of an import process. The sequence of FIG. 10 is executed when a document generated by another application is imported. FIG. 38 is a flowchart showing an overall process when a paper original is loaded, the document structure is analyzed, and a slip sheet is set, in order to import the paper original. In the second embodiment, an original loaded from the scanner is called a paper original, but the paper original also includes an original printed on a sheet-like medium other than paper. The sequence of FIG. 38 is executed by a whole system including a scanner 108 and computer 100. In particular, step 3801 is executed by the scanner, and steps 3802 to 3805 are executed by a bookbinding application 104.

In step 3801, a paper original is electronized. Considering automation, a scanner with an automatic document feeder is desirable, but the process can be achieved by any type of scanner. As the format of electronized data, a plurality of formats such as TIFF, JPEG, BMP, and PDF are available, but the present invention can be applied to any format. As described above, original scan processing methods can be roughly classified into two. One method is called a push scan method of setting a shared folder in a PC and copying an image data file captured by a scanner to the shared folder. The other method is a pull scan method of directly receiving image data from a scanner via a scanner driver such as TWAIN or ISIS. In push scan, steps 3801 and 3802 can be executed without synchronizing with each other. In pull scan, electronization of an original in step 3801 and loading of the original in step 3802 are executed as a series of processes in synchronism with each other under the control of the computer.

In step 3802, electronized data (image data) is loaded into the system, particularly the bookbinding application 104. In push scan, a shared folder which stores image data created by scanning an original is monitored, and when an image data file is created, the system can automatically load the file. In pull scan, data can be directly acquired from the scanner driver. An electronic original file 103 in which image data corresponding to one page of an original is defined as one page is created on the basis of the loaded image data.

The second embodiment assumes that loading by the scanner is double-sided loading. For this reason, in pull scan, the host computer 100 instructs the scanner 108 on "double-sided scanning", and causes it to scan. In this case, the scanner desirably comprises an ADF.

In push scan, a file name created in scan is so defined as to discriminate single-/double-sided loading. When the bookbinding application 104 reads out an image data file, it can automatically determine on the basis of the file name whether the data is obtained by double- or single-sided loading. For example, the loading method can be determined from the file name by adding "S_" to the start of the file name for single-sided loading and "D_" for double-sided loading. The loading method can also be determined from a blank page in data obtained by scanning all pages. For example, a double-sided job is determined under a condition such as "blank pages appear every other page" or "two, odd- and even-numbered successive pages are blank", and a single-sided job is determined under another condition. Instead of automatic determination, a dialog window for acquiring information may be displayed to prompt the user to designate single-/double-sided loading. By any method, the determination result is saved as the value of a referable flag or the like (e.g., the value of a double-/single-sided loading flag ensured in the RAM) in order to refer to the determination result in subsequent steps. In step 3802, only the folder of an image file having undergone double-sided scanning is loaded.

The flow advances to step 3803, and the bookbinding application 104 performs a chapter sheet determination process. Details of this process will be explained with reference to FIG. 39. The "chapter sheet" means a page inserted as the front cover of a "chapter" which forms a document. In general, the upper surface of the chapter sheet bears the title of a chapter or the like, whereas the lower surface is blank. After a chapter sheet is determined, the flow advances to step 3804, and the bookbinding application 104 divides a book file (document) at each chapter having the determined chapter sheet as the start page, and reflects the logical structure of the paper original in the data structure of the document. Details of this process will be explained with reference to FIG. 40. The flow advances to step 3805, and the bookbinding application 104 changes a chapter sheet to "sheet insertion setting" of the document. Details of this process will be explained with reference to FIG. 41.

By the above sequence, image data loaded from a paper original is converted into an electronic file which reflects the document structure of the paper original. The contents of this file can be displayed or printed by the bookbinding application 104. In printing, when a slip sheet between chapters is set as a chapter sheet and the electronic original file 103 does not contain any chapter sheet, a chapter sheet is inserted into a printed or displayed document as far as "insert slip sheet" is set as the setting of the slip sheet (setting item 13 in FIG. 4B contained in document setting information 403 of FIG. 3) in book attributes. In an electronic original file data display process, a chapter sheet is inserted and displayed between chapters if the slip sheet setting is done. In a printing process, an instruction to feed a slip sheet from a cassette or inserter corresponding to the setting is generated and inserted at a chapter sheet insertion position, and transmitted to the printer. In addition, the second embodiment can print a tile or the like on a chapter sheet by designating an annotation on the chapter sheet even when the chapter sheet is processed as a slip sheet.

In this way, an electronic original file which reproduces the read paper original including its format can be generated. A document which directly reproduces the paper original can also be output.

(Electronized Data Loading Process)

The sequence of the electronized data loading process in step 3802 of FIG. 38 will be explained in detail. Whether image data is obtained by single- or double-sided loading is determined. For double-sided loading, actual image data is loaded. In pull scan, the loading method can be designated, and thus this determination may be limited to push scan. For single-sided loading, image data is not suitable for division using a chapter sheet, and loading stops. Alternatively, only loading in step 3802 may be done, and processes in step 3803 and subsequent steps may be skipped.

Image data corresponding to pages of a document are sequentially loaded. A book file is created from the loaded image data as pages contained in one chapter.

An operation of adding a page to a chapter in an editing information file contained in the electronic original file 103 will be explained with reference to the example of FIG. 3. In a current chapter 405, an imported image is added as new page data to a page data list 413, and a link to the new page data is added to the page data link of a page information list 408 of the current chapter information 405. This page data link links the page data of the imported image to the current chapter information 405. In the second embodiment, since a paper original is obtained by double-sided scanning, "double side" is recorded in the printing method attribute (attribute number 1 in FIG. 4A) of the document setting information 403 (FIG. 3).

To the contrary, a job ticket (see FIG. 12) as an intermediate file contained in the electronic original file has a hierarchical structure, but no chapter structure, unlike an editing information file. The job ticket has a structure in which a bundle of common paper sheets (also called sheets) is defined by sheet information 1102, paper sheets belonging to the bundle of paper sheets are defined by surface information 1103, surfaces belonging to the surface information are defined by physical page information, and original pages belonging to each physical page information are defined by original page information. For example, a job ticket layer corresponding to the "chapter" of an editing information file corresponds to "sheet information". In the second embodiment, a new page is added to the job ticket, as shown in FIG. 12. That is, new surface information 1103 to be linked to the sheet information 1102 corresponding to the current chapter is added, physical page information 1104 is added to the surface information 1103, and new original page information 1105 to be linked to the physical page information 1104 is added. Imported image data is linked as new page data to the page data link of the original page information 1105. In the second embodiment, since a paper original is obtained by double-sided scanning, the surface information 1103 is linked to odd- and even-numbered successive pages as physical page information and subsequent original page information in this order.

By the above sequence, an electronic original file having one chapter is created in step 3803. An electronic original file is newly created in this sequence, but may be added to an existing electronic original file. In adding an electronic original file, a new chapter may be created from loaded image data, or loaded image data may be added to an existing chapter.

(Chapter Sheet Determination Process)

Figure 39:
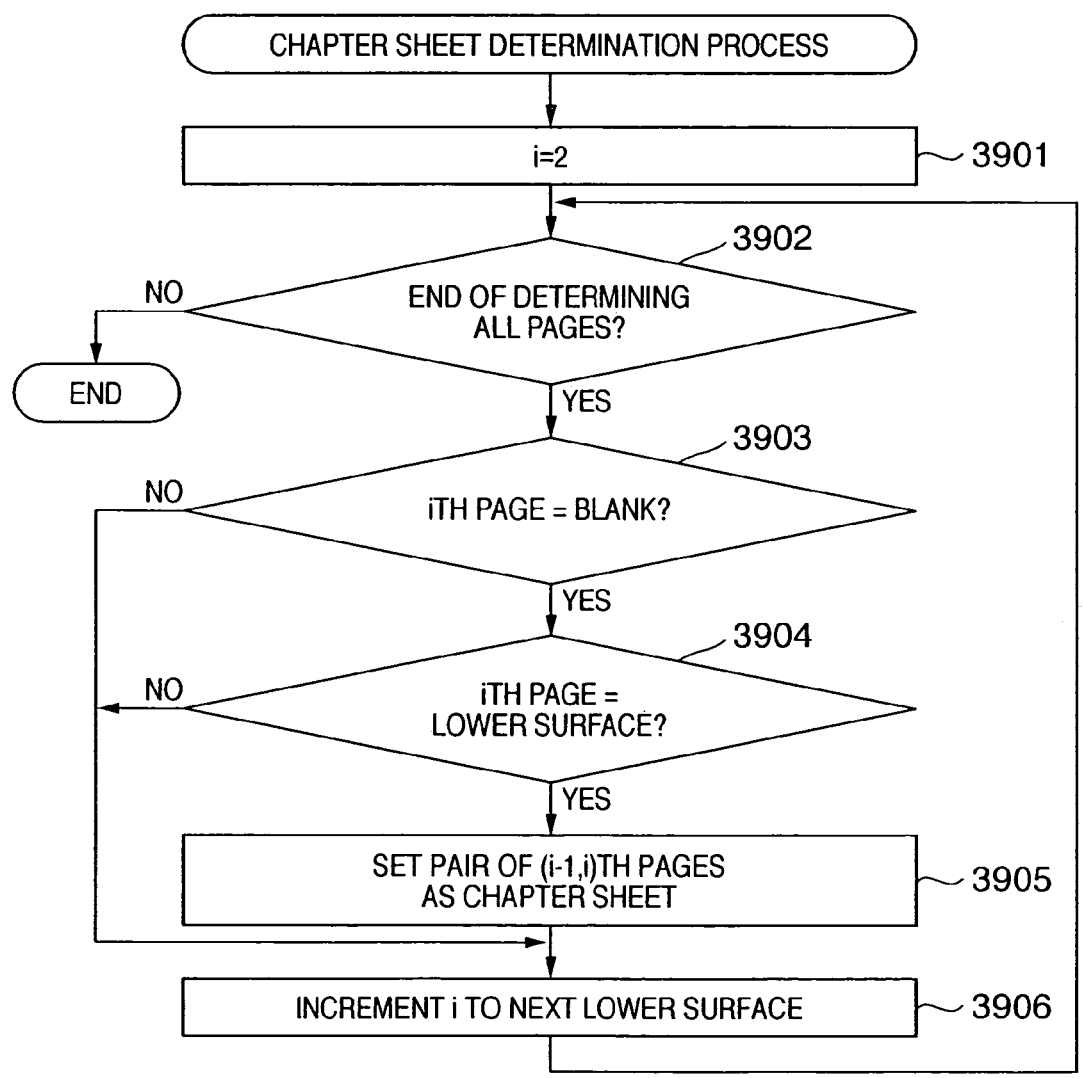
FIG. 39 is a flowchart showing the flow of a chapter sheet determination process according to the second embodiment.

FIG. 39 is a flowchart for explaining in detail the chapter sheet determination process. In step 3901, the bookbinding application 104 initializes a counter i. If the first page is the start page, i=2. In step 3902, the bookbinding application 104 performs end determination. The bookbinding application 104 refers to a page list 406, and checks whether the ith page exists. If the ith page exists, the flow advances to step 3903; if no ith page exists, the flow ends.

In step 3903, the bookbinding application 104 determines whether the ith page is blank. If the ith page is blank, the flow advances to step 3904; if NO, to step 3906.

In step 3904, the bookbinding application 104 determines whether the ith page is a lower surface. The simplest determination method is to determine an upper surface for an odd-numbered page (i is an odd number) and a lower surface for an even-numbered page (i is an even number). Alternatively, upper/lower surface information can be obtained by adding "A_" for an upper surface or "B_" for a lower surface to the start of a file name in scan, and directly using the file name created in scan as page data. Upper/lower surface information may be separately added as a file attribute in loading.

If the ith page is blank, i.e., the lower surface is blank, the bookbinding application 104 determines that the ith page and immediately preceding (i−1)th page are the upper and lower surfaces of a chapter sheet. In this case, the flow advances to step 3905 to record the (i−1,i) pair in a chapter table ensured in the RAM or the like. The flow then advances to step 3906 to increment the counter. When pages are arranged in an order of upper and lower surfaces, the counter can always exhibit an even number and indicate a lower surface by incrementing the counter by two. The bookbinding application 104 returns to step 3902 to process the next data.

In step 3906, the counter is incremented by one. In step 3904, the bookbinding application 104 may adopt variations such that when the upper surface is a blank page, the user is notified of the possibility of a scan error.

(Chaptering Process)

Figure 40:
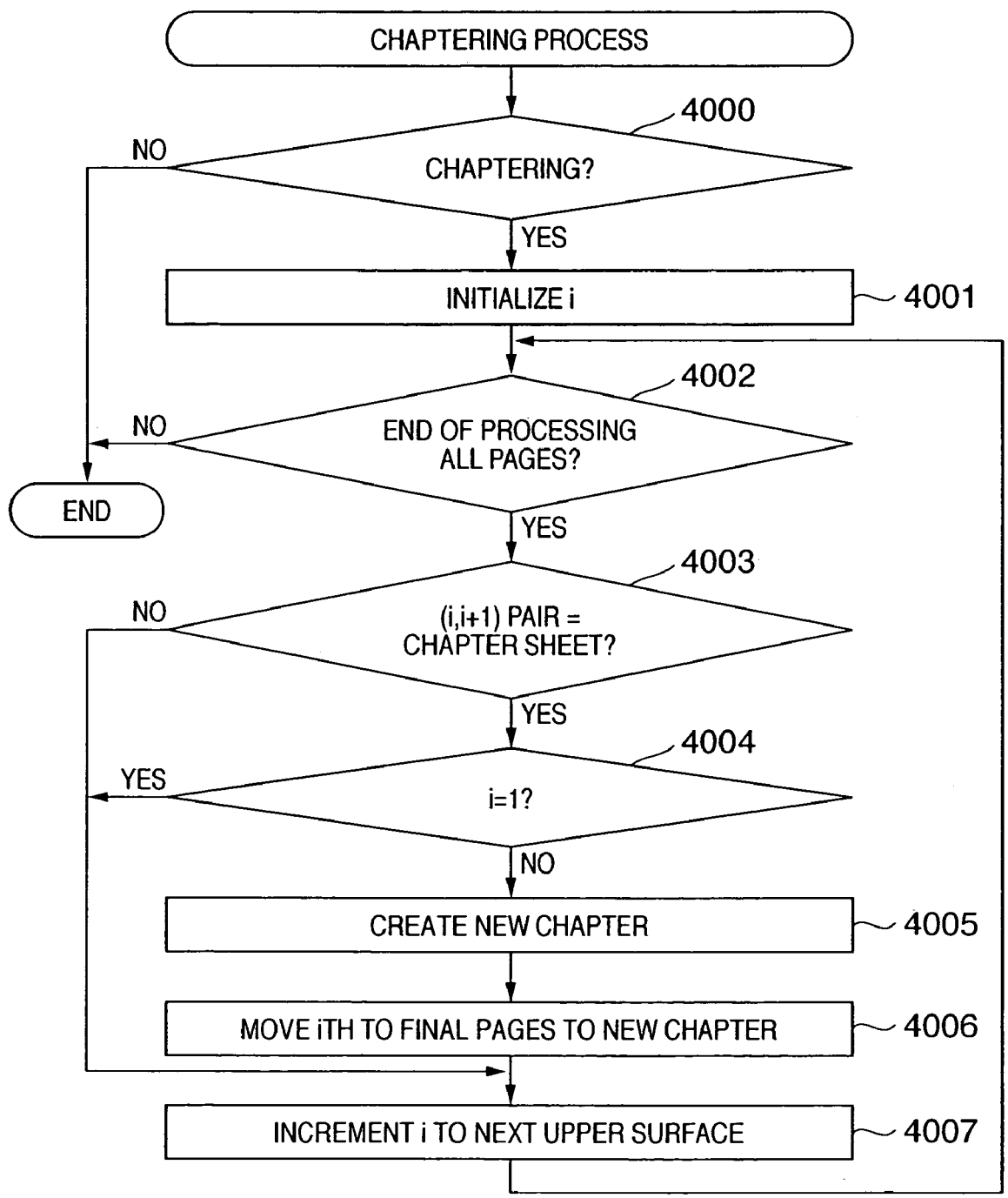
FIG. 40 is a flowchart for explaining the flow of a process of editing the hierarchical structure of a document according to the second embodiment.

FIG. 40 is a flowchart for explaining details of the chaptering process in step 3804. In step 4000, the bookbinding application 104 determines whether the chaptering flag has been set and "divide chapter by single-sided blank sheet (chapter sheet)" has been selected as the chaptering method. If the chaptering flag has not been set, no chaptering is required, and if another chaptering method has been selected, the process of FIG. 40 need not be executed, and thus ends. If the chaptering flag has been set, the bookbinding application 104 initializes the counter i (i←1) in step 4001. The flow advances to step 4002, and the bookbinding application 104 performs end determination. If the flow does not end, it advances to step 4003, and the bookbinding application 104 checks whether the (i,i+1) pair has been recorded in the slip sheet table. If YES in step 4003, the flow advances to step 4004; if NO, to step 4007.

Step 4004 performs determination for exceptionally processing the start page. If a process of dividing a chapter is executed at the start page, a chapter containing no page is created. To prevent this, even if a chapter sheet is set, the process of dividing a chapter is not executed at the start page, and the flow jumps to step 4007. If the ith page is not the start page, the flow advances to step 4005.

Steps 4005 and 4006 show a process of dividing a chapter. In step 4005, as for the editing information file, the bookbinding application 104 creates new chapter information 405, and adds the information 405 to the end of the chapter information list 404. As for the job ticket, the bookbinding application 104 creates new sheet information and adds it to the end of document information. In step 4006, as for the editing information file, the bookbinding application 104 divides the page information list 408 at the ith page, and sets the ith to final pages as the page information list of the new chapter created in step 4005. As for the job ticket, the bookbinding application 104 moves the ith to final pages from the surface information layer to the newly added sheet information.

In step 4007, the counter i is incremented. Similar to step 3906, the counter is incremented by two. The flow then returns to step 4002 to process the next page.

By this process, a paper sheet (paper sheet in electronic data) whose lower surface is blank can be regarded as a chapter sheet, and the document is divided at each chapter having the chapter sheet as a front cover.

(Chapter Sheet Setting Process)

Figure 41:
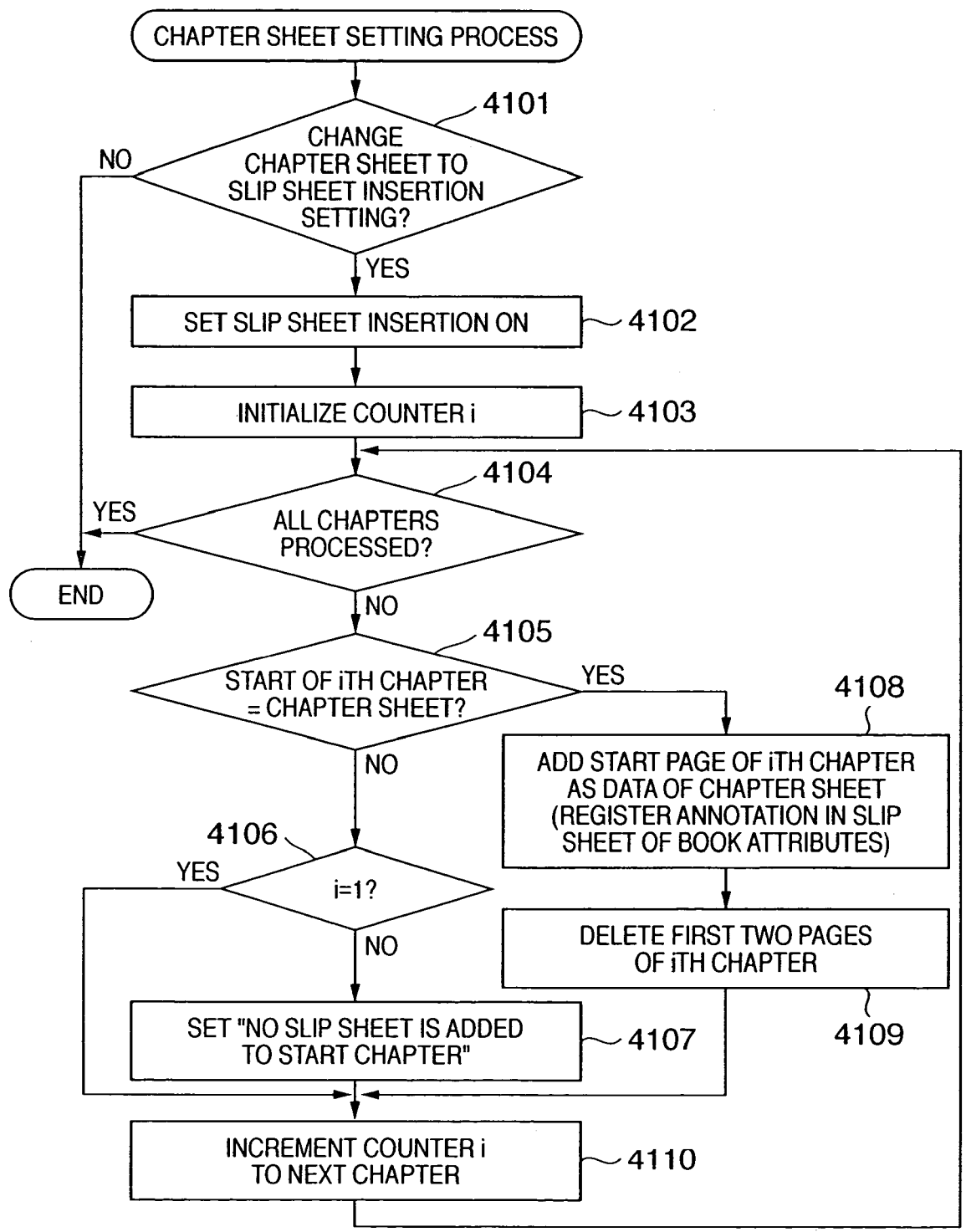
FIG. 41 is a flowchart for explaining the flow of a process of replacing an original page on a chapter sheet with a document setting according to the second embodiment.

FIG. 41 is a flowchart for explaining details of the chapter sheet setting process in step 3805. The chapter sheet setting process is to replace a chapter sheet with a slip sheet insertion setting in an electronic original file by utilizing the "slip sheet" attribute in document setting information (i.e., book attributes). A slip sheet (chapter sheet) may be inserted by adding a command corresponding to a slip sheet in transmission to an output device, or when an output device such as a printer has a slip sheet insertion function, may be inserted by the output device by transmitting a message to insert a slip sheet and the insertion position to the output device.

In step 4101, the bookbinding application 104 determines on the basis of a flag or the like set in accordance with an operation whether to change a chapter sheet to the slip sheet insertion setting, i.e., whether "change chapter sheet to slip sheet (change to slip sheet insertion setting)" in FIG. 51 has been done. If a chapter sheet is to be changed to a slip sheet, the flow ends as far as the user sets a chapter sheet so as to leave it as an original page. This is because the logical break of an original may coincide with the break of a chapter, the print result may have a blank sheet, and the user may select not to change the setting. If the user sets change to the sheet insertion setting, the flow advances to step 4102.

In step 4102, the bookbinding application 104 sets ON a setting of inserting a paper sheet at the break of a chapter. That is, the "slip sheet" insertion setting ("slip sheet" setting in the book attributes of FIG. 4B) in the document setting information of FIG. 3 is changed to a setting of inserting a slip sheet. The flow advances to step 4103 to initialize the counter i for sequentially processing chapters.

In step 4104, the bookbinding application 104 determines whether the ith chapter exists. If all chapters have been processed, the process ends; if an unprocessed chapter remains, the flow advances to step 4105.

In step 4105, the bookbinding application 104 determines whether the start page of the chapter is a chapter sheet. Since the serial page number of the start page of the chapter can be obtained by adding the numbers of pages contained in chapters, whether the start page of the chapter is a chapter sheet can be determined by collating the serial page number with a page number registered in the chapter sheet table. In the second embodiment, a chapter is divided by a chapter sheet, and the start page of the chapter is basically the chapter sheet except for the start chapter. If the start page is not a chapter sheet, the flow advances to step 4106; if the start page is a chapter sheet, to step 4108.

In step 4106, the bookbinding application 104 determines whether the chapter in process is the first chapter. If the chapter in process is the first chapter, the flow advances to step 4110; if the chapter is not the first chapter, to step 4107.

In step 4107, the bookbinding application 104 sets ON a setting of not adding any chapter sheet to the start chapter. This setting is also included in the "slip sheet" insertion setting ("slip sheet" setting in the book attributes of FIG. 4B) in the document setting information of FIG. 3, and is set. In a system in which the setting of not adding any chapter sheet is possible at an arbitrary chapter, the chapter sheet setting of the ith chapter counted by the counter is set OFF without executing the determination in step 4106.

In step 4108, the bookbinding application 104 changes the start page data and immediately subsequent page data of the chapter in process from original data to annotation data on a chapter sheet. That is, the bookbinding application 104 registers page data corresponding to the start page of page information 409 of the chapter as annotation data of the chapter sheet in an annotation library. The bookbinding application 104 registers, in the "slip sheet attribute" among the chapter attributes shown in FIG. 37, printing of the registered annotation library on a slip sheet. For example, the bookbinding application 104 sets a flag representing insertion of a slip sheet, and registers an annotation, e.g., name to be printed on a slip sheet as an annotation to be printed. At this time, the bookbinding application 104 may designate an annotation insertion position. The bookbinding application 104 then deletes page information and page data of two pages at the start of the page information 409 of the chapter. The annotation of the chapter sheet is registered as an attribute in No. 13 "slip sheet" item in the book attributes shown in FIG. 4B.

In step 4109, the bookbinding application 104 deletes the second page (blank page) of the chapter in process. The bookbinding application 104 deletes the second page information from the page information 409 of the chapter, and deletes corresponding page data from the page data list.

In step 4110, the counter i is incremented to process the next chapter.

By the above sequence, a page corresponding to a chapter sheet can be deleted from an electronic original file, and insertion of a slip sheet instead of the chapter sheet can be set. Image data on the upper surface of a chapter sheet is registered as an annotation on a slip sheet, and the description on the chapter sheet can be reproduced in the electronic original file.

Figure 42:
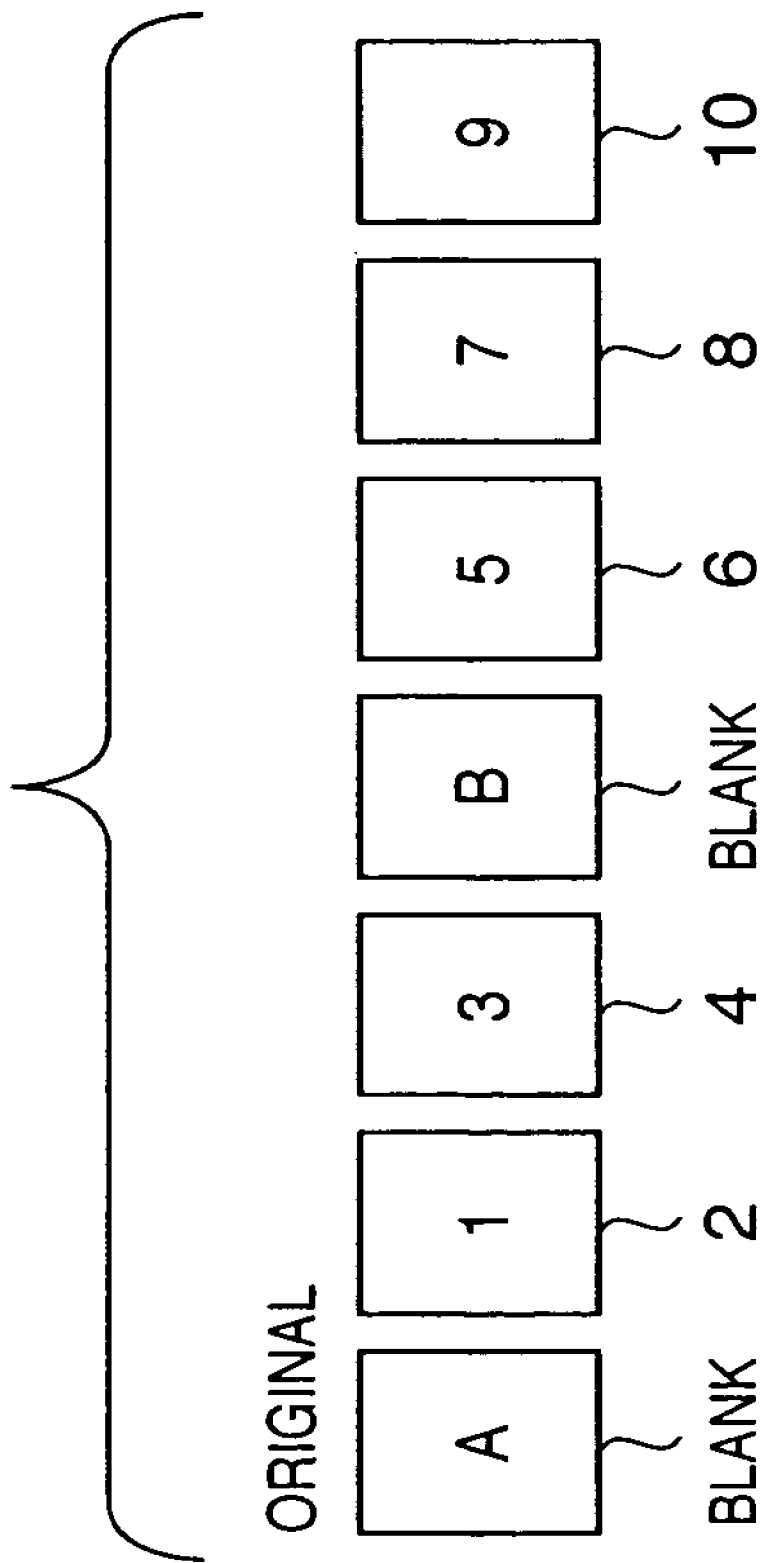
FIG. 42 is a view showing an example of an original containing a chapter sheet according to the second embodiment.
Figure 43:
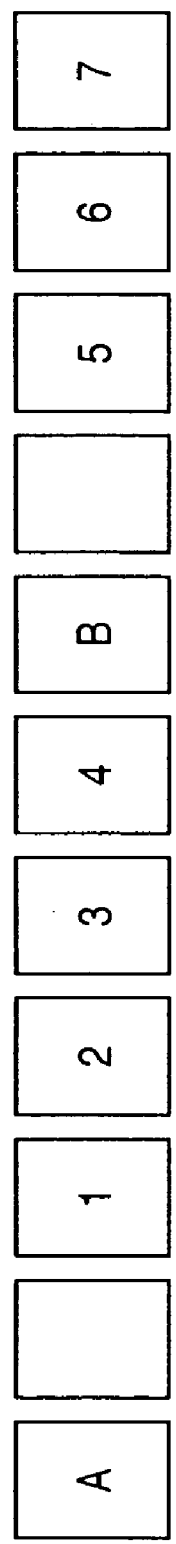
FIG. 43 is a view showing an example of image data obtained by capturing the original of FIG. 42 by the scanner.

FIG. 42 shows an example of an original in which chapter sheets are inserted. In this example, chapter sheets exist at the start and between the second and third sheets. FIG. 43 shows an example of electronic data created when the original in FIG. 42 undergoes double-sided scanning. Even the lower surfaces of the chapter sheets are scanned as blank page data.

Figure 44:
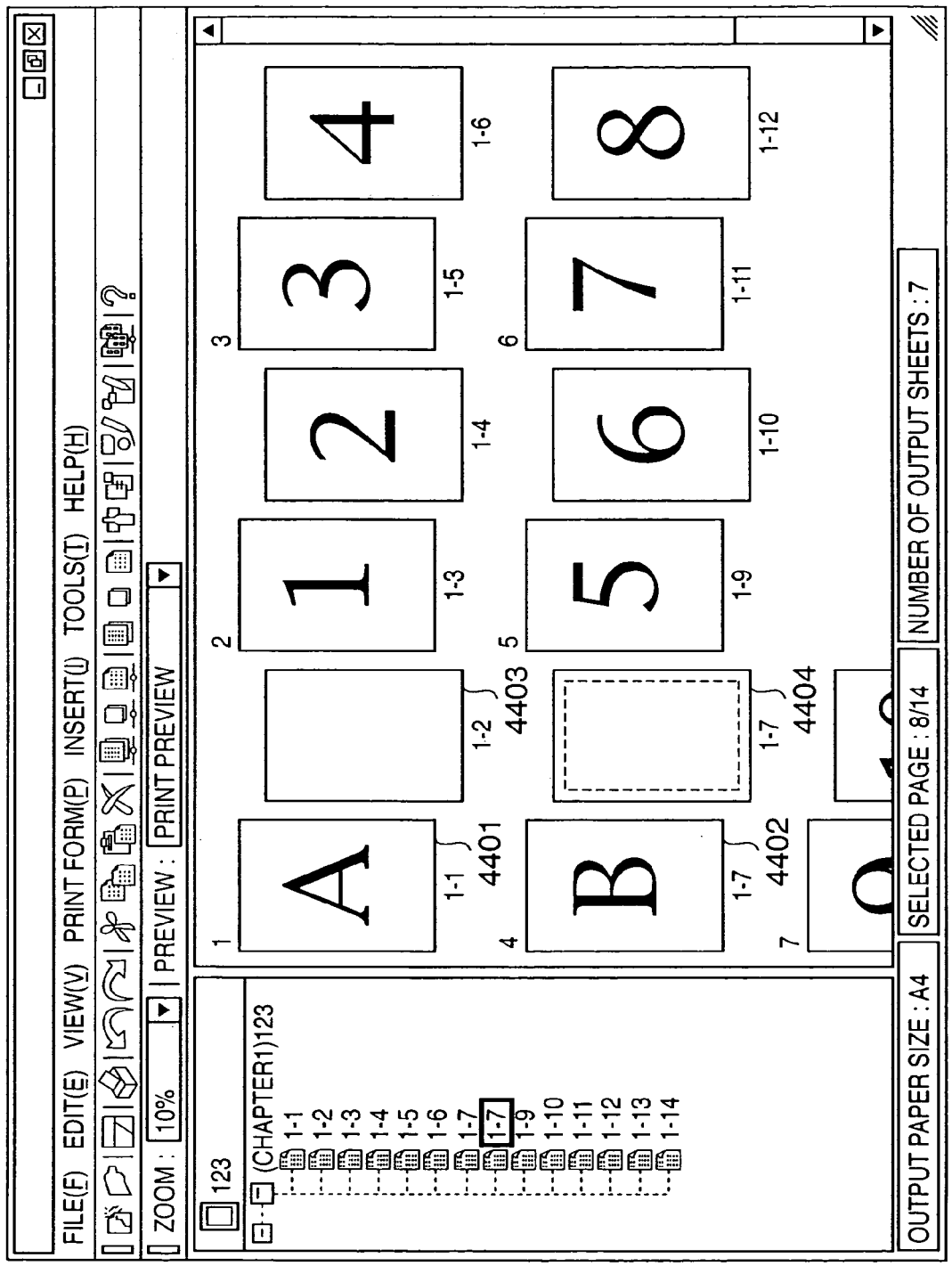
FIG. 44 is a view showing a display example of an electronic document obtained by only loading the data of FIG. 43.

FIG. 44 shows an example of window display of an electronic original file immediately after step 3802 in FIG. 38 when the scanned electronic data in FIG. 43 is loaded. All pages belong to one chapter. Data corresponding to the upper surfaces (4401 and 4402) and lower surfaces (4403 and 4404) of chapter sheets are also captured similarly to the remaining original sheets.

Figure 45:
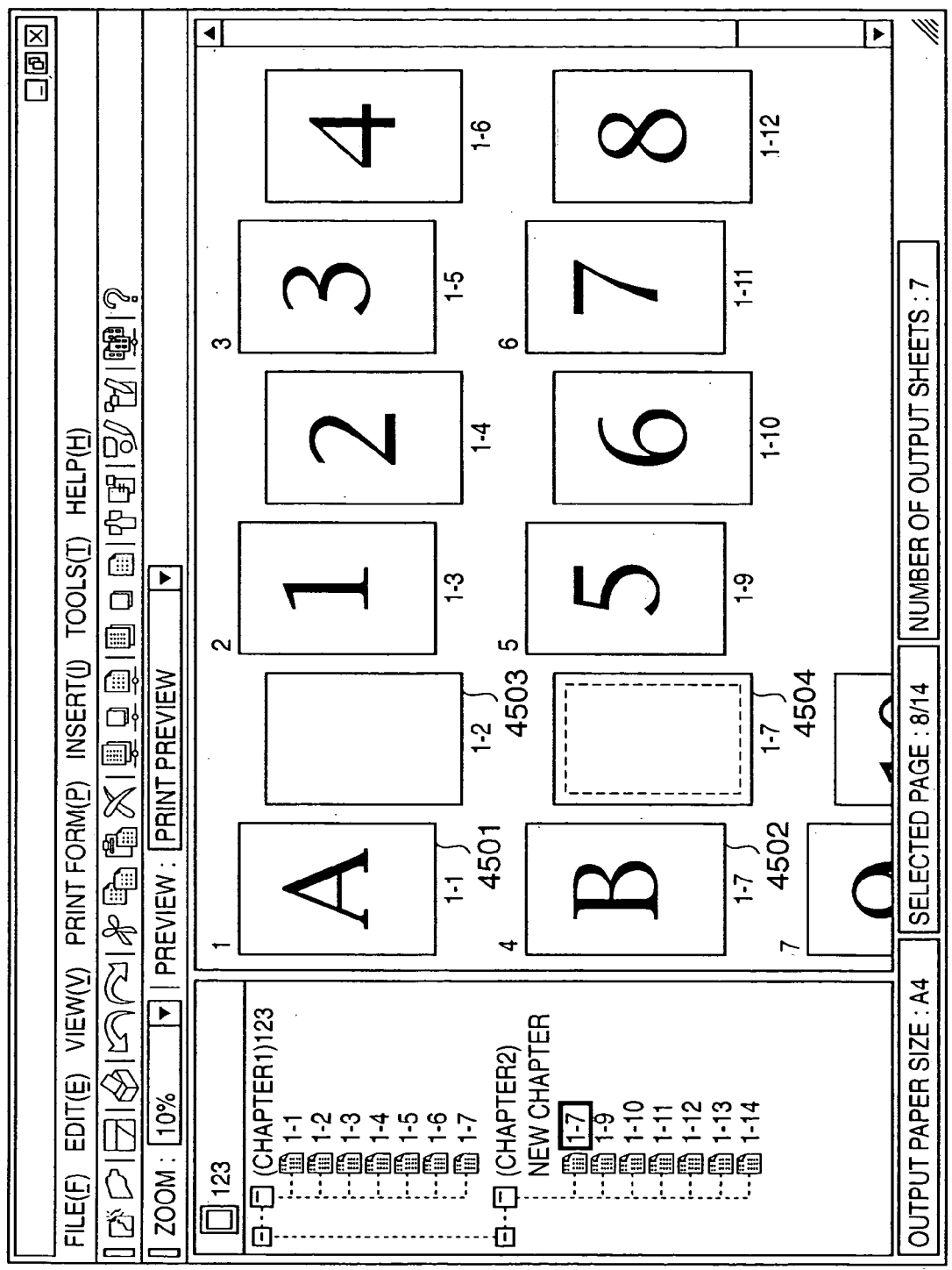
FIG. 45 is a view showing a display example of the electronic document after some of steps according to the second embodiment of the present invention are applied.

FIG. 45 shows an example of window display when step 3804 in FIG. 38 is executed. The chapter is divided into a newly created chapter at the 7th page which is an original sheet, i.e., chapter sheet whose lower surface is a blank page. At this time, chapter sheets (4501 and 4502) bearing "A" and "B", and the blank pages (4503 and 4504) of their lower surfaces have the same format as that of the remaining original pages.

Figure 46:
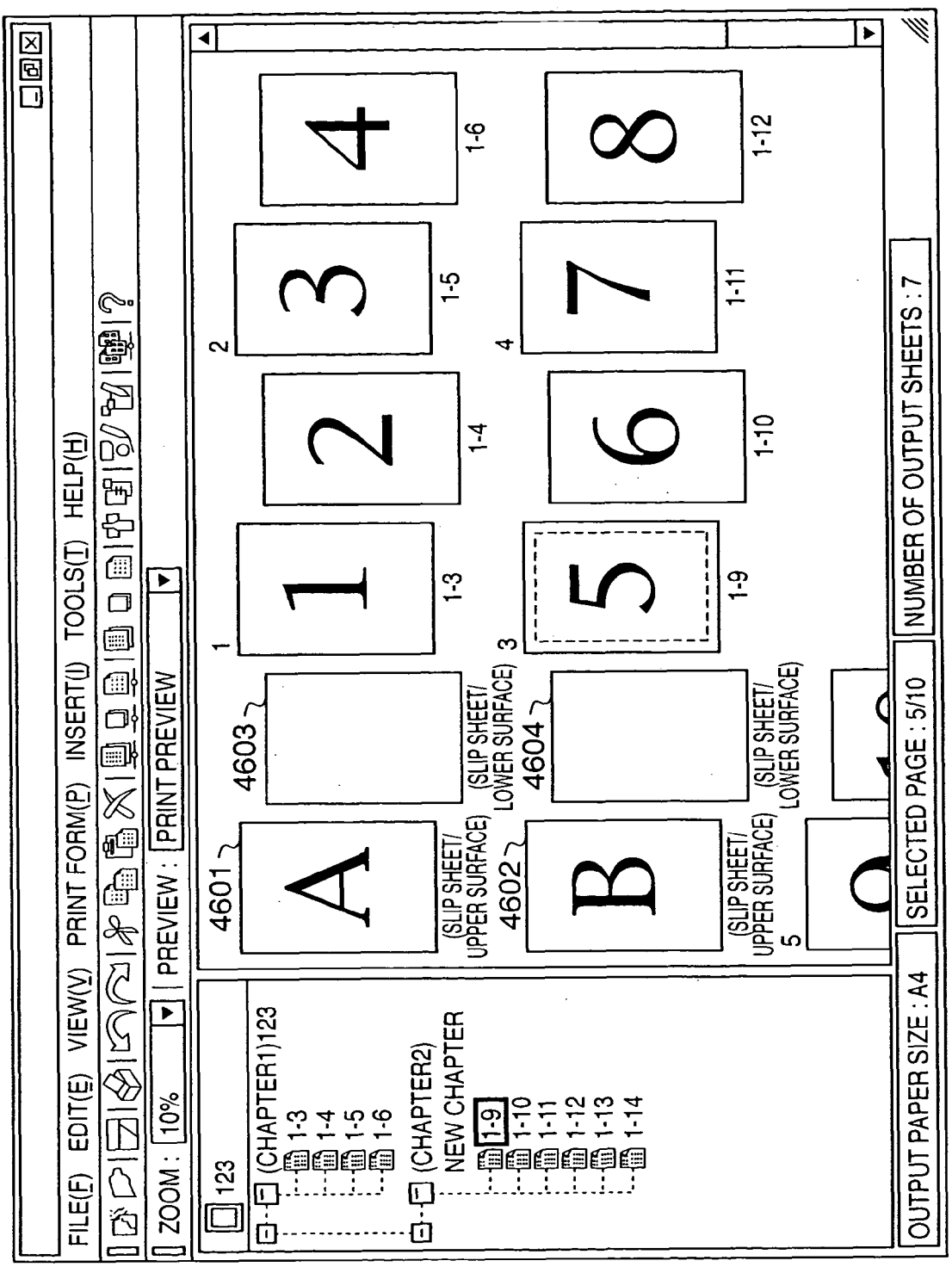
FIG. 46 is a view showing a display example of the electronic document after the steps according to the second-embodiment of the present invention are applied.

FIG. 46 shows an example of window display when step 3805 in FIG. 38 is executed. Data of a total of four pages (pages 1-1, 1-2, 1-7, and 1-8) of chapter sheets (4601 and 4602) bearing "A" and "B" and the blank sheet data (4603 and 4604) of their lower surfaces are deleted from the electronic original file. Instead, insertion of paper sheets (slip sheets) is set. Slip sheets to be inserted are displayed at the starts of the respective chapters in the user interface window of FIG. 46. The images "A" and "B" drawn on original pages corresponding to the upper surfaces of the chapter sheets are output as annotations to the chapter sheets.

FIG. 32 shows this sheet insertion setting state. As represented by a combo box 3101, the "slip sheet" setting of inserting a paper sheet between chapters is set as the book attribute of an electronic original file created by the sequence of FIG. 38.

Figure 47:
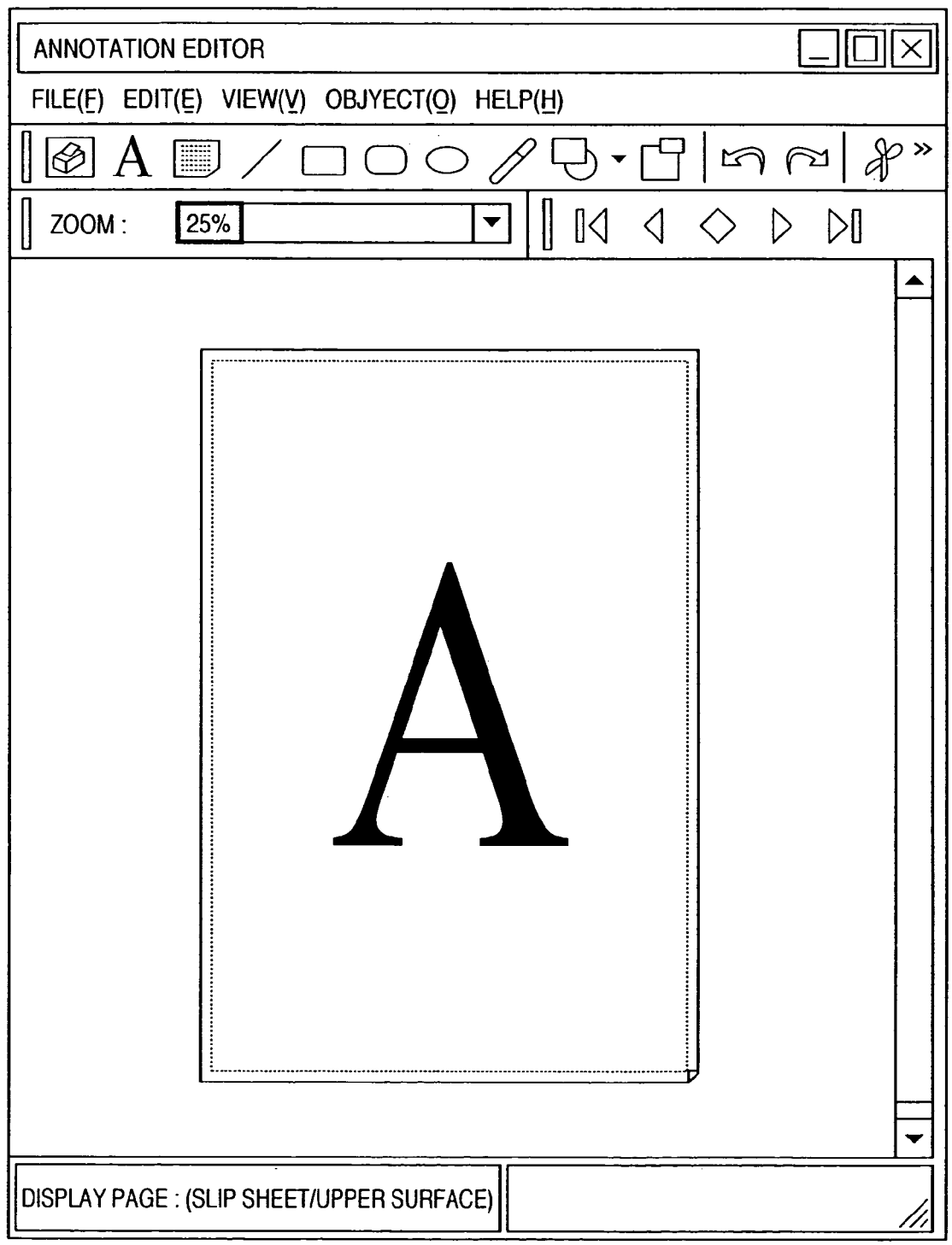
FIG. 47 is a view showing a display example of the electronic document obtained by replacing chapter sheet image data with sheet insertion data from original data according to the second embodiment.

FIG. 47 shows an example of converting data "A" on the chapter sheet into the sheet insertion setting. FIG. 47 shows that the data "A" is added as an annotation to slip sheet data. In this case, the data "A" is image data captured by the scanner, and thus this image data is added as an image annotation.

As described above, the document processing system according to the second embodiment can determine that, of image data of a paper original having undergone double-sided scanning, an original sheet whose lower surface is blank is a chapter sheet representing the start of a chapter. The document processing system can chapter the electronized document of an electronic original file by using the chapter sheet as the start. Hence, the structure of a paper original can be faithfully reflected even in an electronic original file. Since an image printed on a chapter sheet can be registered as an annotation in document setting information, the image serving as a front cover can be printed on a chapter sheet.

Printing Control Method for Document having Undergone Slip Sheet Setting Process according to Second Embodiment Details of a printing process in an electronic original despooler 105 will be explained. A printing apparatus such as a printer to which the present invention can be applied has a hierarchical structure of a job, binder, and page, similar to a hierarchical structure of a book, chapter, and page in a book file. Control of a printing apparatus complying with the print setting of a document having a hierarchical structure can be implemented by applying book settings to a job in the printing apparatus and chapter settings to a binder in the printing apparatus.

The electronic original despooler 105 issues a job start instruction. The electronic original despooler 105 sets a book printing method (single- or double-sided printing) as the printing method attribute of the job. Although the book printing method also includes bookbinding printing as a choice, the second embodiment will explain single-/double-sided printing control and a description of bookbinding printing will be omitted. In practice, the printing method is also set as a binder attribute, and the book printing method setting is not significant in this case. In some cases, double-sided printing must be designated as the book printing method, similar to the above example in which only when the book printing method attribute is double-sided printing, single-/double-sided printing (similar to a book) can be set as a chapter printing method. The second embodiment can control the printing method in either case by directly setting the book printing method attribute as the job printing method attribute.

The electronic original despooler 105 issues job attributes containing the printing method, and initializes a chapter number in process. The electronic original despooler 105 determines whether all chapters have been processed, and if so, issues a job end instruction to end the book printing process. If an unprocessed chapter remains, the electronic original despooler 105 advances the chapter to be processed by one, and sequentially executes the above process for all chapters.

The electronic original despooler 105 issues a binder start instruction, and sets the printing method of the current chapter in process as the binder printing method attribute. The electronic original despooler 105 issues binder attributes including the printing method. The electronic original despooler 105 executes a printing process for each page of the chapter in process. After the end of the printing process within the chapter, the electronic original despooler 105 issues a binder end instruction, and repeats the binder issuing process until all chapters are processed. The electronic original despooler 105 can notify the printer of the single-/double-sided printing settings of all the chapters.

How to control the printing process between the electronic original despooler 105, a printer driver 106, and a printer 107 will be described.

The electronic original despooler 105 executes a process of generating a print job, such as CreateDC( ) or StartDoc( ) for, e.g., Windows® OS in accordance with the printing process sequence of the OS. The printer driver 106 is notified of this process via the GDI, and performs a job generation process and job attribute setting process. More specifically, the printer driver 106 generates commands which instruct the printer on the start of the job and job attributes including the printing method setting, and transmits the commands to the printer 107 via an OS procedure for transmitting data to the printer.

The electronic original despooler 105 executes ExtEscape (BINDER_START) by the binder start issuing process, and notifies the printer driver 106 of the start of a binder which allows designating an independent finishing attribute. This process means notification of the start of printing a chapter. The electronic original despooler 105 executes ResetDC( ) by the binder attribute issuing process, and notifies the printer driver 106 of binder attributes. More specifically, the electronic original despooler 105 notifies the printer driver 106 of binder attributes including the stapling setting and insertion of a slip sheet in a chapter (e.g., a flag representing insertion, a page number to be inserted, and a designated annotation loaded from the annotation library). The printer driver 106 receives these processes, and performs a binder generation process and binder attribute setting process which notify the printer 107 of the start of a binder. More specifically, the printer driver 106 generates commands which instruct the printer on binder attributes including the printing method setting, and transmits the commands to the printer 107 via an OS procedure for transmitting data to the printer. Note that "slip sheet" may be transmitted to the printer as a normal print command to print an annotation by a computer.

The electronic original despooler 105 notifies the printer driver 106 via the GDI of the drawing contents of each page contained in the binder, i.e., the drawing contents of each original page contained in the current chapter. As described above, the printer driver 106 receives the drawing contents which are converted from GDI to DDI, converts them into a drawing instruction such as PDL interpretable by the printer, and transmits the instruction to the printer 107.

The electronic original despooler 105 notifies the printer driver 106 by ExtEscape(BINDER_END) and ExtEscape (BINDER_START) that the current binder ends and the next binder starts. The purpose of these two notifications is to notify the printer driver 106 of the boundary between binders, and they can be combined into one notification which notifies the printer driver 106 of the boundary between binders.

The electronic original despooler 105 repeats the above process by the number of chapters. Finally, the electronic original despooler 105 executes a process of ending the print job, such as EndDoc( ) for, e.g., Windows® OS in accordance with the printing process sequence of the OS. The printer driver 106 is notified of this process via the GDI, and performs a job end process. More specifically, the printer driver 106 generates a command which instructs the printer to end the job, and transmits the command to the printer 107 via an OS procedure for transmitting data to the printer.

Note that a concrete API such as ExtEscape( ) or ResetDC( ) has been exemplified as a means for transmitting a notification from the electronic original despooler 105 to the printer driver 106 via the GDI. However, the same process can also be implemented by using a means other than the API as far as the printing process can be executed by the electronic original despooler 105 and printer driver 106 in synchronism with each other.

By the above process, the printing method (single-/double-sided printing) set for each chapter of a book file can be issued as a binder attribute to the printer, and implemented while single-sided printing and double-sided printing are switched. Slip sheet insertion and annotation data set for each document in a book file can be issued as binder attributes or normal page commands to the printer. An annotation can be added while a slip sheet is inserted at the start position of a designated chapter.

Third Embodiment

A system as an improvement of the second embodiment will be described as the third embodiment. In the second embodiment, an original sheet whose lower surface is a blank page is regarded as a chapter sheet even if the sheet is not an intentionally inserted chapter sheet. For this reason, when the final page of a chapter is an odd-numbered page, the lower surface is a blank page, and the original sheet is regarded as a chapter sheet though it is not a chapter sheet. To prevent this, when two original sheets whose lower surfaces are blank pages are successive, the document processing system according to the third embodiment regards the first original sheet not as a chapter sheet but as the final original sheet of a chapter.

Figure 48:
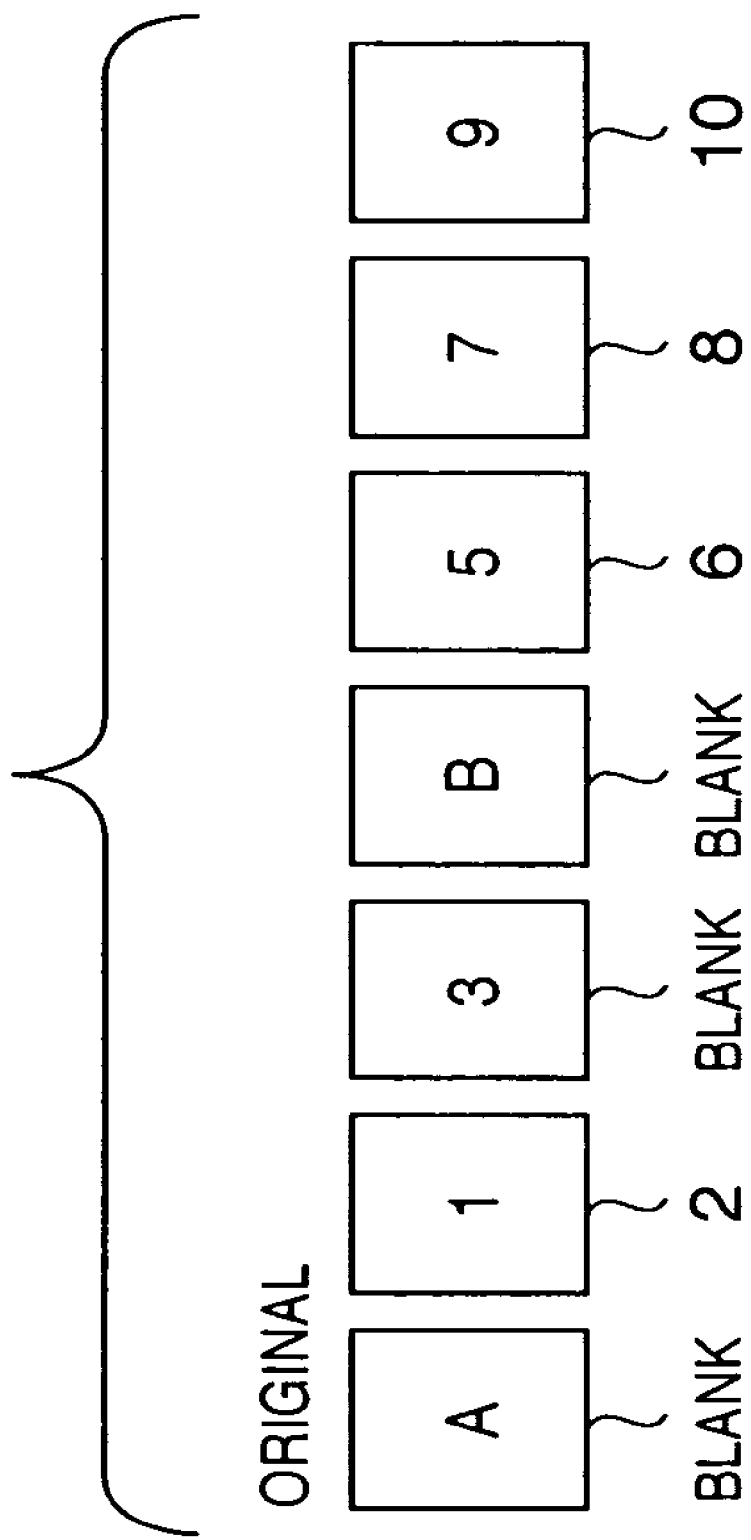
FIG. 48 is a view showing another example of an original containing a chapter sheet according to the second embodiment.
Figure 49:
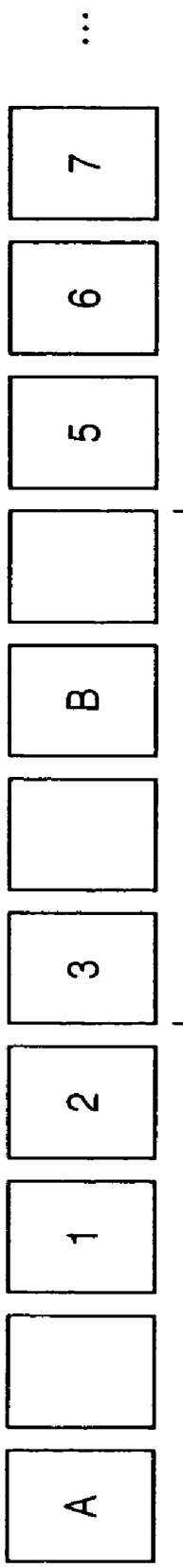
FIG. 49 is a view showing an example of image data obtained by capturing the original of FIG. 48 by a scanner.

FIG. 48 shows an example of an original in which a paper sheet immediately preceding to a chapter sheet is a single-sided printed sheet. The first chapter is formed from data of three pages, and the lower surface of the third paper sheet, i.e., the lower surface of the final original sheet of the chapter is blank. FIG. 49 shows an example of image data created when the original in FIG. 48 is captured by a scanner by double-sided scanning. Blank pages alternately appear from the fifth to eighth pages.

If these data undergo chapter sheet determination in accordance with the sequence of FIG. 39, a page bearing "3" is determined as a chapter sheet, and the document is divided into three chapters (parts 4901, 4902, and 4903 in FIG. 49). To prevent this, the third embodiment determines a chapter sheet in accordance with the sequence of FIG. 50.

Figure 50:
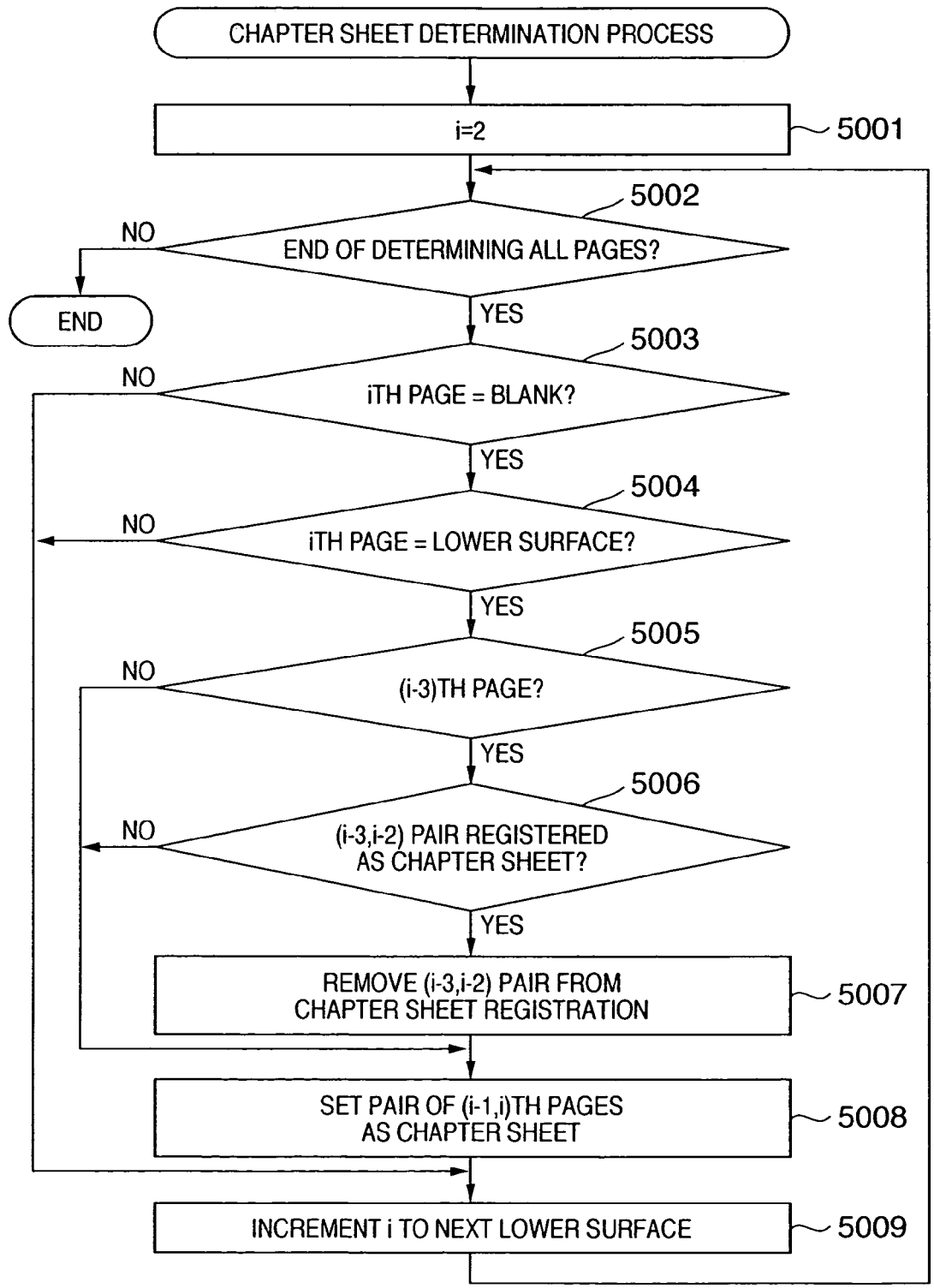
FIG. 50 is a flowchart showing the flow of a chapter sheet determination process according to the third embodiment.

FIG. 50 is a flowchart for explaining another example of the chapter sheet determination process. The system of the third embodiment has the same configuration as that of the second embodiment except that FIG. 39 in the second embodiment is replaced with FIG. 50.

In step 5001, a bookbinding application 104 initializes a counter i. If the first page is the start page, i=2. In step 5002, the bookbinding application 104 performs end determination. The bookbinding application 104 refers to a page list 406, and checks whether the ith page exists. If the ith page exists, the flow advances to step 5003; if no ith page exists, the flow ends.

In step 5003, the bookbinding application 104 determines whether the ith page is blank. If the ith page is blank, the flow advances to step 5004; if NO, to step 5009.

In step 5004, the bookbinding application 104 determines whether the ith page is a lower surface. The simplest determination method is to determine an upper surface for an odd-numbered page (i is an odd number) and a lower surface for an even-numbered page (i is an even number). Alternatively, upper/lower surface information can be obtained by adding "A_" for an upper surface or "B_" for a lower surface to the start of a file name in scan.

If the ith page is blank, the bookbinding application 104 checks whether single-sided printed paper sheets are successive. In step 5005, the bookbinding application 104 checks on the basis of the presence/absence of the (i–3)th page whether original data corresponding to a preceding paper sheet exists. If it is determined that no preceding paper sheet exists, i.e., no (i–3)th page exists, the current page in process is the page of the start paper sheet of the document. If a page corresponding to a preceding paper sheet does not exist, the flow jumps to step 5008; if the corresponding page exists, advances to step 5006.

In step 5006, the bookbinding application 104 checks whether page data ((i–3)th and (i–2)th page data) corresponding to the upper and lower surfaces of the preceding paper sheet have already been determined as a chapter sheet. If YES in step 5006, paper sheets having only upper surfaces printed are successive, the flow advances to step 5007, and a pair (i–3, i–2) of pages corresponding to the preceding paper sheet are deleted from the record of a chapter sheet table. In the chapter sheet table, pairs of pages corresponding to chapter sheets are sequentially registered in the page arrangement order. In this case, a pair of pages which are registered at the end may be deleted. If the page data corresponding to the preceding paper sheet are not determined in step 5006 as a chapter sheet, the flow jumps to step 5008.

In step 5008, the bookbinding application 104 records the (i–1, i) pair in the chapter sheet table. The flow then advances to step 5009 to increment the counter. When pages are arranged in an order of upper and lower surfaces, the counter can always exhibit an even number and indicate a lower surface by incrementing the counter by two. The flow returns to step 5002 to process the next data.

In this way, when two paper sheets having only upper surfaces printed and lower blank surfaces are successive, the latter paper sheet out of the two paper sheets is registered as a chapter sheet, and the former paper sheet is processed as the final paper sheet of the chapter. As a result, a chapter structure divided by a chapter sheet in a paper original can be more accurately reflected in an electronized document (i.e., electronic original file).

In the flowchart according to the third embodiment, preceding and succeeding steps can be exchanged as far as the process can be completed.

The present invention may be applied to a system including a plurality of devices (e.g., a host computer, interface device, reader, and printer) or an apparatus (e.g., a copying machine, printer, or facsimile apparatus) formed by a single device.

The purpose of the present invention is also achieved when the computer (or the CPU or MPU) of a system or apparatus reads out and executes program codes stored in a storage medium which stores software program codes for realizing the functions of the above-described embodiments, the sequences of FIGS. 20 to 26 in the first embodiment, and the sequences of FIGS. 38 to 41 in the second embodiment and FIG. 50 in the third embodiment. In this case, the program codes read out from the storage medium realize the functions of the above-described embodiments, and the storage medium which stores the program codes constitutes the present invention.

The storage medium for supplying the program codes includes a floppy® disk, hard disk, optical disk, magnetooptical disk, CD-ROM, CD-R, magnetic tape, nonvolatile memory card, and ROM.

The functions of the above-described embodiments are realized when the computer executes the readout program codes. Also, the functions of the above-described embodiments are realized when an OS (Operating System) or the like running on the computer performs some or all of actual processes on the basis of the instructions of the program codes.

Furthermore, the functions of the above-described embodiments are realized when the program codes read out from the storage medium are written in the memory of a function expansion board inserted into the computer or the memory of a function expansion unit connected to the computer, and the CPU of the function expansion board or function expansion unit performs some or all of actual processes on the basis of the instructions of the program codes.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2003-376192 and 2003-376193, both filed on Nov. 5, 2003, which are hereby incorporated by references herein.

What is claimed is:

1. A document creation method, performed by a document creation apparatus, for reading a scanned electronic document including a plurality of pages, comprising:

a specifying step of specifying, when a combination of a non-blank page on an upper surface of a sheet and a blank page on a lower surface of the sheet is successively followed by another combination of a non-blank page on an upper surface of a sheet and a blank page on a lower surface of the sheet, the pages in the later combination of pages as boundary pages;

a dividing step of dividing the plurality of pages of the electronic document into a first group composed of one or more pages anterior to the boundary pages and a second group composed of one or more pages posterior to the boundary pages; and a setting step of setting a slip sheet attribute indicating a sheet feeding portion for the boundary pages specified in the specifying step.

2. A computer-readable recording medium on which a computer-executable program for causing a computer to execute a document creation method defined in claim 1 is recorded.

3. A document creation apparatus which reads an electronic document including a plurality of pages, comprising:

a specifying unit configured to specify, when a combination of a non-blank page on an upper surface of a sheet and a blank page on a lower surface of the sheet is successively followed by another combination of a non-blank page on an upper surface of a sheet and a blank page on a lower surface of the sheet, the pages in the later combination of pages as boundary pages;

a dividing unit configured to divide the plurality of pages of the electronic document into a first group composed of one or more pages anterior to the boundary pages and a second group composed of one or more pages posterior to the boundary pages; and a setting unit configured to set a slip sheet attribute indicating a sheet feeding portion for the boundary pages specified by the specifying unit.

* * * * *